United States Patent [19]
Sakai et al.

[11] Patent Number: 5,949,555
[45] Date of Patent: *Sep. 7, 1999

[54] IMAGE PROCESSING APPARATUS AND METHOD

[75] Inventors: Akihiko Sakai; Eiji Ohara; Michiko Hirayu; Yuka Nagai, all of Kawasaki, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/383,174

[22] Filed: Feb. 3, 1995

[30] Foreign Application Priority Data

Feb. 4, 1994 [JP] Japan ................................. 6-012739

[51] Int. Cl.⁶ ............................................. H04N 1/40
[52] U.S. Cl. ......................... 358/462; 358/467; 382/185; 382/177
[58] Field of Search ................. 358/400, 407, 358/462, 448, 453, 467, 474, 455, 456, 457, 458, 451, 470, 429; 382/176, 177, 185, 199

[56] References Cited

U.S. PATENT DOCUMENTS

| 5,101,438 | 3/1992 | Kanda et al. | 382/9 |
| 5,299,255 | 3/1994 | Iwaki | 379/96 |
| 5,303,381 | 4/1994 | Yagasaki | 395/800 |
| 5,317,419 | 5/1994 | Koizumi | 358/462 |
| 5,351,314 | 9/1994 | Vaeeezi | 382/54 |
| 5,392,133 | 2/1995 | Nakajima | 358/407 |

*Primary Examiner*—Thomas D. Lee
*Assistant Examiner*—Jerome Grant, II
*Attorney, Agent, or Firm*—Fitzpatrick, Cella, Harper & Scinto

[57] ABSTRACT

An apparatus and method for compressing an image based upon an attribute of a partial area efficiently includes a classification device for providing attribute classification information in which partial areas of an input image are classified into a variety of attributes and area information, and an image compression device for selecting an image compression method for each partial area in the above-described input image out of plural image compression methods and executing such compression.

13 Claims, 42 Drawing Sheets

FIG. 30B

| NO. | UNIT TYPE | UPPER-LEFT x COORDINATE OF UNIT AREA | UPPER-LEFT y COORDINATE OF UNIT AREA | WIDTH OF UNIT AREA | HEIGHT OF UNIT AREA |
|---|---|---|---|---|---|
| 1 | TITLE PORTION | 235 | 45 | 18 | 106 |
| 2 | CHARACTER PORTION | 150 | 12 | 124 | 86 |
| 3 | HALFTONE DRAWING PORTION | 8 | 13 | 62 | 74 |
| 4 | CHARACTER PORTION | 14 | 76 | 38 | 5 |
| 5 | LINE PORTION | 3 | 80 | 193 | 2 |
| 6 | CHARACTER PORTION | 6 | 82 | 187 | 68 |
| 7 | LINE PORTION | 2 | 163 | 218 | 1 |
| 8 | CHARACTER PORTION | 78 | 166 | 168 | 65 |
| 9 | TABLE PORTION | 4 | 168 | 70 | 73 |
| 10 | CHARACTER PORTION | 9 | 242 | 45 | 5 |

FIG. 31

| | IMAGE PROC (T2601) | BINARIZATION PROC (T2602) | COMPRESSION PROC (T2603) |
|---|---|---|---|
| CHARACTER PORTION | EDGE EMPHASIS PROC | SIMPLE BINARIZATION | JBIG |
| TITLE PORTION | SHADOW PROC | SIMPLE BINARIZATION | JBIG |
| CLOSING LINE PORTION | FATTING PROC | SIMPLE BINARIZATION | JBIG |
| TABLE PORTION | NON | SIMPLE BINARIZATION | JBIG |
| HALFTONE DRAWING PORTION | NON | NON | JPEG |
| LINE DRAWING PORTION | NON | ERROR DISPERSION BINARIZATION | JBIG |
| LINE PORTION | FATTING PROC | SIMPLE BINARIZATION | JBIG |

FIG. 40
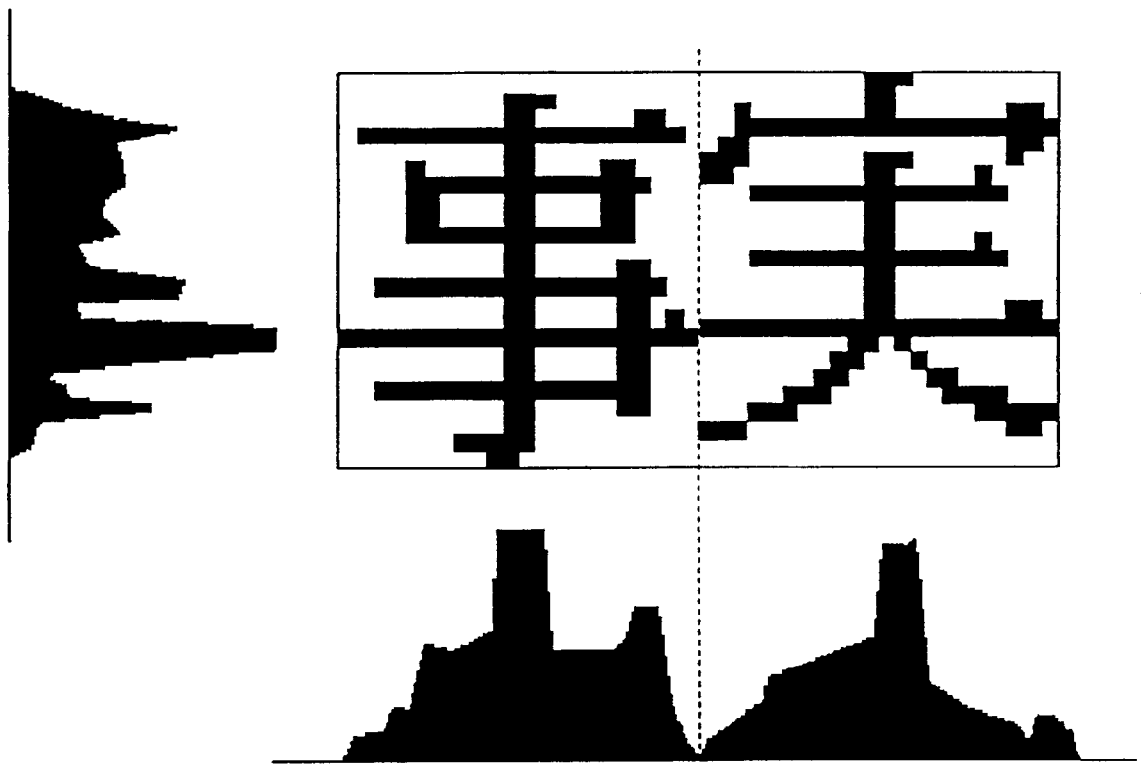
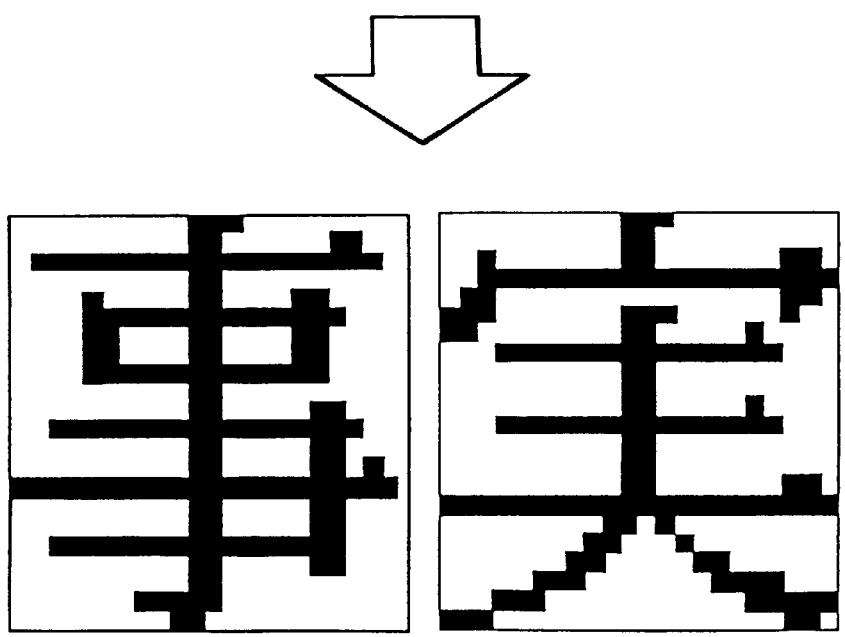

IMAGE PROCESSING APPARATUS AND METHOD

BACKGROUND OF THE INVENTION

1. Field of the Invention

The invention relates to an image processing apparatus and the method whereby processing every area is enabled.

2. Related Background Art

Hitherto, for example as shown in U.S. patent application Ser. No. 08/285,523 to selectively change an image processing method comprising an image compression method depending upon an element of an attribute area such as a character, a title, a table, a half-tone graphic form, a linear graphic form and a line and a frame line where an image existed, an operator specified any change manually using an editor.

Besides, an operation for manual specification to change an image processing method for every area of an attribute where an image existed was very troublesome to an operator.

As an operator had to perform an operation providing a specification every image even if the same specification was given for a large quantity of images, such processing was virtually impossible.

A method of discriminating an attribute also could be improved because a wrong judgement was sometimes made when an attribute was discriminated and not only attributes requiring discrimination effectively but all predetermined attributes were sometimes discriminated.

SUMMARY OF THE INVENTION

An object of the invention is to remove the above-described drawbacks in the prior art, that is, to compress an image efficiently depending upon the attribute of a partial area.

Therefore, according to the invention, there is provided an image processing apparatus comprising input means for inputting image data representing an original; dividing means for dividing the original into a plurality of areas and examining an attribute of each of the plurality of areas, the attribute indicating whether the area is one of at least a character area and a live image area and a half-tone image area; and compressing means for compressing one image data in accordance with the examination by the driving means.

An object of the invention is also to enhance the precision with which an attribute of a partial area is classified.

Therefore, according to the invention, there is provided an image processing apparatus comprising input means for inputting image data representing an original; dividing means for dividing the original into a plurality of areas, examining an attribute of each of the plurality of areas and outputting the examination result; recognizing means for recognizing a kind of character based on the image data; and correcting means for correcting the examination result by using the recognition by the recognizing means.

Further, an object of the invention is to classify an attribute efficiently.

Therefore, according to the invention, there is provided an image processing apparatus comprising input means for inputting image data representing an original; dividing means for dividing the original into a plurality of areas and examining an attribute of each of the plurality of areas; and control means for controlling a level of the examination by the dividing means.

Other objects and aspects of the invention will be clarified by the following description based upon drawings and description of claims.

BRIEF DESCRIPTION OF THE DRAWINGS

FIGS. 30A and 30B are a concrete example of the result of block selection processing and a concrete example of a data structure of block selection processing result data;

FIG. 31 is a concrete example of a reference table showing the correspondence between attribute classification information according to block selection processing result and each image processing method;

FIG. 40 is a concrete example of character cut-out processing by separating linked pixel elements;

DETAILED DESCRIPTION OF THE PREFERRED EMBODIMENTS

Embodiment 1

Figure 1:
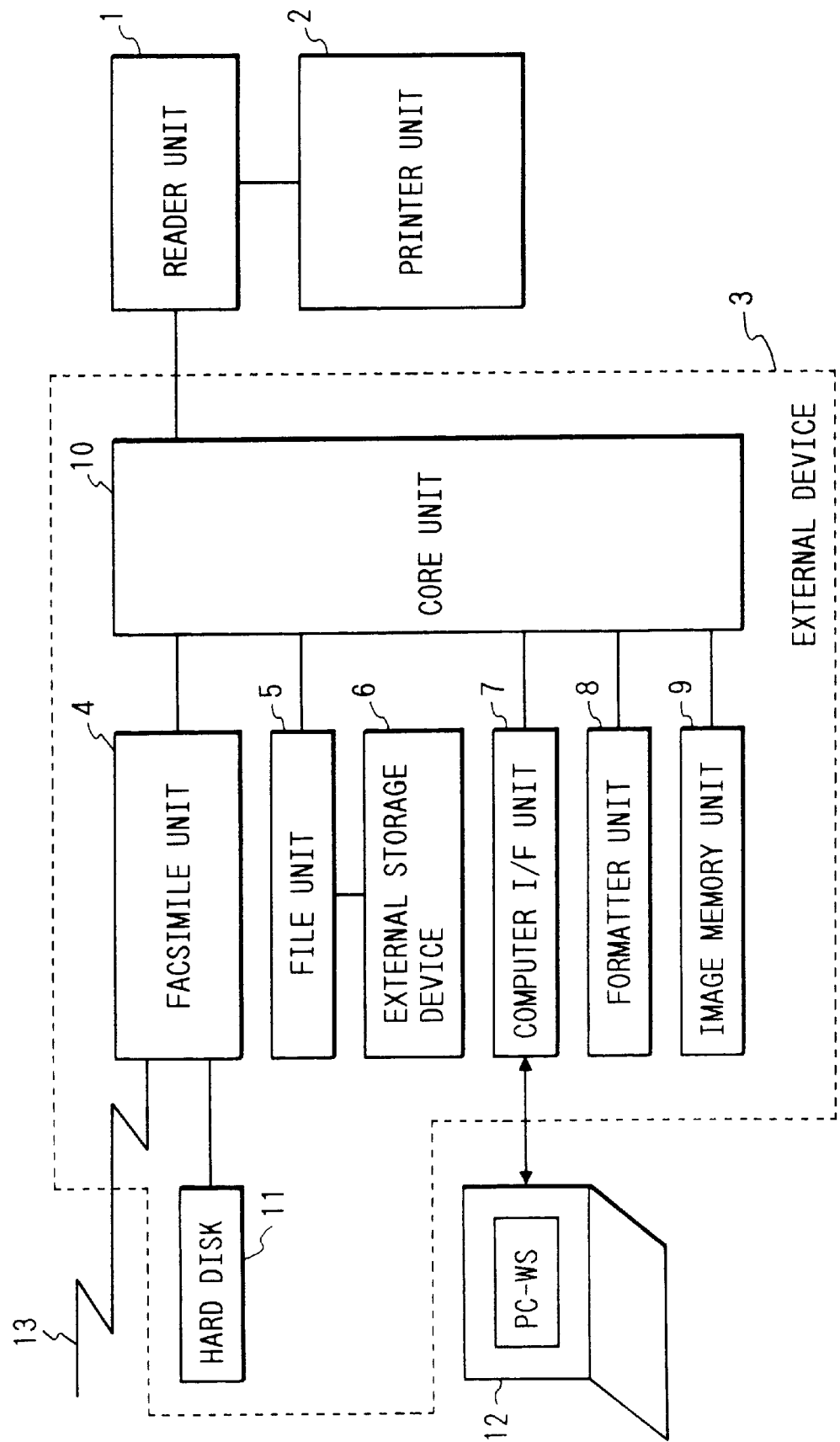
FIG. 1 shows a general view of an image processing apparatus.

FIG. 1 is a block diagram showing the configuration of an image forming system according to an embodiment of the invention.

Referring to FIG. 1, a reference number 1 designates an image input apparatus (hereinafter called a reader unit) for converting an original to image data.

A reference number 2 designates an image output apparatus (hereinafter called a printer) provided with plural types of recording paper cassettes for outputting image data on recording paper as a visible image by a print command. A reference number 3 designates an external device electrically connected to the reader unit 1 and provided with various functions. The external device 3 is provided with a facsimile unit 4, a file unit 5, an external storage device 6 connected to the file unit 5, a computer I/F unit 7 for connecting to a computer 12, a formatter unit 8 for converting information from the computer 12 to a visible image, an image memory unit 9 for temporarily storing information sent from the reader unit 1 and the computer 12 and executing processing for classifying an attribute of a partial area in an image based upon image information temporarily stored (hereinafter called block selection processing) and a core unit 10 for controlling the above-described functions. The above-described facsimile unit 4 is connected to a telephone line 13 and is provided with a hard disk 11 for temporarily storing image data transferred via the telephone line 13. A function of the above-described units 1 to 9 will be described in detail below.

(Description of the reader unit 1)

Figure 2:
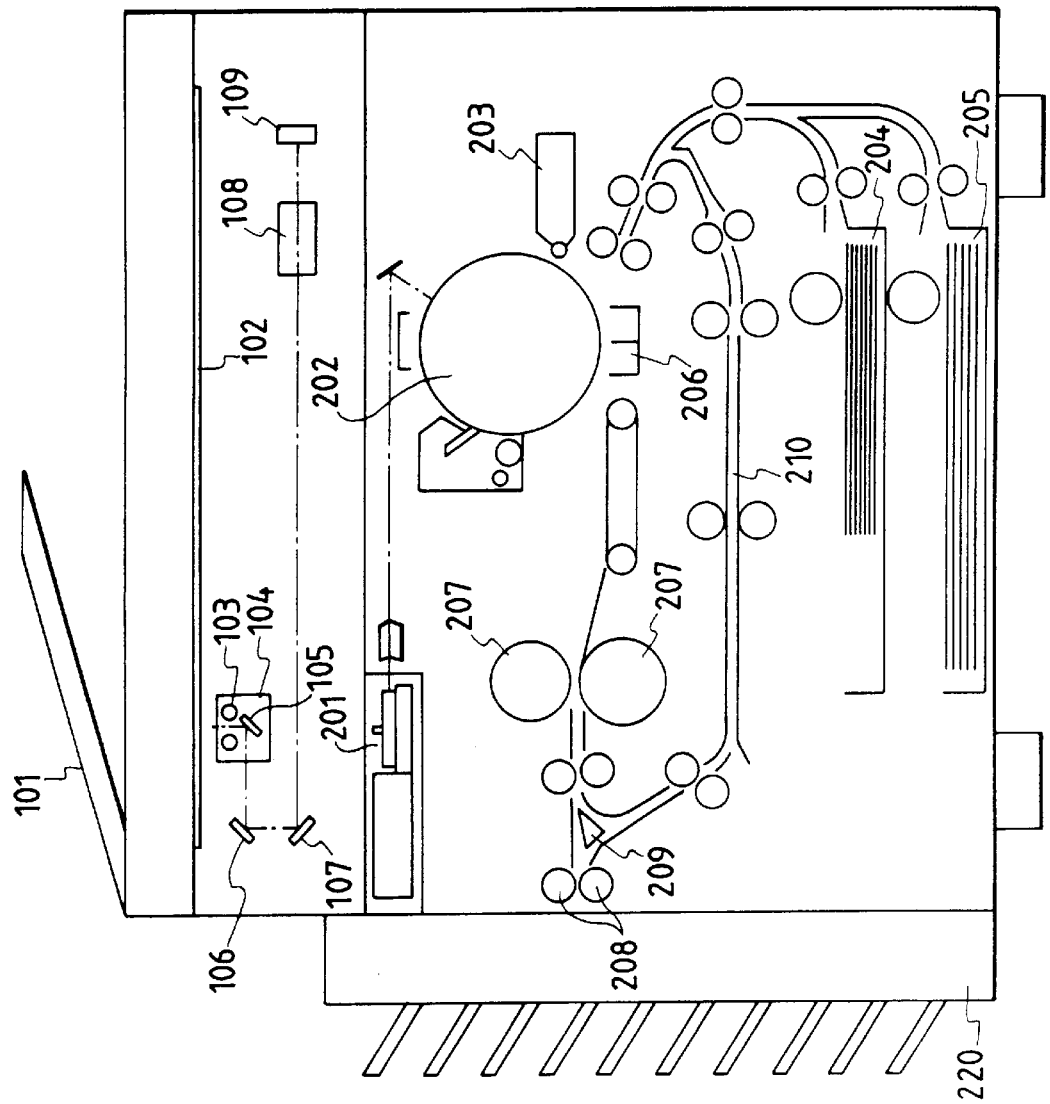
FIG. 2 shows a block diagram of a reader unit 1 and a printer unit 2.

FIG. 2 is a cross section showing the structure of the reader unit 1 and the printer unit 2 and the structure and operation thereof will be described below.

Originals piled on an original feeder 101 are carried on an original glass plate 102 per piece. When an original is carried, a scanner unit lamp 103 is lit and a scanner unit 104 is moved to irradiate the original. Light reflected against the original passes through lens 108 via mirrors 105, 106 and 107 in this order and is then input to CCD image sensor unit 109 (hereinafter called CCD). CCD 109 is constituted by red, green and blue alignment sensors, for example and generates R, G and B signals every image.

Figure 3:
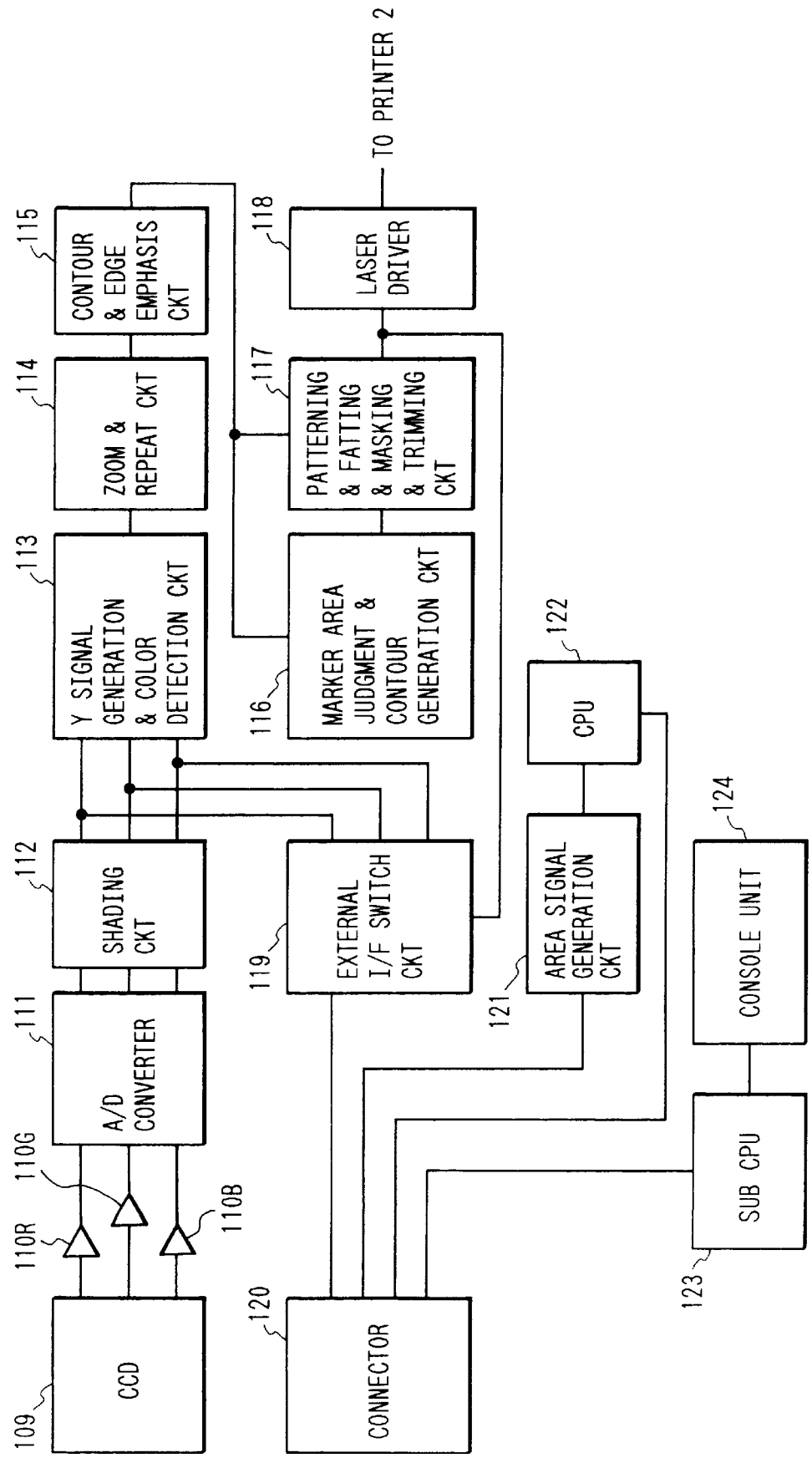
FIG. 3 shows a block diagram of an image processor unit in a reader unit 2.

FIG. 3 is a circuit block diagram showing the configuration for signal processing by the above-described reader unit 1 and the configuration and operation will be described below.

Image information input to CCD 109 is photoelectrically converted to an electric signal. Color information from CCD 109 is amplified depending upon an input signal level of an A/D converter 111 by amplifiers 110R, 110G and 110B. An output signal from the A/D converter 111 is input to a shading circuit 112 and here the non-uniformity of the luminous intensity distribution from the lamp 103 and the non-uniformity of the sensitivity of CCD are corrected. A signal from the shading circuit 112 is input to a Y signal generation and color detection circuit 113 and an external I/F switch circuit 119.

The Y signal generation and color detection circuit 113 processes a signal from the shading circuit 112 using the following expression to generate a Y signal.

$$Y = 0.3R + 0.6G + 0.1B$$

Further, the above-described reader is provided with a color detection circuit for separating seven colors from signals R, G and B and outputting a signal to each color. A signal output from the Y signal generation and color detection circuit 113 is input to a zoom and repeat circuit 114. A zoom operation in vertical scanning is performed by varying the scanning speed of the scanner unit 104 and a zoom operation in horizontal scanning is performed by the zoom and repeat circuit 114. A plurality of the same images on the screen can also be output by the zoom and repeat circuit 114. A contour and edge emphasis circuit 115 obtains edge emphasis and contour information by emphasizing high-frequency components of a signal from the zoom and repeat circuit 114. A signal from the contour and edge emphasis circuit 115 is input to a marker area judgment and contour generation circuit 116 and a patterning/fatting/masking/trimming circuit 117.

The marker area judgment and contour generation circuit 116 reads a location of a part on an original painted in a specified color with a marker pen and generates contour information of a marker. The patterning/fatting/masking/trimming circuit 117 fats, masks and trims data based upon this contour information, and also patterns data according to a color detection signal from the Y signal generation and color detection circuit 113.

A signal output from the patterning/fatting/masking/trimming circuit 117 is input to a laser driver circuit 118 and the laser driver circuit converts processed signals to a signal for driving laser. A signal output from the laser driver circuit 118 is input to the printer 2 to form a visible image there.

Next, The external I/F switch circuit 119 for interfacing with an external device will be described below.

The external I/F switch circuit 119 outputs image information from the patterning/fatting/masking/trimming circuit 117 to a connector 120 if image information is to be output from the reader unit 1 to an external device 3. If image information from an external device 3 is input to the reader unit 1, the external I/F switch circuit 119 inputs image information from the connector 120 to the Y signal generation and color detection circuit 113.

The above-described image processing is executed by instructions from CPU 122 and an area signal generation circuit 121 generates various timing signals required for the above-described image processing based upon a value set by CPU 122. Further, the area signal generation circuit 121 communicates with an external device 3 using communication features resident in CPU 122. SubCPU 123 controls a console unit 124 and communicates with an external device 3 using communication features resident in the subCPU 123.

(Description of the printer unit 2)

Referring to FIG. 2, the structure and operation of the printer unit 2 will be described below.

A signal input to the printer unit 2 is converted to an optical signal (laser on/off signal) by an exposure controller unit 201. Photosensitive material 202 is irradiated according to the optical signal. A latent image formed on the photosensitive material 202 by irradiating beams is developed by a developing unit 203. Transfer paper is carried from transfer paper cassettes 204 and 205 and in a transfer unit 206, a developed image, as described above, is transferred on the paper. After the transferred image is fixed on the transfer paper by a fixing unit 207, the paper is output outside the machine by a paper output unit 208. The transferred paper output from the paper output unit 208 is output to each bin if a sort function for a sorter 220 is available and is output to the uppermost bin of the sorter if the sort function is not available.

Next, a method of outputting images read sequentially on both sides of a piece of output paper will be described below.

After a piece of output paper fixed in the fixing unit 207 is once carried to the paper output unit 208, the paper is carried to a transfer paper saucer for supply feed 210 through a carried direction switching member 209 for reversing the direction of the paper carriage. When the following original is ready, the image of the original is read as in the above-described process. However, as transfer paper is supplied from the transfer paper saucer for supply feed 210, the image of an original can be output on both sides of the same output paper.

(Description of an external device 3)

An external device 3 is connected to the reader unit 1 via a cable to control the transfer of signals and each feature in a core unit of the external device 3. The external device 3 is provided with a facsimile unit 4 for sending or receiving facsimile information, a file unit 5 for storing original information as an electric signal, a formatter unit 8 for converting code information from a computer to image information, a computer I/F unit 7 for interfacing with the computer 12, an image memory unit 9 for temporarily storing information sent from the reader unit 1 and from the computer 12 and executing block selection processing for classifying an attribute of a partial area in an image based upon temporarily stored image information and a core unit 10 for controlling the above-described functions.

Referring to a block diagram shown in FIG. 4, the configuration and operation of the core unit 10 in the external device 3 will be described below.

(Description of the core unit 10)

Figure 4:
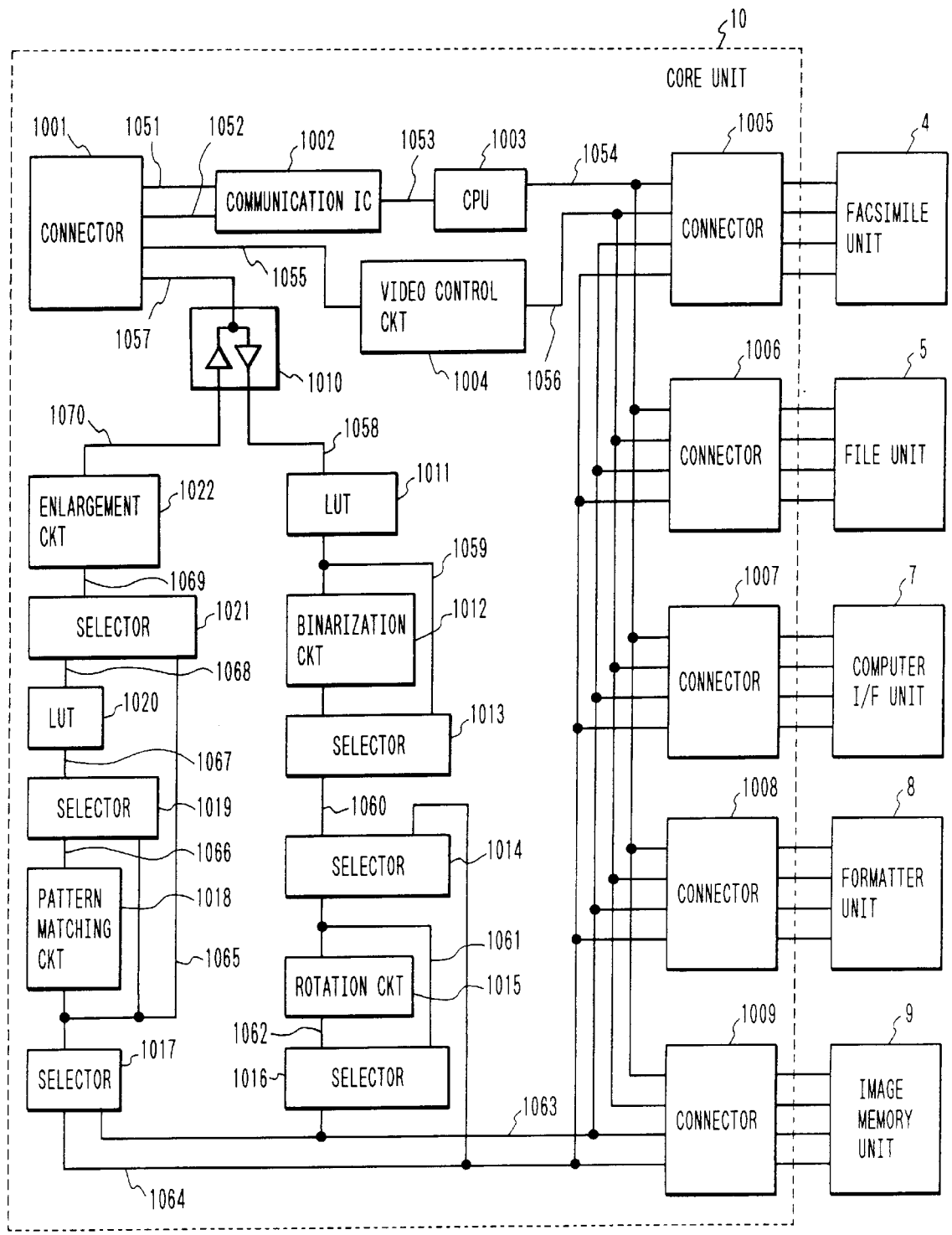
FIG. 4 shows a block diagram of a core unit 10.

FIG. 4 is a block diagram showing the detailed configuration of the above-described core unit 10.

A connector 1001 of the core unit 10 is connected to the connector 120 of the reader unit 1 via a cable. The connector 1001 is provided with 4 types of signal lines and a signal 1057 is a multi-valued 8-bit video signal. A signal 1055 is a control signal for controlling a video signal as described above. A signal 1051 communicates with CPU 122 in the reader unit 1. A signal 1052 communicates with the subCPU 123 in the reader unit 1. The signals 1051 and 1052 are processed according to communication protocol in IC for communication 1002 to transfer communication information to CPU 1003 via CPU bus 1053. Each portion of the core unit 10 is controlled by the CPU 1003.

The signal 1057 is a duplex video signal line and can receive information from the reader unit 1 in the core unit 10 and can output information from the core unit 10 to the reader unit 1.

The signal line 1057 is connected to a buffer 1010 and there the signal is separated into simplex signals 1058 and 1070. The signal 1058 is a multi-valued 8-bit video signal from the reader unit 1 and is input to LUT 1011 on the next stage. LUT 1011 converts image information from the reader unit 1 to a desired value in a look-up table constituted by RAM. A signal 1059 output from LUT 1011 is input to a binarization circuit 1012 or a selector 1013. The binarization circuit 1012 is provided with a simple binarization function required for binarizing a multi-valued signal 1059 at a fixed slice level, a binarization function enabled by a variable slice level at which a slice level can be changed depending upon a value of a pixel surrounding a pixel and a binarization function enabled by an error diffusion process. Binarized information is converted to 00H. if it is "0" and to a multi-valued signal of FFH if it is "1", and is input to a selector 1013 on the next stage. The selector 1013 selects either of a signal from LUT 1011 or a signal output from the binarization circuit 1012. A signal output from the selector 1013 is input to a selector 1014. The selector 1014 selects either of a signal 1064, that is, a video signal output from the facsimile unit 4, the file unit 5, the computer I/F unit 7, the formatter unit 8 and the image memory unit 9 and input to the core unit 10 via connectors 1005, 1006, 1007 and 1008 respectively, or a signal 1060 output from the selector 1013 according to an instruction of CPU 1003. A signal 1061 output from the selector 1014 is input to a rotation circuit 1015 or a selector 1016. The rotation circuit 1015 is provided with a function required for rotating a phase of an input image signal by +90, −90 or +180 degree. The rotation circuit 1015 stores information output from the reader unit 1 and converted to a binary signal in the binarization circuit 1012 as information from the reader unit 1. Next, the rotation circuit 1015 reads the stored information whose phase is rotated according to an instruction of CPU 1003. The selector 1016 selects either of a signal 1062 output from the rotation circuit 1015 or a signal 1061 input to the rotation circuit 1015 and outputs the selected signal to the connector line 1005 connected to the facsimile unit 4, the connector line 1006 connected to the file unit 5, the connector line 1007 connected to the computer I/F unit, the connector line 1008 connected to the formatter unit 8, the connector line 1009 connected to the image memory unit and the selector 1017 as a signal 1063.

The signal 1063 is a synchronous 8-bit simplex video bus for transferring image information from the core unit 10 to the facsimile unit 4, the file unit 5, the computer I/F unit 7, the formatter unit 8 and the image memory unit 9. A signal 1064 is a synchronous 8-bit simplex video bus for transferring image information from the facsimile unit 4, the file unit 5, the computer I/F unit 7, the formatter unit 8 and the image memory unit 9. A video control circuit 1004 controls the above-described synchronous buses of the signals 1063 and 1064 by a signal 1056 output from the video control circuit 1004. A signal line 1054 is also connected to the connectors 1005 to 1009 respectively. The signal 1054 is a duplex 16-bit CPU bus and receives or sends asynchronous data or commands. The above-described two video buses 1063 and 1064 and CPU bus 1054 transfer information between the facsimile unit 4, the file unit 5, the computer I/F unit 7, the formatter unit 8 or the image memory unit 9 and the core unit 10.

The signal 1064 from the facsimile unit 4, the file unit 5, the computer I/F unit 7, the formatter unit 8 or the image memory unit 9 is input to the selectors 1014 and 1017. The selector 1016 inputs the signal 1064 to the rotation circuit 1015 on the next stage according to an instruction of CPU 1003.

A selector 1017 selects either of the signal 1063 or the signal 1064 according to an instruction of CPU 1003. A signal 1065 output from the selector 1017 is input to a pattern matching circuit 1018 and a selector 1019. The pattern matching circuit 1018 matches an input signal with a predetermined pattern and if they are matched, the circuit outputs a predetermined multi-valued signal to a signal line 1066. If they are not matched, the pattern matching circuit outputs an input signal 1065 to the signal line 1066.

The selector 1019 selects either of the signal 1065 or the signal 1066 according to an instruction of CPU 1003. A signal 1067 output from the selector 1019 is input to LUT 1020 on the next stage.

LUT 1020 converts an input signal depending upon characteristics of a printer when image information is output to the printer unit 2.

A selector 1021 selects either of a signal 1068 output from LUT 1020 or the signal 1065 according to an instruction of CPU 1003. A signal output from the selector 1021 is input to an enlargement circuit on the next stage.

The enlargement circuit 1022 can set a magnifying factor in the direction of the x-axis or y-axis according to an instruction of CPU 1003. As the magnifying method, primary linear interpolation is adopted. A signal 1070 output from the enlargement circuit 1022 is input to the buffer 1010.

The signal 1070 input to buffer 1010 is converted to the duplex signal 1057 according to an instruction of CPU 1003 and is sent to the printer unit 2 via the connector 1001 for printout.

The a flow of a signal between the core unit 10 and each unit will be described below.
(Operation of the core unit 10 according to information of the facsimile unit 4)

The case that information is output to the facsimile unit 4 will be described below. CPU 1003 communicates with CPU 122 of the reader unit 1 via communication IC 1002 to issue an original scanning instruction. The scanner unit 104 scans an original according to the instruction and the reader unit 1 outputs the scanned image information to a connector 120. The reader unit 1 and an external device 3 are connected via a cable and information from the reader unit 1 is input to the connector 1001 for the core unit 10. The image information input to the connector 1001 is input to the buffer 1010 through the multi-valued 8-bit signal line 1057. The buffer circuit 1010 converts the duplex signal 1057 to a simplex signal according to an instruction of CPU 1003 and inputs the signal to LUT 1011 via the signal line 1058. LUT 1011 converts image information from the reader unit 1 to a desired value using a look-up table. For example, data of the background of an original can be omitted. The signal 1059 output from LUT 1011 is input to the binarization circuit 1012 on the next stage. The binarization circuit 1012 converts the multi-valued 8-bit signal 1059 to a binary signal. The binarization circuit 1012 converts the binary signal to 00H if it is "0" and to FFH and two multi-valued signals if it is "1". A signal output from the binarization circuit 1012 is input to the rotation circuit 1015 or the selector 1016 via selectors 1013 and 1014. The signal 1062 output from the rotation circuit 1015 is also input to the selector 1016 and the selector 1016 selects either of the signal 1061 or the signal 1062. It is determined by communication by CPU 1003 with the facsimile unit 4 via CPU bus 1054 which signal is selected. The signal 1063 output from the selector 1016 is sent to the facsimile unit 4 via the connector 1005.

Next, the case that information from the facsimile unit 4 is received will be described below.

Image information from the facsimile unit 4 is transmitted to the signal line 1064 via the connector 1005. The signal 1064 is input to the selectors 1014 and 1017. If an image when received by the facsimile unit is output to the printer unit 2 according to an instruction of CPU 1003 after a phase of signals including image data is rotated, a phase of the signal 1064 input to the selector 1014 is rotated in the rotation circuit 1015. The signal 1062 output from the rotation circuit 1015 is input to the pattern matching circuit 1018 via the selectors 1016 and 1017. If image when received by the facsimile unit is output to the printer unit 2 as it is according to an instruction of CPU 1003, the signal 1064 input to the selector 1017 is input to the pattern matching circuit 1018.

The pattern matching circuit 1018 is provided with a function required for trimming noise of an image when received by the facsimile unit. A signal matched with a pattern is input to LUT 1020 via the selector 1019. A table for LUT 1029 can be modified by CPU 1003 to output an image received by the facsimile unit to the printer unit 2 from LUT 1020 at a desired density. The signal 1068 output from LUT 1020 is input to the enlargement circuit 1022 via the selector 1021. The enlargement circuit 1022 executes enlargement processing for a multi-valued 8-bit data with two values 00H and FFH by primary linear interpolation. A multi-valued 8-bit signal from the enlargement circuit 1022 is sent to the reader unit 1 via the buffer 1010 and the connector 120. The reader unit 1 inputs this signal to the external I/F switch circuit 119 via the connector 120. The external I/F switch circuit 119 inputs a signal from the facsimile unit 4 to the Y signal generation and color detection circuit 113. After a signal output from the Y signal generation and color detection circuit 113 is processed as described above, it is output to the printer unit 2 and an image is formed on output paper.
(Operation of the core unit 10 according to information from the file unit 5)

The case that information is output to the file unit 5 will be described below.

CPU 1003 communicates with CPU 122 of the reader unit 1 via the communication IC 1002 to issue an original scanning instruction. The scanner unit 104 scans an original according to this instruction and the reader unit 1 outputs the scanned image information to the connector 120. The reader unit 1 and an external device 3 are connected via a cable and information from the reader unit 1 is input to the connector 1001 in the core unit 10. Image information input to the connector 1001 is converted to the simplex signal 1058 by the buffer 1010. The signal 1058 which is a multi-valued 8-bit signal is converted to a desired signal by LUT 1011. The signal output from LUT 1011 is input to the connector 1006 via selectors 1013, 1014 and 1016.

That is, the signal output from LUT is transferred to the file unit 5 as it is a multi-valued 8-bit signal without using a function provided to the binarization circuit 1012 and the rotation circuit 1015. If a binary signal is held in a file by communication with the file unit 5 via CPU bus 1054 of CPU 1003, functions provided to the binarization circuit 1012 and the rotation circuit 1015 are used. Binarization and rotation processing is omitted because it is the same as that of the above-described facsimile data.

Next, the case that information from the file unit 5 is received will be described below.

Image information from the file unit 5 is input to the selector 1014 or the selector 1017 via the connector 1006 as the signal 1064. The image information can be input to the selector 1017 if filed as multi-valued 8-bit data and to the selector 1014 or 1017 if filed as binary data. If filed as binary data, a description of binarization processing will be omitted because it is the same as that of the above-described facsimile data.

If filed as multi-valued data, the signal 1065 output from the selector 1017 is input to LUT 1020 via the selector 1019. LUT 1020 creates a look-up table depending upon the desired printing density according to an instruction of CPU 1003. The signal 1068 output from LUT 1020 is input to the enlargement circuit 1022 via the selector 1021. The multi-valued 8-bit signal 1070 whose data is enlarged by a desired magnifying factor by the enlargement circuit 1022 is sent to the reader unit 1 via the buffer 1010 and the connector 1001. Information of the file unit sent to the reader unit 1 is output the printer unit 2 and an image is formed on output paper as described above in relation to facsimile data.

(Operation of the core unit 10 according to information from the computer I/F unit 7)

The computer I/F unit 7 interfaces with a computer connected to an external device 3. The computer I/F unit 7 is provided with plural interfaces for communicating with SCSI, RS232C and Centronics interfaces. The computer I/F unit 7 is provided with the above-described three types of interfaces and information from each interface is sent to CPU 1003 via the connector 1007 and the data bus 1054. CPU 1003 controls based upon the contents of the sent information.

(Operation of the core unit 10 according to information from the formatter unit 8)

The formatter unit 8 is provided with a function required for converting command data in a document file sent from the above-described computer I/F unit 7 to image data. If CPU 1003 judges that data from the computer I/F unit 7 via the data bus 1054 is data related to the formatter unit 8, it transfers the data to the formatter unit 8 via the connector 1008. The formatter unit 8 stores the transferred data in memory as image data for every pixel containing data of a character or a graphic form.

Next, a procedure for receiving information from the formatter unit 8 and forming an image on output paper will be described below. Image information from the formatter unit 8 is transferred to the signal line 1064 via the connector 1008 as a multi-valued signal with two values 00H and FFH. The signal 1064 is input to the selectors 1014 and 1017 to control the selectors 1014 and 1017 according to an instruction of CPU 1003. The following description will be omitted because it is the same as that of the above-described facsimile unit.

(Operation of the core unit 10 according to information from the image memory unit 9)

The case that image information read from the reader unit 1 is output to the image memory unit 9 will be described below.

CPU 1003 communicates with CPU 122 of the reader unit 1 via the communication IC 1002 to issue an original scanning instruction. The scanner unit 104 scans an original according to this instruction and the reader unit 1 outputs the scanned image information to the connector 120. The reader unit 1 and an external device are connected via a cable and image information from the reader unit 1 is input to the connector 1001 in the core unit 10. The image information input to the connector 1001 is sent to LUT 1011 via a multi-valued 8-bit signal line 1057 and the buffer 1010. The signal 1059 output from LUT 1011 transfers multi-valued image information to the image memory unit 9 via the selectors 1013, 1014 and 1016 and the connector 1009.

Next, the case that image information from the facsimile unit 4 is output to the image memory unit 9 will be described below.

Image information from the facsimile unit 4 is transferred to the signal line 1064 via the connector 1005 as a multi-valued signal with two values 00H and FFH. The signal 1064 is input to the selector 1014. The signal transferred to the selector 1014 is input to the rotation circuit 1015 or the selector 1016. The signal 1062 output from the rotation circuit 1015 is also input to the selector 1016 and the selector 1016 selects either of the signal 1061 or 1062. It is determined by communication with the facsimile unit 4 by CPU 1003 via CPU bus 1054 which signal is selected. The signal 1063 output from the selector 1016 is transferred to the image memory unit 9 via the connector 1009.

Next, the case that image information from the file unit 5 is output to the image memory unit 9 will be described below.

Image information from the file unit 5 is input to the selector 1014 via the connector 1006 as the signal 1064. The signal transferred to the selector 1014 is input to the rotation circuit 1015 or the selector 1016. The signal 1062 output from the rotation circuit 1015 is also input to the selector 1016 and the selector 1016 selects either of the signal 1061 or 1062. It is determined by communication with the file unit 5 by CPU 1003 via CPU bus 1054 which signal is selected. The signal 1063 output from the selector 1016 is transferred to the image memory unit 9 via the connector 1009.

Next, the case that data from the computer I/F unit 7 is output to the image memory unit 9 will be described below.

When CPU 1003 receives a data send request command from the computer I/F unit 7 via the connector 1007 and the data bus 1054, it outputs a data send instruction to the computer I/F unit 7 via the connector 1007. The computer I/F unit 7 transfers data to the core unit 10 via a terminal of a computer connected to it according to the instruction. The data transferred to the core unit 10 is transferred to the connector 1007. The data transferred to the connector 1007 is transferred to the image memory unit 9 via the data bus 1054 and the connector 1009.

Next, the case that image information from the formatter unit 8 is output to the image memory unit 9 will be described below.

Image information from the formatter unit 8 is transferred to the signal line 1064 via the connector 1008 as a multi-valued signal with two values 00H and FFH. The signal 1064 is input to the selector 1014. The signal transferred to the selector 1014 is input to the rotation circuit 1015 or the selector 1016. The signal 1062 output from the rotation circuit 1015 is also input to the selector 1016 and the selector 1016 selects either of the signal 1061 or 1062. It is determined by communication with the formatter unit 8 by CPU 1003 via CPU bus 1054 which signal is selected. The signal 1063 output from the selector 1016 is transferred to the image memory unit 9 via the connector 1009.

Next, the case that image information from the image memory unit 9 is output to the printer unit 2 will be described below.

The image memory unit 9 transfers the multi-valued 8-bit signal 1064 to the selectors 1014 and 1017 via the connector

1009. A signal from the selector 1014 or 1017 is output to the printer unit 2 and an image is formed on output paper according to an instruction of CPU 1003 as described above in relation to the facsimile unit.

The image memory unit 9 can also store information received from the above-described computer connected to the computer I/F unit 7 and transfer information stored in the image memory unit 9 to the computer.

If the image memory unit 9 receives information from the computer, first, the information is sent from the computer to the core unit 10 via the computer I/F unit 7. When CPU 1003 of the core unit 10 judges that data sent from the computer I/F unit 7 via CPU bus 1054 is data related to the image memory unit 9, it transfers the data to the image memory unit 9 via the connector 1009.

In the meantime, if information stored in the image memory unit 9 is transferred to the computer, first, the information stored in the image memory unit 9 is sent to CPU 1003 via the connector 1009 and CPU bus 1054. CPU 1003 transfers data sent from the image memory unit 9 to the above-described computer I/F unit 7. The computer I/F unit 7 transfers the data to the computer via a desired interface of the above-described three types of interfaces such as SCSI, RS232C and Centronics.

Information which the image memory unit 9 can communicate with the computer may be command data in addition to image information.

Next, the case that image information from the image memory unit 9 is output to the printer unit 2 will be described below.

The image memory unit 9 transfers the multi-valued 8-bit signal 1064 to the selectors 1014 and 1017 via the connector 1009. A signal output from the selector 1014 or 1017 is output to the printer unit 2 and an image is formed on output paper according to an instruction of CPU 1003 as described above in relation to the facsimile unit.

The image memory unit 9 can also store information received from the above-described computer 12 connected to the computer I/F unit 7 and transfer the information stored in the image memory unit 9 to the computer 12.

If the image memory unit 9 receives information from the computer 12, first, information is sent from the computer 12 to the core unit 10 via the computer I/F unit 7. When CPU 1003 of the core unit 10 judges that data sent from the computer I/F unit 7 via CPU bus 1054 is data related to the image memory unit 9, it transfers the data to the image memory unit 9 via the connector 1009.

In the meantime, if information stored in the image memory unit 9 is transferred to the computer 12, first, the information stored in the image memory unit 9 is sent to CPU 1003 via the connector 1009 and CPU bus 1054. CPU 1003 transfers data sent from the image memory unit 9 to the above-described computer I/F unit 7. The computer I/F unit 7 transfers the data to the computer 12 via a desired interface of the above-described three types of interfaces such as SCSI, RS232C and Centronics.

Information which the image memory unit 9 can communicate with the computer 12 is not limited to image information.

Next, the case that image information from the image memory unit 9 is output to the facsimile unit 4 will be described below.

The image memory unit 9 transfers a video signal 1064 to the selector 1014 via the connector 1009. The signal transferred to the selector 1014 is input to the rotation circuit 1015 or the selector 1016. A signal output from the rotation circuit 1015 is also input to the selector 1016 and the selector 1016 selects either of the signal 1061 or 1062. It is determined by communication with the facsimile unit 4 by CPU 1003 via CPU bus 1054 which signal is selected. The signal 1063 output from the selector 1016 is sent to the facsimile unit 4 via the connector 1005.

Next, the case that image information from the image memory unit 9 is output to the file unit 5 will be described below.

The image memory unit 9 transfers a video signal 1064 to the selector 1014 via the connector 1009. The signal transferred to the selector 1014 is input to the rotation circuit 1015 or the selector 1016. The signal 1062 output from the rotation circuit 1015 is also input to the selector 1016 and the selector 1016 selects either of the signal 1061 or 1062. It is determined by communication with the file unit 5 by CPU 1003 via CPU bus 1054 which signal is selected. The signal 1063 output from the selector 1016 is sent to the file unit 5 via the connector 1006.

Next, the case that data from the image memory unit 9 is output to a terminal of the computer 12 connected to the computer I/F unit 7 will be described below.

First, data from the image memory unit 9 is input to the core unit 10 via the connector 1009. The data input to the core unit 10 is output to the computer I/F unit 7 via the data bus 1054 and the connector 1007.

(Description of the facsimile unit 4)

Figure 5:
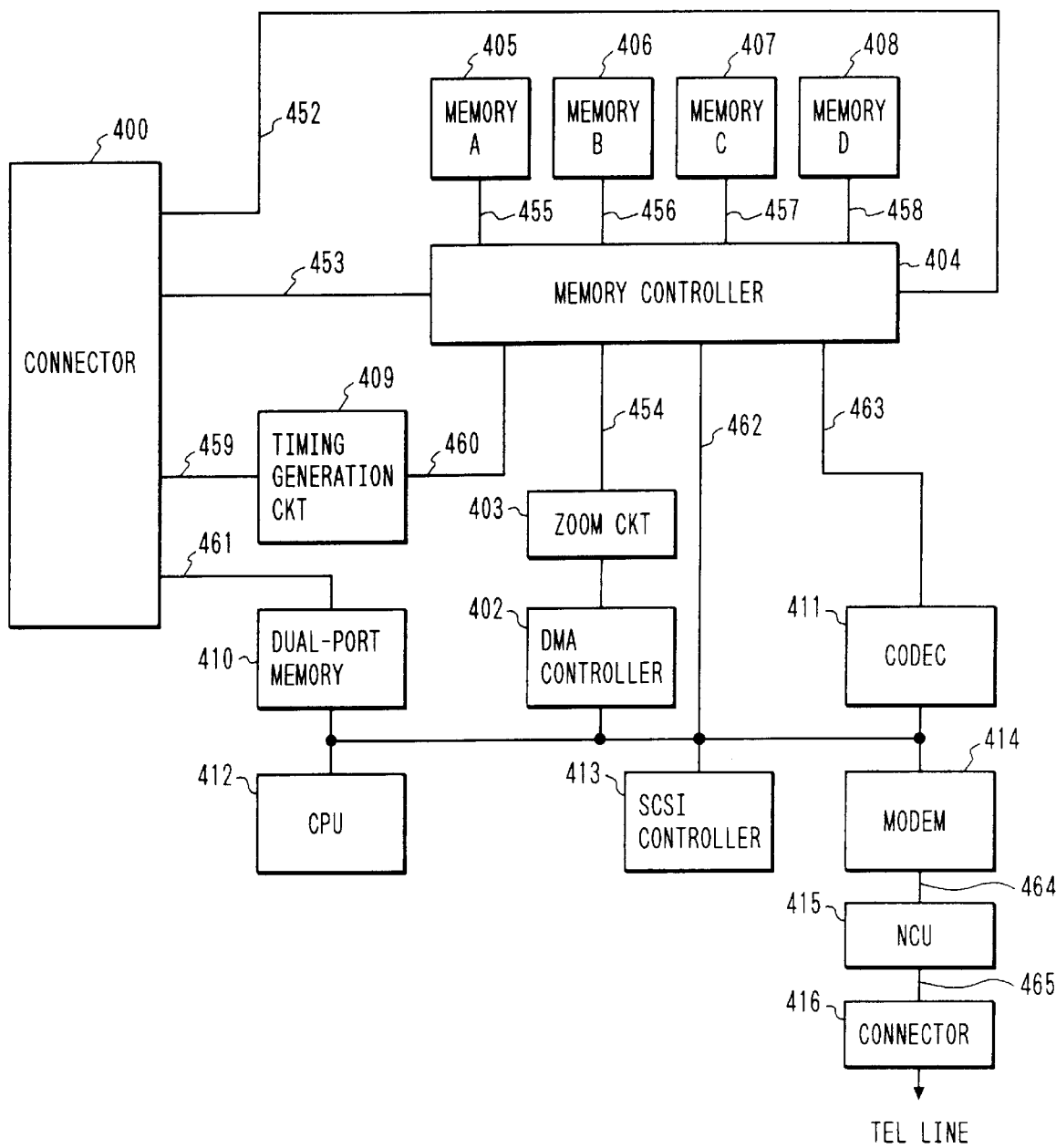
FIG. 5 shows a block diagram of a facsimile unit 4.

FIG. 5 is a block diagram showing the detailed configuration of the facsimile unit 4.

The facsimile unit 4 is connected to the core unit 10 via a connector 400 to receive or send signals. If binary information from the core unit 10 is stored in any of memory A 405 to memory D 408, a signal 453 from the connector 400 is input to a memory controller 404 and is stored in any of the memories A 405, B 406, C 407 and D 408 or two pairs of cascaded memories under control of the memory controller.

The memory controller 404 is provided with five functions comprising a mode in which data is received or sent between the memories A 405, B 406, C 407 and D 408, and CPU bus 462, a mode in which data is received or sent from/to CODEC 411 for encoding or decoding via CODEC bus 463, a mode in which the contents of the memories A 405, B 406, C 407 and D 408 are received or sent from/to a zoom circuit 403 via a bus 454 under the control of DMA controller 402, a mode in which input binary image data 454 is stored in any of the memories A 405 to D 408 under the control of a timing generation circuit 409 and a mode in which the contents of any of the memories A 405 to D 408 are read and output to a signal line 452.

The memories A 405, B 406, C 407 and D 408 are provided with the capacity of 2M bytes, respectively, and respectively, can store an image equivalent of the paper size of A4 at the resolution of 400 dpi. The timing generation circuit 409 is connected to the connector 400 via a signal line 459 and is activated by control signals from the core unit 10 such as HSYNC, HEN, VSYNC and VEN to generate signals for achieving the following two functions. One function stores a video signal from the core unit 10 in any or two of the memories A 405 to D 408 and another reads a video signal from any of the memories A 405 to D 408 and transfers it to the signal line 452. Dual-port memory 410 is connected to CPU 1003 of the core unit 10 via a signal line 461 or to CPU 412 of the facsimile unit 4 via the signal line 462. Each CPU receives or sends commands via the dual-port memory 410. SCSI controller 413 interfaces with hard disk connected to the facsimile unit 4 shown in FIG. 1. The hard disk stores data when facsimile information is sent or received. After CODEC 411 reads image information stored in any of the memories A 405 to D 408 and encodes it by a desired coding of MH, MR and MMR, CODEC stores the encoded information in any of the memories A 405 to D 408. After CODEC reads the encoded information stored in any of the memories A 405 to D 408 and decodes it by a desired coding of MH, MR and MMR, CODEC stores it in any of the memories A 405 to D 408 as decoded information, that is, image information. MODEM 414 modulates encoded information from the hard disk connected to CODEC 411 or SCSI controller 413 to transmit it on a telephone line, demodulates information sent from NCU 415 to convert it to encoded information and transfers the encoded information to the hard disk connected to CODEC 411 or SCSI controller 413. NCU 415 is directly connected to the telephone line and receives or sends information from/to a switching system provided in a central office according to a predetermined procedure.

An embodiment in relation to sending facsimile information will be described below. A binary video signal from the reader unit 1 is sent to the memory controller 404 via the connector 400 and the signal line 453. The signal 453 is stored in the memory A 405 by the memory controller 404. Timing for storing it in the memory A 405 is generated in the timing generation circuit 409 according to a timing signal 459 from the reader unit 1. CPU 412 connects the memories A 405 and B 406 under the memory controller 404 to the bus line 463 to CODEC 411. CODEC 411 reads image information from the memory A 405, encodes it by MR coding and writes the encoded information to the memory B 406. When CODEC 411 encodes image information equivalent to the paper size of A4, CPU 412 connects the memory B 406 to CPU bus 462 via the memory controller 404. CPU 412 sequentially reads encoded information from the memory B 406 and transfers it to MODEM 414. MODEM 414 modulates the encoded information and sends facsimile information to the telephone line via NCU.

Next, an embodiment in relation to receiving facsimile information will be described below. Information sent on the telephone line is input to NCU 415 and is sent to the facsimile unit 4 by NCU 415 according to a predetermined procedure. Information from NCU 415 is sent to MODEM 414 and is demodulated there. CPU 412 stores information from MODEM 414 in the memory C 407 via CPU bus 462. When information equivalent to one screen is stored in the memory C 407, CPU 412 connects a data line 457 for the memory C 407 to the line 463 to CODEC 411 by controlling the memory controller 404. CODEC 411 sequentially reads encoded information stored in the memory C 407 and stores it in the memory D 408 as decoded, that is, image information. CPU 412 communicates with CPU 1003 of the core unit 10 via the dual-port memory 410 and specifies for outputting image from the memory D 408 to the printer unit 2 via the core unit. When setting is completed, CPU 412 activates the timing generation circuit 409 to output a predetermined signal to the memory controller via a signal line 460. The memory controller 404 reads image information from the memory D 408 in synchronization with a signal from the timing generation circuit 409, transfers it to the signal line 452 and outputs it to the connector 400. A description of transferring image information from the connector 400 to the printer unit 2 will be omitted because it is the same as description in relation to the core unit.

(Description of the file unit 5)

Figure 6:
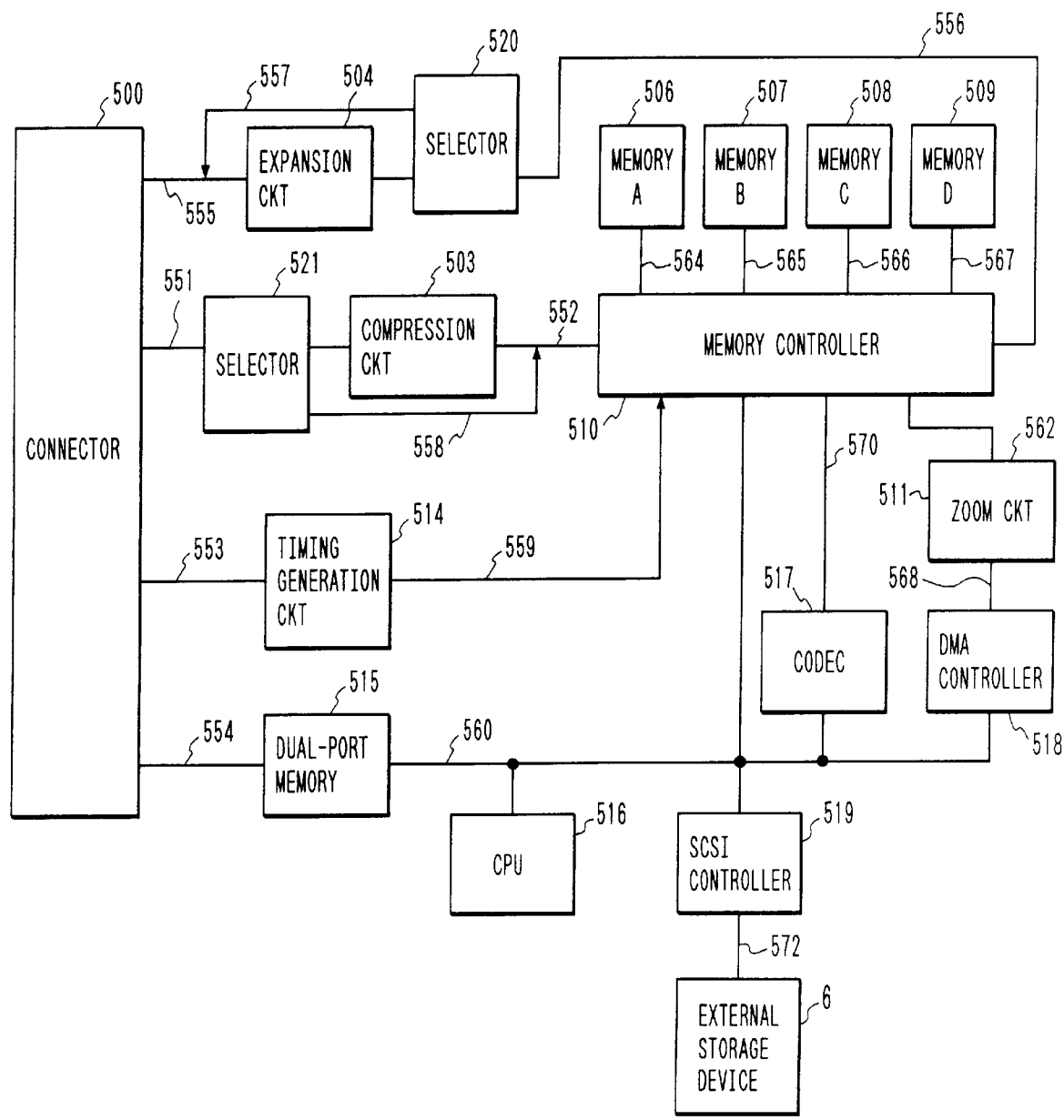
FIG. 6 shows a block diagram of a file unit 5.

FIG. 6 is a block diagram showing the detailed configuration of the file unit 5 and the configuration and operation will be described below referring to FIG. 6.

The file unit 5 is connected to the core unit 10 via a connector 500 to receive or send signals. An input video signal 551 is input to a selector 521. If the input video signal 551 is multi-valued image data for which no compression processing is performed, the selector 521 is switched and the input video signal is input to a compression circuit 503 by the judgment of CPU 516. The multi-valued video signal input to the compression circuit 503 is converted to compressed information and is output a memory controller 510. In the meantime, if the selector 521 selects a signal 558, the signal is output to the memory controller 510 without compression processing. A signal 552 is stored in any of memories A 506, B 507, C 508 and D 509 or two pairs of cascaded memories under the control of the memory controller 510.

The memory controller 510 is provided with five functions comprising a mode in which data is received or sent between the memories A 506, B 507, C 508 or D 509, and CPU bus 560, a mode in which mode in which data is received or sent from/to CODEC 517 for encoding or decoding via CODEC bus 570, a mode in which the contents of the memories A 506, B 507, C 508 and D 509 are received or sent from/to a zoom circuit 511 via a bus 562 under control of DMA controller 518, a mode in which a signal 563 is stored in any of the memories A 506 to D 509 under control of a timing generation circuit 514, and a mode in which the contents of any of the memories A 506 to D 509 are read and output to a signal line 558.

The memories A 506, B 507, C 508 and D 509 are provided with the capacity of 2M bytes respectively and respectively, can store an image equivalent of the paper size of A4 at the resolution of 400 dpi. The timing generation circuit 514 is connected to the connector 500 via a signal line 553 and is activated by control signals from the core unit 10 such as HSYNC, HEN, VSYNC and VEN to generate signals for achieving the following two functions. One function stores information from the core unit 10 in any or two of the memories A 506 to D 509 and another reads the upper data of an image from any of the memories A 506 to D 509 and transfers it to the signal line 556. Dual-port memory 515 is connected to CPU 1003 of the core unit 10 via a signal line 556 or to CPU 516 of the file unit 5 via the signal line 560. Each CPU receives or sends commands via the dual-port memory 515. SCSI controller 519 interfaces with an external storage device 6 connected to the file unit 5 shown in FIG. 1. The external storage device 6 is constituted by optical magnetic disks in concrete and stores data, such as image information. After CODEC 517 reads image information stored in any of the memories A 506 to D 509 and encodes it by a desired coding of MH, MR and MMR, CODEC stores the encoded information in any of the memories A 506 to D 509. After CODEC reads the encoded information stored in any of the memories A 506 to D 509 and decodes it by a desired coding of MH, MR and MMR, CODEC stores it in any of the memories A 506 to D 509 as decoded information, that is, image information.

An embodiment in relation to storing file information in the external storage device 6 will be described below. A video signal from the core unit 10 is input from the connector 500 and is sent to a selector 521 via a signal line 551. If an input video signal 551 is multi-valued image data for which compression processing is not executed, the selector 521 is switched according to the judgment of CPU 516 and the input video signal is input to a compression circuit 503. The multi-valued video signal input to the compression circuit 503 is converted to compression information and is input to the memory controller 510. In the meantime, if the selector 521 selects a signal 558, the signal is input to the memory controller 510 without compression processing. The memory controller 510 generates a timing signal 559 in a timing generation circuit 559 according to a signal 553 from the core unit 10 and stores a compressed signal 552 in the memory A 506 according to the above-described signal. CPU 516 connects the memories A 506 and B 507 to the bus line 570 to CODEC 517 via the memory controller 510. CODEC 517 reads compressed information from the memory A 506, encodes it by MR coding and writes the encoded information in the memory B 507. When CODEC 517 completes encoding, CPU 516 connects the memory B 507 to CPU bus 560 via the memory controller 510. CPU 516 sequentially reads encoded information from the memory B 507 and transfers it to SCSI controller 519. SCSI controller 519 stores the encoded information to an external storage device 6.

Next, an embodiment in relation to fetching information from an external storage device 6 and outputting it to the printer unit 2 and the image memory unit 9 will be described below. When receiving a command for retrieval and printing of information, CPU 516 receives encoded information from an external storage device 6 via SCSI controller 519 and transfers the encoded information to the memory C 508. At this time, the memory controller 510 connects CPU bus 560 to a bus 566 to the memory C 508 according to an instruction of CPU 516. When transfer of the encoded information to the memory C 508 is completed, CPU 516 connects the memories C 508 and D 509 to the bus 570 to CODEC 517 by controlling the memory controller 510. After CODEC 517 reads encoded information from the memory C 508 and sequentially decodes it, CODEC transfers the decoded information to the memory D 509. If a zoom operation, such as enlargement and reduction, is required for outputting the information to the printer unit 2 and the image memory unit 9, the memory D 509 is connected to a zoom circuit 511 via a bus 562 to perform a zoom operation on the contents of the memory D 509 under the control of DMA controller 518. CPU 516 communicates with CPU 1003 of the core unit 10 via dual-port memory 515 and specified for outputting an image from the memory D 509 to the printer unit 2 via the core unit 10. When setting is completed, CPU 516 activates a timing generation circuit 514 and outputs a predetermined timing signal to the memory controller 510 via a signal line 559. The memory controller 510 reads encoded information from the memory D 509 and transfers the encoded information to a signal line 556 in synchronization with a signal from the timing generation circuit 514. The signal line 556 is input to the selector 521 to judge whether compression processing is executed in a compression circuit 503 for the encoded information when stored in the file unit 5 as file information. CPU 516 judges it and if image information is compressed in the compression circuit 503, the information is output via a signal line 555 after the information is expanded in an expansion circuit 504. If the information is not compressed in the compression circuit 503, the image information is output by a signal 557 via the signal line 555. The signal 555 is output to the core unit 10 via the connector 500. A description of the output to the printer unit 2 and the image memory unit 9 from the connector 500 will be omitted because it is the same as that in relation to the core unit 10.

(Description of the computer I/F unit 7)

Figure 7:
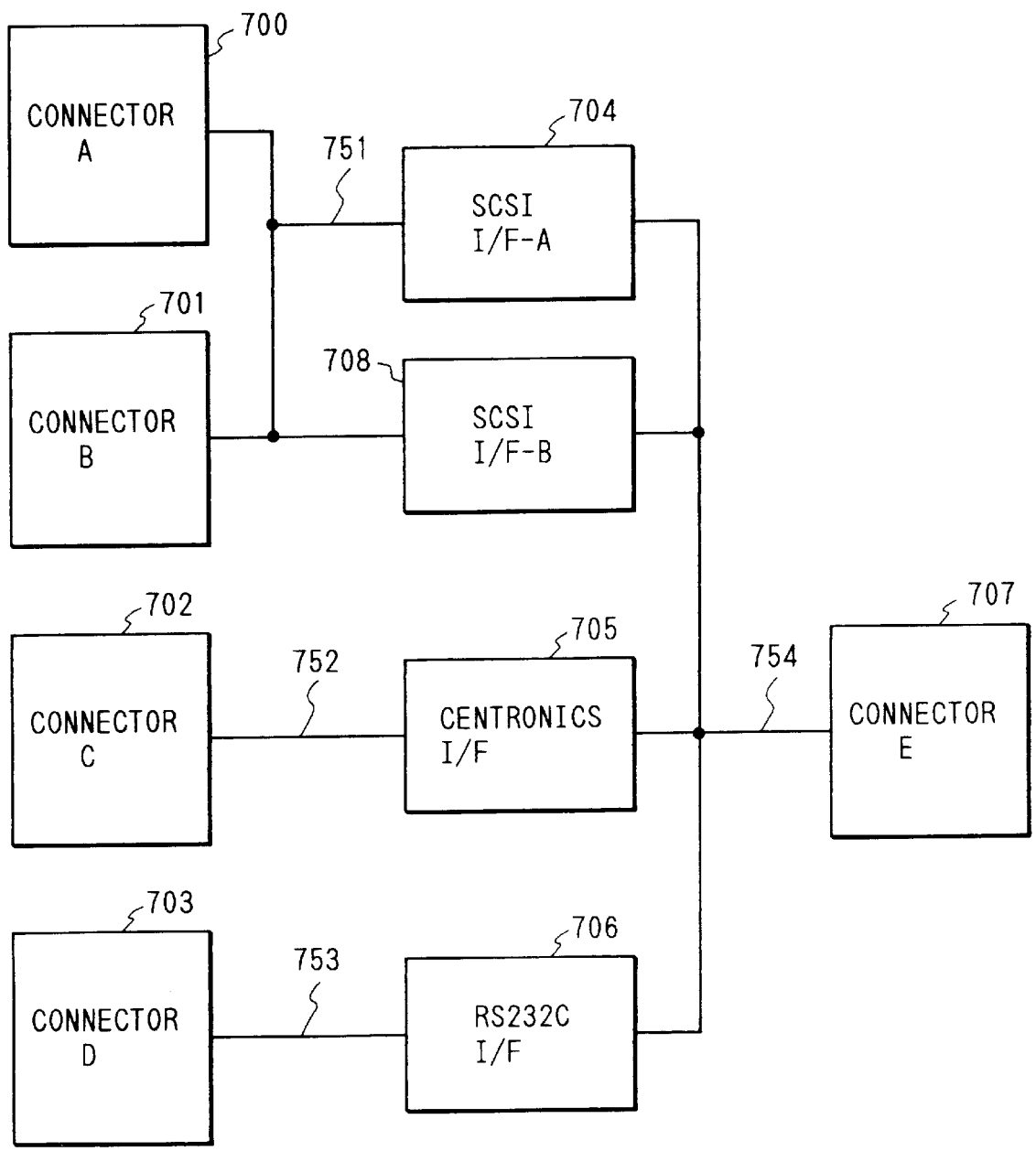
FIG. 7 shows a block diagram of a computer I/F unit 7.

FIG. 7 is a diagram explaining the computer I/F unit 7.

Connectors A 700 and B 701 are dedicated to a SCSI interface. A connector C 702 is dedicated to a Centronics interface. A connector D 703 is dedicated to an RS232C interface. A connector E 707 is dedicated to the core unit 10.

A SCSI interface is provided with two connectors, connectors A 700 and B 701 and if a device provided with plural SCSI interfaces is connected, connectors A 700 and B 701 are cascaded. If one external device 3 and one computer are connected, the connector A 700 and the computer are connected via a cable and a terminator is connected to the connector B 701. Or the connector B 701 and the computer are connected via a cable and a terminator is connected to the connector A 700. Information input from the connector A 700 or B 701 is input to SCSI I/F-A 704 or SCSI I/F-B 708 via a signal line 751. SCSI I/F-A 704 or SCSI I/F-B 708 outputs data to the connector E 707 via a signal line 754 after a procedure is performed relating to the protocol of the SCSI. The connector E 707 is connected to CPU bus 1054 of the core unit 10 and CPU 1003 of the core unit 10 receives information input to the connectors A 700 and B 701 for SCSI interface from CPU bus 1054. If data from CPU 1003 of the core unit 10 is output to the connectors A 700 and B 701 for the SCSI interface, a procedure opposite to the above-described procedure is complied with.

A Centronics interface is connected to the connector C 702 and data is input to Centronics I/F 705 via a signal line 752. Centronics I/F 705 receives data according to a predetermined procedure for protocol and outputs the data to the connector E 707 via a signal line 754. The connector E 707 is connected to CPU bus 1054 of the core unit 10 and CPU 1003 of the core unit 10 receives information input to the connector C 702 for the Centronics interface from CPU bus 1054.

The RS232C interface is connected to the connector D 703 and data is input to RS232C I/F 706 via a signal line 753. RS232C I/F 706 receives data according to a predetermined procedure for protocol and outputs the data to the connector E 707 via the signal line 754. The connector E 707 is connected to CPU bus 1054 of the core unit 10 and CPU 1003 of the core unit 10 receives information input to the connector D 703 for RS232C interface from CPU bus 1054. If data from CPU 1003 of the core unit 10 is output to the connector D 703 for the RS232C interface, a procedure opposite to the above-described procedure is complied with.

(Description of the formatter unit 8)

Figure 8:
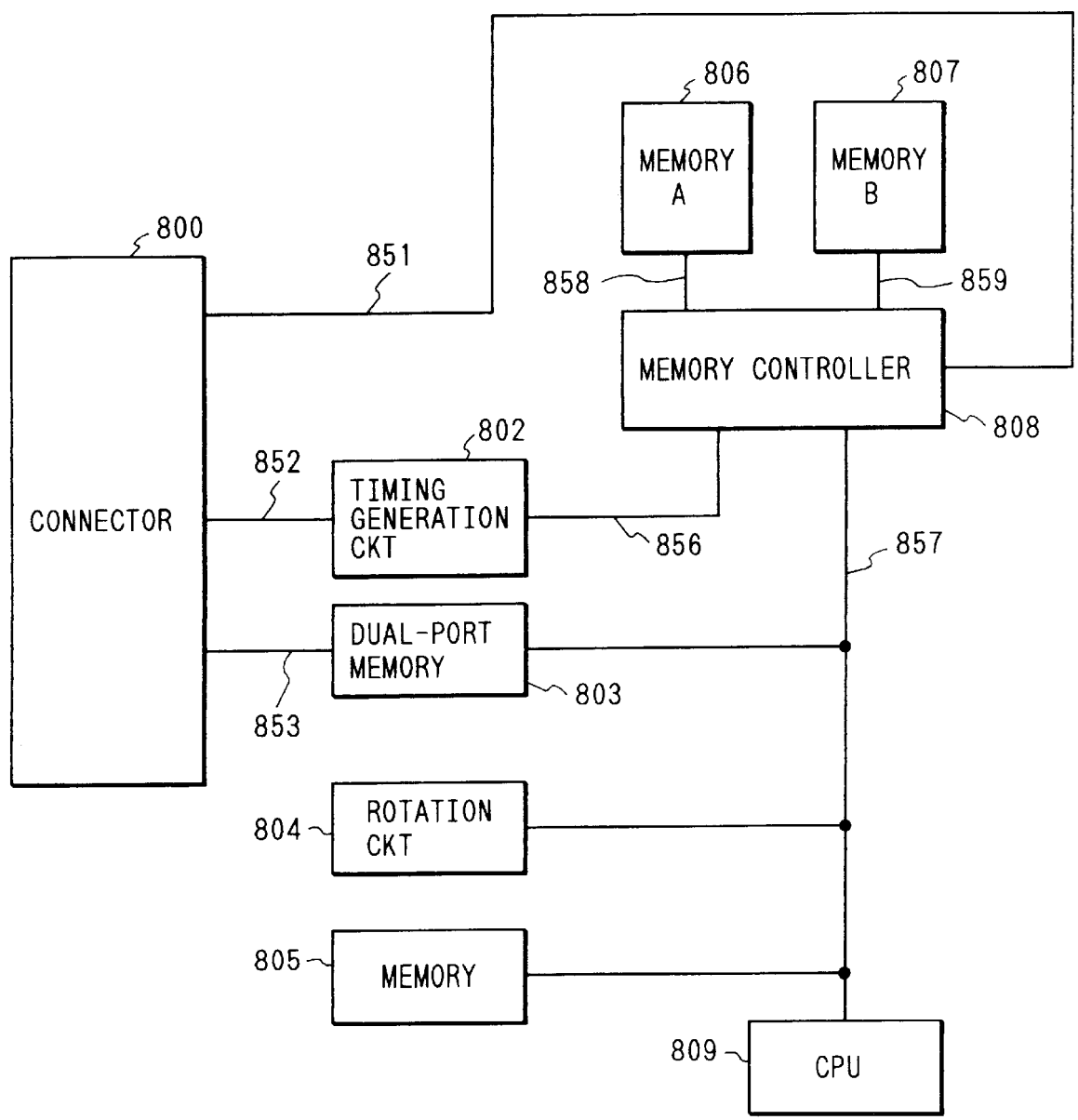
FIG. 8 shows a block diagram of a formatter unit 8.

FIG. 8 is a block diagram showing the configuration of the formatter unit 8. The configuration and operation of the formatter unit 8 will be described below referring to FIG. 8.

Data from the computer I/F unit 7 as described above is discriminated in the core unit 10 and if the data is related to the formatter unit 8, CPU 1003 of the core unit 10 transfers the data from a computer to dual-port memory 803 via the connector 1008 of the core unit 10 and the connector 800 of the formatter unit 8. CPU 809 of the formatter unit 8 receives coded data sent from a computer via the dual-port memory 803. CPU 809 sequentially converts the coded data to image data and transfers the image data to the memory A 806 to B 807 via the memory controller 808. The memories A 806 and B 807 are provided with the capacity of 1M bytes respectively and each of the memories A 806 and B 807 can store image data equivalent to the paper size of A4 at the resolution of 300 dpi. The memories A 806 and B 807 are required to be cascaded to store image data equivalent to the paper size of A3 at the resolution of 300 dpi. The memory controller 808 controls the above-described memories according to an instruction of CPU 809. If a character or a graphic form is required to be rotated when image data is stored, the data rotated in the rotation circuit 804 is transferred to the memory A 806 or B 807. When the image data is stored in the memory A 806 or B 807, CPU 809 connects a data bus line 858 for the memory A 806 or a data bus line 859 for the memory B 807 to an output line 855 for the memory controller 808 by controlling the memory controller 808. Next, CPU 809 communicates with CPU 1003 of the core unit 10 via the dual-port memory 803 and specifies the outputting of image information from the memory A 806 or B 807 to either the printer unit 2 or the image memory unit 9.

CPU 1003 of the core unit 10 activates a timing generation circuit 802 via the connector 1008 and the connector 800 of the formatter unit 8. The timing generation circuit 802 generates a timing signal for reading image information from the memory A 806 or B 807 to the memory controller 808 according to a signal from the core unit 10. The image information from the memory A 806 or B 807 is input to the memory controller 808 via the signal line 858. Image information output from the memory controller 808 is transferred to the core unit 10 via a signal line 851 and the connector 800. A description of the output from the core unit 10 to the printer unit 2 will be omitted because it is the same as the description in relation to the core unit 10.

(Description of the image memory unit 9)

Figure 9:
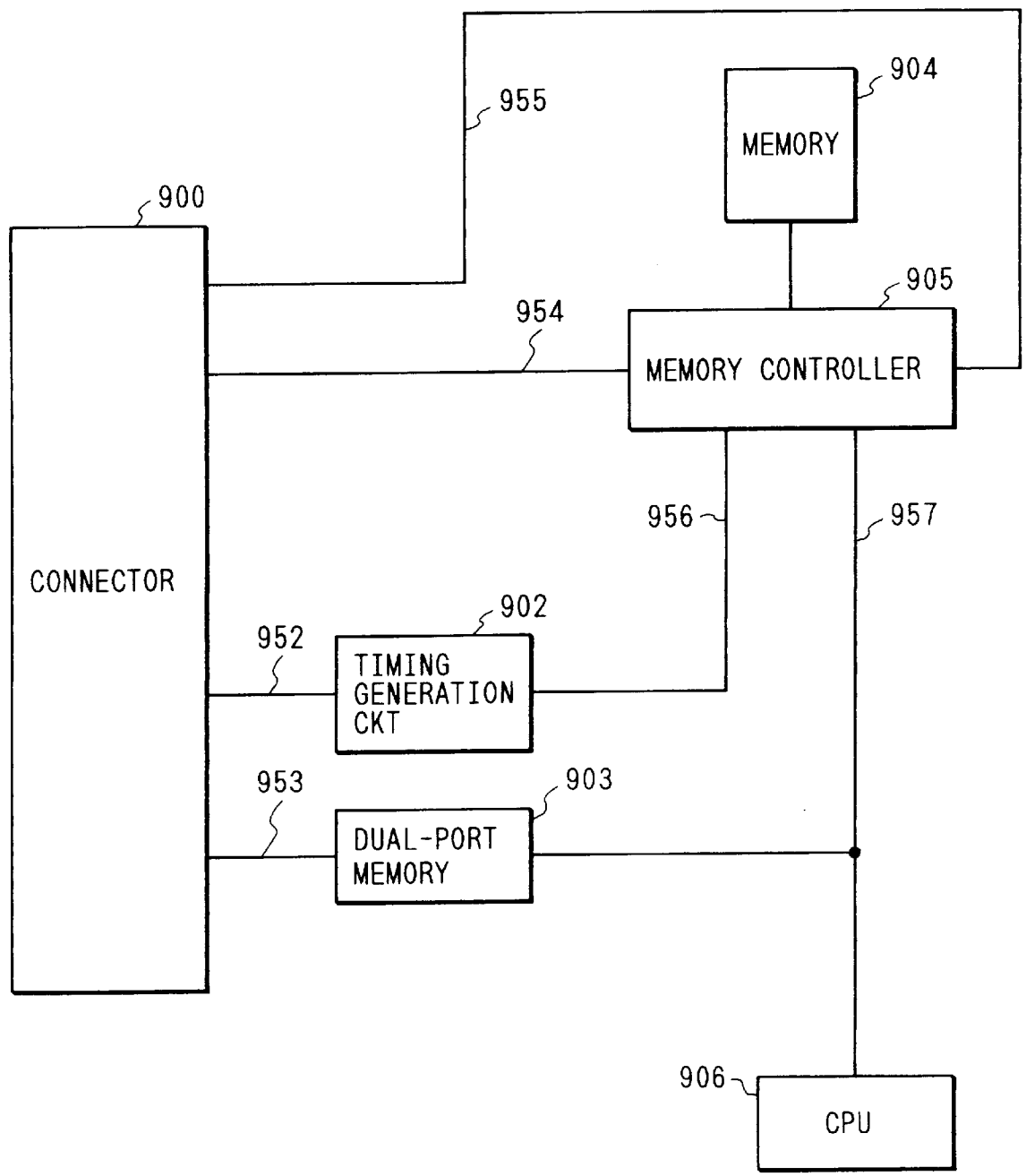
FIG. 9 shows a block diagram of an image memory unit 9.

The configuration and operation of the image memory unit 9 will be described below referring to the block diagram, FIG. 9.

The image memory unit 9 is connected to the core unit 10 via a connector 900 to receive or send signals. An input signal 954 is stored in memory 904 under control of a memory controller 905. The memory controller 905 is provided with three functions and operates in a mode in which data is received or sent from/to the memory 904 and CPU bus 957 according to an instruction of CPU 906, a mode in which a signal 954 is stored in the memory 904 under the control of a timing generation circuit 902, and a mode in which the contents of the memory 904 are read from the memory 904 and are output to the signal line 955.

The memory 904 is provided with a work memory of sufficient capacity to enable the execution of image processing, binarization processing, image compression processing and block selection processing described later in addition to a memory capacity of 32M bytes which can store an image equivalent to the paper size of A3 with 256 scales at the resolution of 400 dpi. A timing generation circuit 902 is connected to the connector 900 via a signal line 952, is activated by a control signal such as HSYNC, HEN, VSYNC and VEN from the core unit 10 and generates a signal for achieving the following two functions. One function is provided to store information from the core unit 10 in the memory 904 and another is provided to read information from the memory 904 and transfer it to the signal line 955. The dual-port memory 903 is connected to CPU 1003 of the core unit 10 via a signal line 953 and to CPU 906 of the image memory unit 9 via a signal line 957. Each CPU receives or sends commands each other via the dual-port memory 903.

An embodiment in relation to storing image information input from the core unit 10 in the image memory unit 9 will be described below. Image information input from the core unit 10 is equal to information transferred from any of the reader unit 1, the facsimile unit 4, the file unit 5 and the formatter unit 8 to the core unit 10. First, CPU 906 controls the memory controller 905 to connect CPU bus 954 to a bus of the memory 904. Image information of the core unit 10 transferred from any of the reader unit 1, the facsimile unit 4, the file unit 5 and the formatter unit 8 is input from the connector 900 and is input to the memory controller 905 via a signal line 954. The memory controller 905 lets the timing generation circuit 902 generate a timing signal 956 according to a signal from the core unit 10 and stores the signal 954 in the memory 904 according to the signal.

Next, an embodiment in relation to storing data input from an external computer terminal connected to the computer I/F unit 7 in the image memory unit 9 via the core unit 10 will be described below. Data received by the core unit 10 from the external computer terminal is input to the image memory unit 9 as described in detail in the description of the core unit 10. The data input to the image memory unit 9 is transferred to the dual-port memory 903 via the connector 900. The data transferred to the dual-port memory 903 is sequentially read by CPU 906 after CPU 906 of the image memory unit 9 connects the memory 904 under control of the memory controller 905 to CPU bus 957 and the data is stored in the memory 904 via the memory controller 905.

Next, an embodiment in relation to outputting image information stored in the memory 904 of the image memory unit 9 to the core unit 10 will be described below. Image information output to the core unit 10 is transferred to any of the printer unit 2, the facsimile unit 4 and the file unit 5. First, CPU 906 controls the memory controller 905 to connect a data line of the memory 904 to the signal line 955. CPU 906 communicates with CPU 1003 of the core unit 10 via the dual-port memory 903 and specifies the outputting of the image information to any of the printer unit 2, the facsimile unit 4 and the file unit 5 from the memory 904 via the core unit 10. When setting is completed, CPU 906 activates the timing generation circuit 902 to output a predetermined timing signal to the memory controller 905 via the signal line 956. The memory controller 905 reads image information from the memory 904, and transfers the information to the signal line 955 for outputting the information to the connector 900 in synchronization with a signal from the timing generation circuit 902. A description of output of image information from the connector 900 to the printer unit 2, the facsimile unit 4 or the file unit 5 will be omitted because it is the same as the description in relation to the core unit 10.

Next, an embodiment in relation to outputting data stored in the memory 904 of the image memory unit 9 to an external computer terminal connected to the computer I/F unit 7 via the core unit 10 will be described below. First, CPU 906 connects the memory 904 under the memory controller 905 to CPU bus 957. CPU 906 sequentially reads image information from the memory 904 and transfers the information to the dual-port memory 903. CPU 1003 of the core unit 10 reads the image information transferred to the dual-port memory 903 of the image memory unit 9 via the signal line 953 and the connector 900 and transfers the information to the computer I/F unit 7. A description of transferring of information from the computer I/F unit 7 to a computer will be omitted because it is described above.

CPU 906 of the image memory unit 9 is also provided with a function for executing image processing for a partial area of a multi-valued image stored in the memory 904. The above-described image processing includes edge emphasis processing, contour emphasis processing, patterning processing, masking/trimming processing, fatting processing, shading processing, negative/positive inversion processing, italicizing processing, mirroring processing and half-tone dot meshing processing. In the above-described processing, different types of image processing can be specified for plural partial areas respectively. Therefore, an image can be formed by combining images processed by plural types of image processing for every partial area. An image obtained as a result of the processing can be stored in the memory 904 again.

CPU 906 of the image memory unit 9 is also provided with a function for executing binarization processing for a partial area in a multi-valued image stored in the memory 904. Binarization processing of an image by CPU 906 includes methods of simple binarization and error diffusion. As the above-described image processing, different types of binarization processing can be specified for plural partial areas respectively. Therefore, a binary image can be formed by combining an image processed by the above-described two types of binarization every partial area. An image can be formed by combining a binary image and a multi-valued image every partial area (hereinafter called a mixed binary and multi-valued image). An image obtained as a result of this processing can be stored in the memory 904 again.

CPU 906 of the image memory unit 9 is also provided with a function for executing image compression processing for a binary image, a multi-valued image and a mixed binary and multi-valued image. Image compression processing by CPU 906 includes at least compression by so called dynamic arithmetic coding of the Joint Bi-level Imaging Group (JBIG) which is a compression method for a binary image and compression by so called ADCT of Joint Photographic Experts Group (JPEG), which is a compression method for a multi-valued image. Compressed image data can be created by performing JBIG compression for a binary image portion comprising characters and performing JPEG compression for a multi-valued image portion comprising a photograph and so on, in a mixed binary and multi-valued image.

CPU 906 of the image memory unit 9 is also provided with a function for executing block selection processing, which is processing for classifying an image stored in the memory 904 into any of an attribute of a partial area in the image, that is, a character, title, a frame line, a table, a half-tone graphic form, a linear graphic form, and a line.

An embodiment in relation to block selection processing in the image memory unit 9 will be described in detail below.

First, image data for block selection processing is stored in the memory 904. The image data may be read from the reader unit 1 or may be transferred from a computer 12 connected to the computer I/F unit 7. However, image data for block selection processing according to this embodiment shall be binary image data. If image data is multi-valued image data read from the reader unit 1 or if image data, transferred from a computer 12 connected to the computer I/F unit 7, is multi-valued image data, the image data is required to be stored in the memory 904 after the image data is binarized in the binarization circuit 1012. If block selection processing is executed for multi-valued image data stored in the memory 904 of the image memory unit 9 beforehand, the image data is required to be stored in the memory 904 after the multi-valued image data is binarized using a function for binarization processing provided to CPU 906.

Block selection processing is executed for binary image data stored in the memory 904 by performing the operations as described above. An algorithm of block selection processing will be described in detail below.

Figure 10:
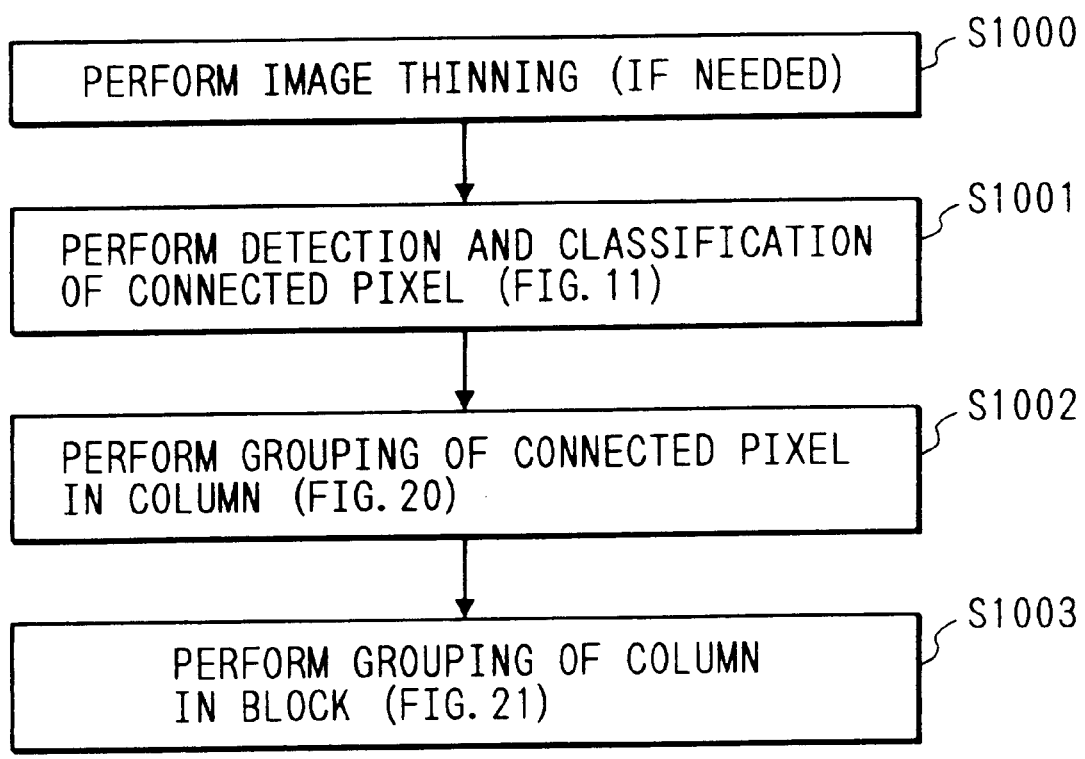
FIG. 10 shows a rough flowchart of block selection algorithm.

FIG. 10 shows a rough flowchart of block selection processing.

If the speed of block selection processing is to be accelerated, image data is thinned in S1000. If image data is thinned, block selection processing is executed for thinned images.

Image data is thinned by checking whether black pixels are connected in a block with the size of "m pieces of pixels×m pieces of pixels". For example, if two pairs of connected black pixels exist in a pixel block with the size of "3×3", black pixels in the pixel block of "3×3" are thinned to one. On the contrary, if two pairs of connected white pixels exist in the block, white pixels in the block are thinned to one.

Figure 11:
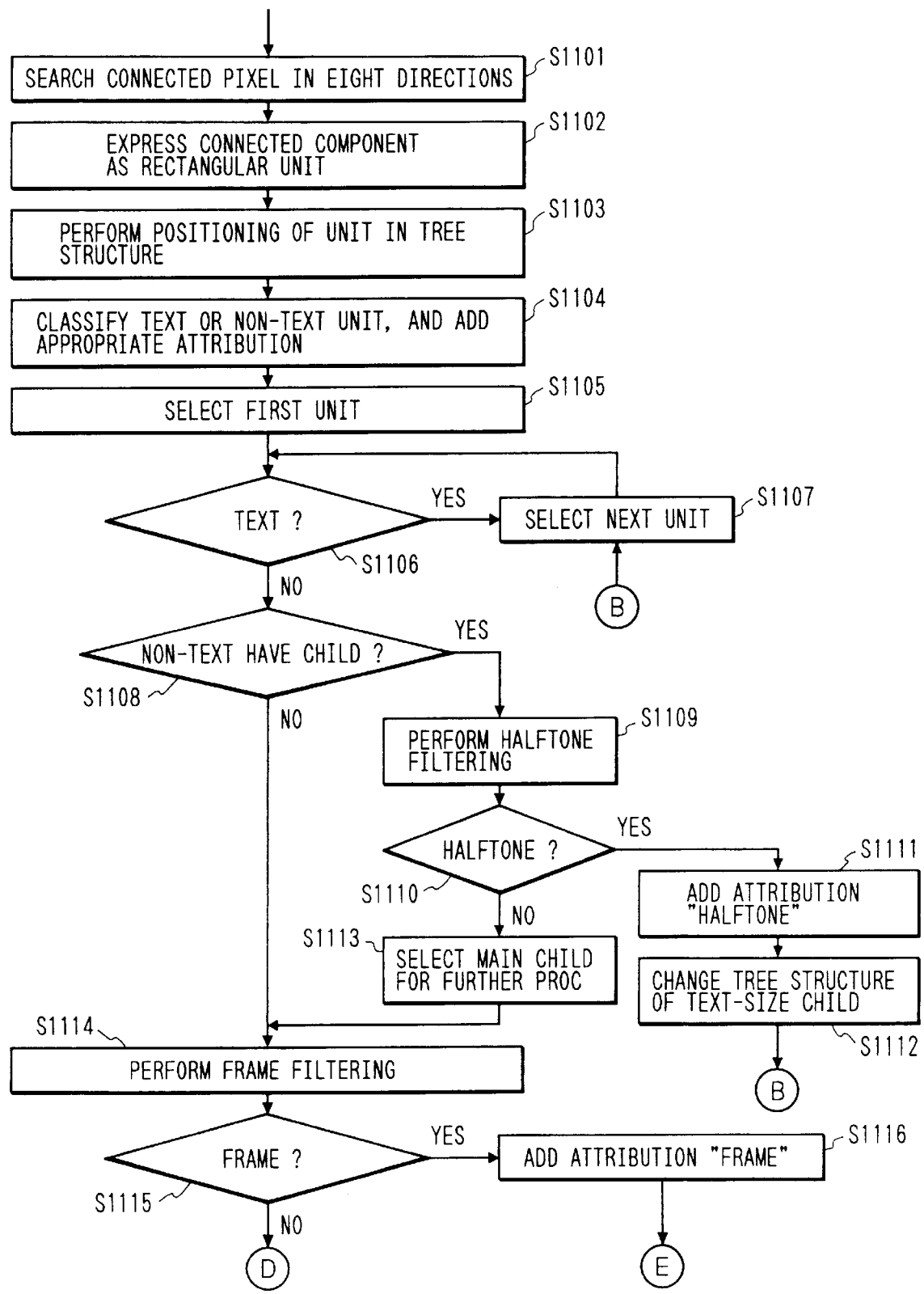
FIG. 11 shows a detailed flowchart of a step S1001.

In S1001, the image of a pixel is analyzed, a connection is searched and pixels are classified in consideration of the relative location of size and other connected components. The phrase "one connected" component means a set of black pixels surrounded by white pixels completely. Therefore, one black connected component is completely separated from other black pixel connected components by at least one white pixel. Referring to FIG. 11, the details of S1001 will be described. However, roughly speaking, in S1001, connected components are searched and are classified based upon some statistical information obtained from information of size and connected components. When classified, first, each connected component is classified into a text unit and a non-text unit. A non-text unit is further analyzed in detail and it is determined that the non-text unit is data with a frame structure, a half-tone image, a line, a table or text data in a table format. If the non-text unit is unknown, classification is not performed. Configuration data of connected components is given and a hierarchical tree structure is created for each connected component to facilitate restructuring of the data.

In S1002, adjacent connected components are grouped if no gap line exists between them. Adjacent connected components are grouped both in the vertical and horizontal directions. It depends on whether a text unit to be grouped is a column or a row. The distance between connected components adjacent in both directions is checked both vertically and horizontally beforehand, and if the distance in the horizontal direction is smaller, connected components are grouped horizontally and if the distance in the vertical direction is smaller, they are grouped vertically. The tree structure generated in S1001 is used for preventing text and non-text from being mixed inadequately. Further, in S1002, it is determined whether a text unit is grouped into a column by detecting a gap extending vertically or horizontally between columns and a boundary extending vertically of non-text unit. The structure of columns are held in the tree structure by updating the hierarchical tree structure adequately.

In S1003, if a column grouped in S1002 has little space in the direction reverse to that of former grouping, the column is grouped in the direction again to be a block. In the meantime, a non-text unit is used as the boundary of the image page. Text unit between two non-text units is processed apart from other text line units.

Further, in S1003, a non-text unit not classified in S1001 is analyzed to check whether it is a title with a large font size or not. If it is judged to be a title, the unit is given an adequate attribute and the tree structure is updated. The title helps the page to be reconstituted.

Figure 12:
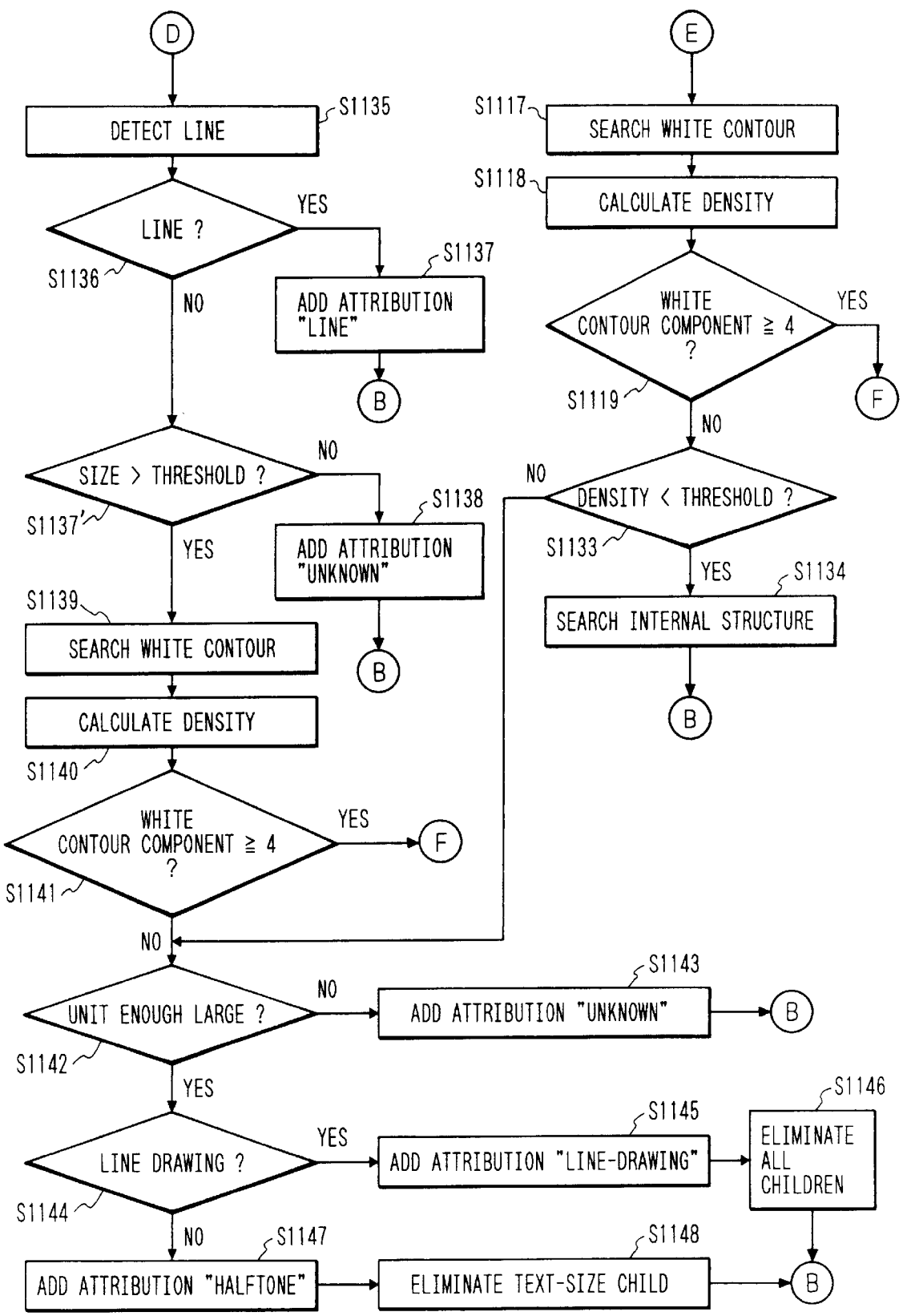
FIG. 12 shows a detailed flowchart of a step S1001.
Figure 13:
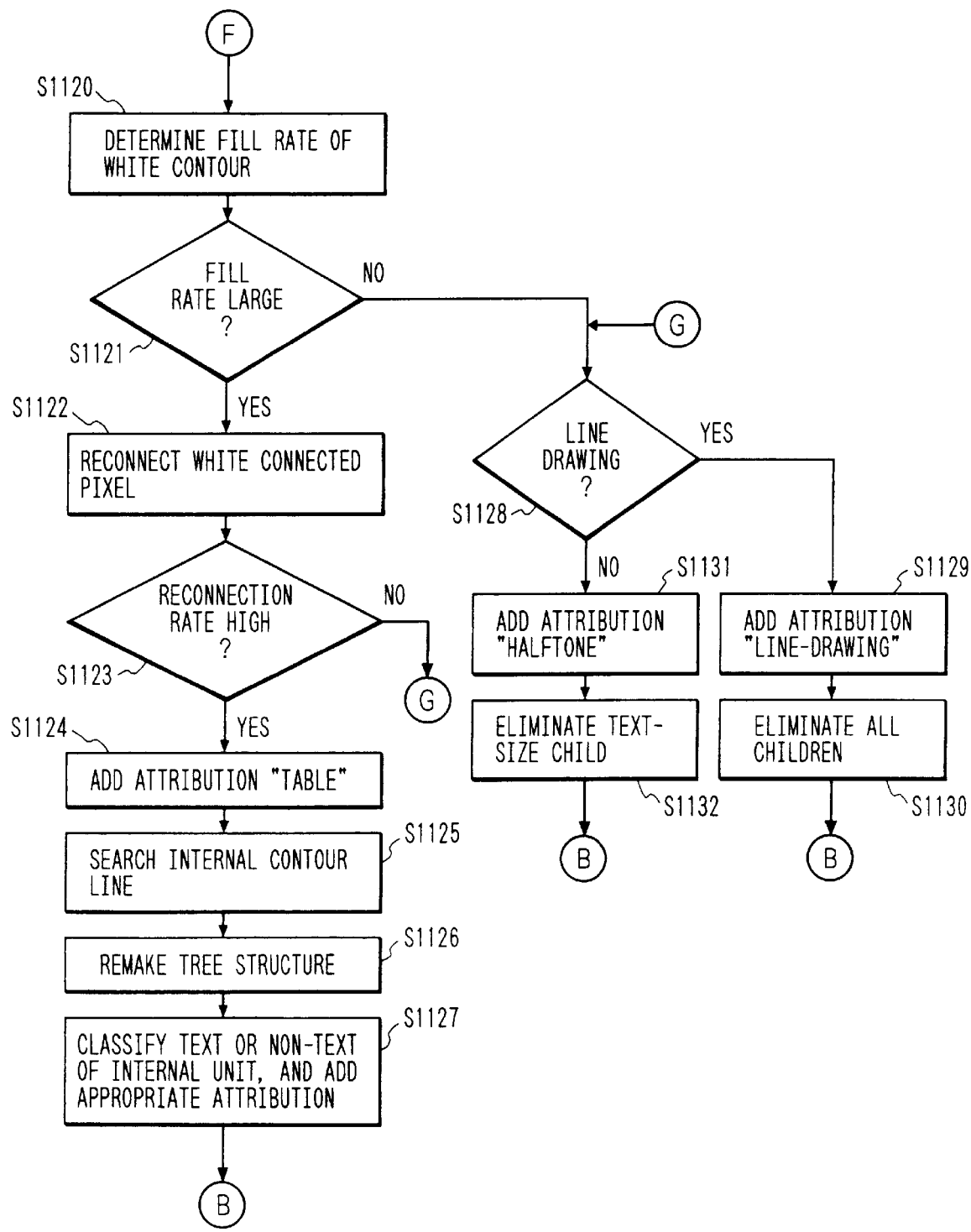
FIG. 13 shows a detailed flowchart of a step S1001.

FIGS. 11, 12 and 13 are detailed flowcharts showing how connected pixels are detected in pixel image data and classified.

Figure 14:
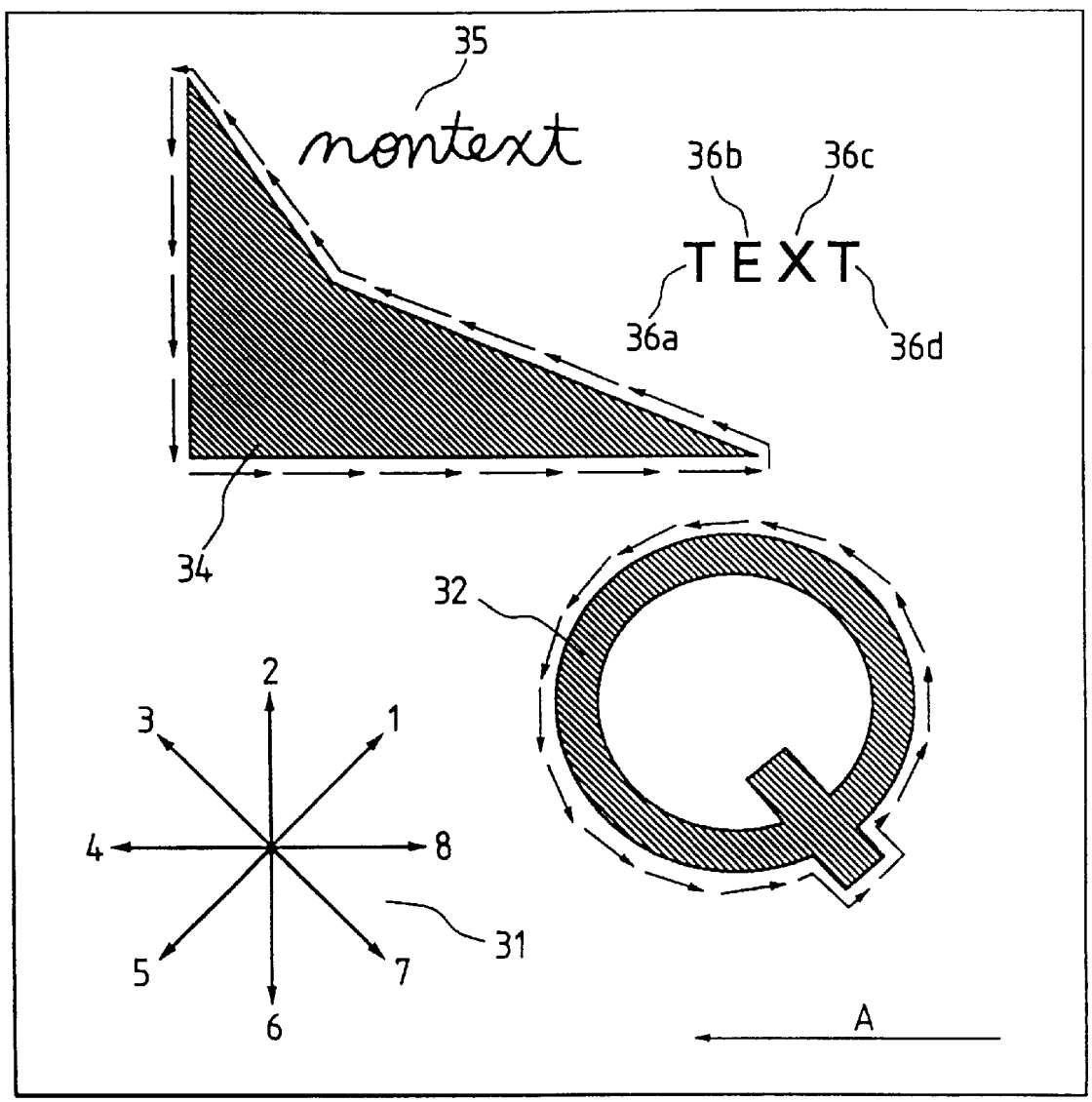
FIG. 14 explains a step S1001.
Figure 15:
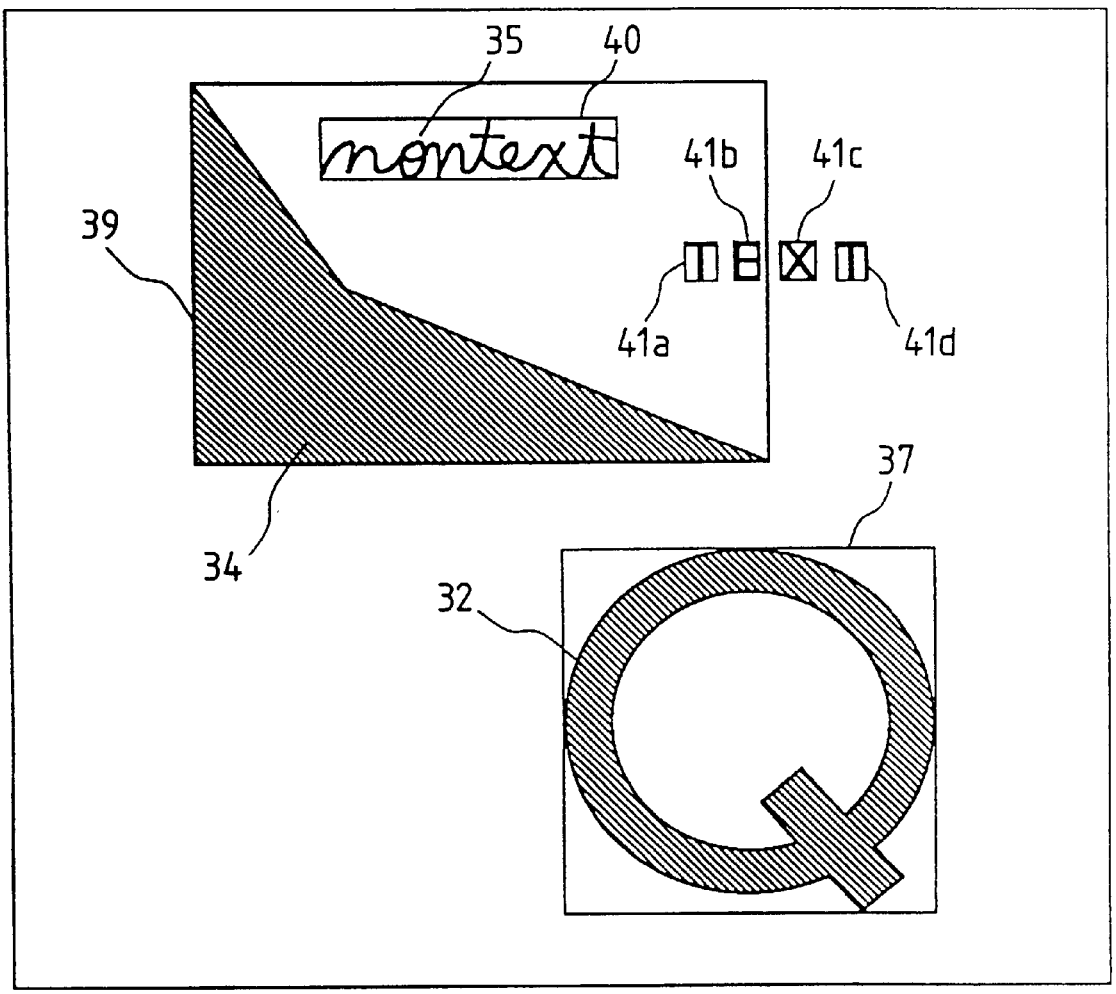
FIG. 15 explains a step S1001.

In S1101, pixel image data is searched by tracing a contour line. A contour line is traced by scanning an image as shown in FIG. 14. An image is scanned from the lower right shown by an arrow A and upward until data at the right end in a graphic form is scanned. An image may be also scanned in the other direction, for example from the upper left to the lower right. When a black pixel is detected, it is searched, in the directions shown by a pattern 31, whether adjacent pixels are black or not. As this search is performed in eight directions from the center, it is called a search in eight directions. If an adjacent black pixel exists, an external contour of a graphic form is obtained by this process. As shown in FIG. 15, a point equivalent to the end of a character, Q 32 is detected by scanning in the direction shown by an arrow A. Adjacent pixels are searched in the directions in the pattern 31 and an external contour of the character Q is traced. An internal contour is not traced.

A contour obtained by a search in eight directions, that is, one connected component is detected and scanning is continued until the next black pixel is detected. As a result, for example an object 34 which seems a complete black area is searched in eight directions. Similarly a non-text object 35 comprising characters, "non-text", written manually, is traced and an object 36 comprising characters of a word, i.e., text, is traced. Scanning is continued until all connected components are detected.

In S1102, all connected components are detected in a rectangle. In this case, a connected component is expressed as the smallest rectangle covering the component as possible. As a result, in FIG. 15, a rectangle 37 around an object 32, a rectangle 39 around an object 34, and a rectangle 40 around an object 35 are detected. Rectangles 41a to 41d around text objects 36a, 36b, 36c and 36d are also detected.

Figure 16:
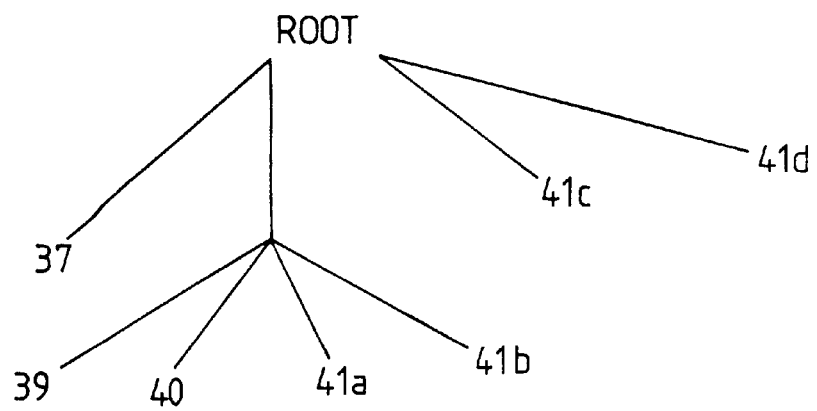
FIG. 16 explains a step S1001.

In S1103, all rectangles are positioned in the tree structure. In the tree structure obtained in S1103, most objects derive from the root. It is because only an external contour of a connected component is traced and the inside of a blocked area is not traced. As shown in FIG. 16, a rectangle 37 corresponding to a connected component 32 directly derives from the root of a page. However, in a case as the rectangle is around the non-text object 35 and the rectangles 41a and 41b are around text objects 36a and 36b, a rectangle is completely contained in another rectangle, and connected components in this rectangle are children of connected components (for example, a component 34) in another rectangle. Further, each connected component contained in a parent having at least one child, such as the component 34, is called a main child. In FIG. 16, the component 39 contains itself as a main child in addition to other child components 40, 41a and 41b.

In S1104, connected components at the first level in the tree are classified into a text unit or a non-text unit. The process of classification comprises two steps. At the first step, a rectangle around a connected component is compared with a predetermined size. If the height of a rectangle around a connected component exceeds a predetermined value corresponding to the maximum value of a font size or the width of the rectangle exceeds a value obtained by dividing the width of a page by a given value ("5" meets the conditions) determined from experience, the connected component is classified into a non-text unit and the attribute of "non-text unit" is allocated to the unit.

At the second step, the rest of all the units to which an attribute is not allocated, that is, units which are not classified as a non-text unit are compared with a value determined based upon a statistically obtained size of the rest of all the connected components. A mean height of all rectangles not classified as a non-text is calculated. An adequate threshold is obtained by multiplying this mean height and a given value (usually 2). All units exceeding the threshold are classified as a text. As a result, each unit is classified and an adequate attribute is allocated. Furthermore the processes shown in FIGS. 11 to 13 are executed for connected components classified into two catagories as described above. The processes will be described in detail below.

After all units at the first level of the tree are classified as a text or a non-text, a child of a text unit comprising a main child, that is, itself is classified as a text. A main child of a non-text is left as a non-text, however, children except it are classified as a text.

In S1105, the first unit is selected. In S1106, if the unit is a text, the flow proceeds to S1107 and the next unit is selected. Processing in S1106 and S1107 is continued until a non-text unit is selected and if a non-text unit is selected, the flow proceeds to S1108.

In S1108, it is checked whether a non-text unit has a child or not. For example, in FIG. 16, a non-text unit 39 has a main child 39 being a non-text and 40, 41a and 41b being a text.

In S1108, if the unit has a child, the flow proceeds to S1109 and here it is filtered to determine whether each unit is a halftone or not. In half-tone filtering, a child is filtered and children smaller than the size of noise are counted. The height of a unit equivalent to noise in size is smaller than the smallest font size in input image data. If the number of children whose size is smaller than that of noise exceeds a half of the total, the unit is judged a half-tone image. As a result, the flow proceeds from S1110 to S1111 and there an attribute of a half-tone graphic form is allocated to the unit. That is, the tree structure is updated so that children in text size of children of a half-tone image are not children of a half-tone image but may be at the same level as the half-tone image. If the procedure is adequate, character recognition in a half-tone image is enabled. The flow returns to S1107 and the next unit is selected and processed.

In S1109, if as a result of half-tone filtering, it is judged that a unit is not a halftone, the flow proceeds from S1110 to S1113 and there a main child of the unit is selected for the following process. The flow proceeds to S1114.

Figure 17A:
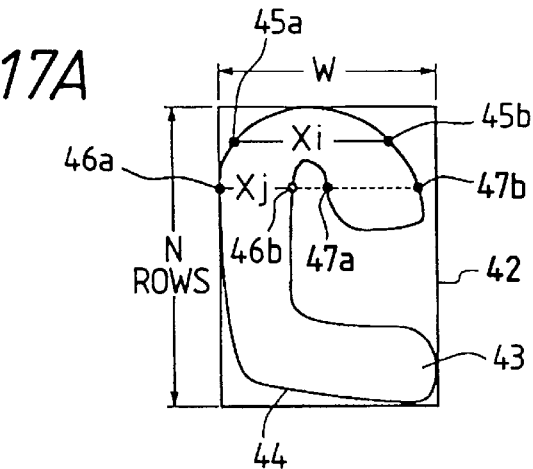
FIGS. 17A to 17C explain a step S1001.

Next, if in S1108 it is judged that a non-text unit has no child or in S1113 a main child is selected for the following process, in S1114 the unit is filtered in relation to a frame. Frame filtering means judging whether the unit is a frame (frame line) or not. The term frame refers to parallel straight lines with width and height of almost the same length constituting a rectangle around the unit. Particularly, the line width of a connected component in each column in units of pixel in the unit is checked. In FIG. 17A, a non-text unit 42 contains a connected component 43 having a contour component like 44. In this example, the line width of this connected component in a column i is x, that is, the distance between the left end 45a of the contour line and the right end 45b. In the meantime, two line widths exist inside the connected component in a column j. One is between 46a and 46b and another is between 47a and 47b. The longer line width, that is, between 46a and 46b is defined as a distance x.

A distance x in all columns n in the non-text unit 42 is calculated and it is checked using the following inequality expression to determine whether the non-text unit is a frame or not.

$$\sum_{k=1}^{N}(Xk-W)2/N < \text{threshold}$$

Here Xk is the longest line width in a column k in a connected component as described above, W is the width of a rectangle 42, N is the number of columns and the threshold is a value calculated beforehand so that a connected component can be detected as a frame if it is a little tilted. To detect a connected component tilted by one degree as a frame, the threshold should be a value obtained by calculating the following expression:

sin (1°)×L+Fixed value.

The above-mentioned fixed value is defined as a mean height of characters calculated in S1104.

If the above-described unequality expression is satisfied, the unit is judged frame data and the flow proceeds from S1115 to S1116 and an attribute of frame is allocated to the unit. As a result, a judgment such as "frame and table" and "frame and half-tone graphic form" is enabled for a frame.

After S1116, it is checked whether the frame data contains a table or like. In S1117, a search is performed to obtain a white contour in a connected component.

Figure 18A:
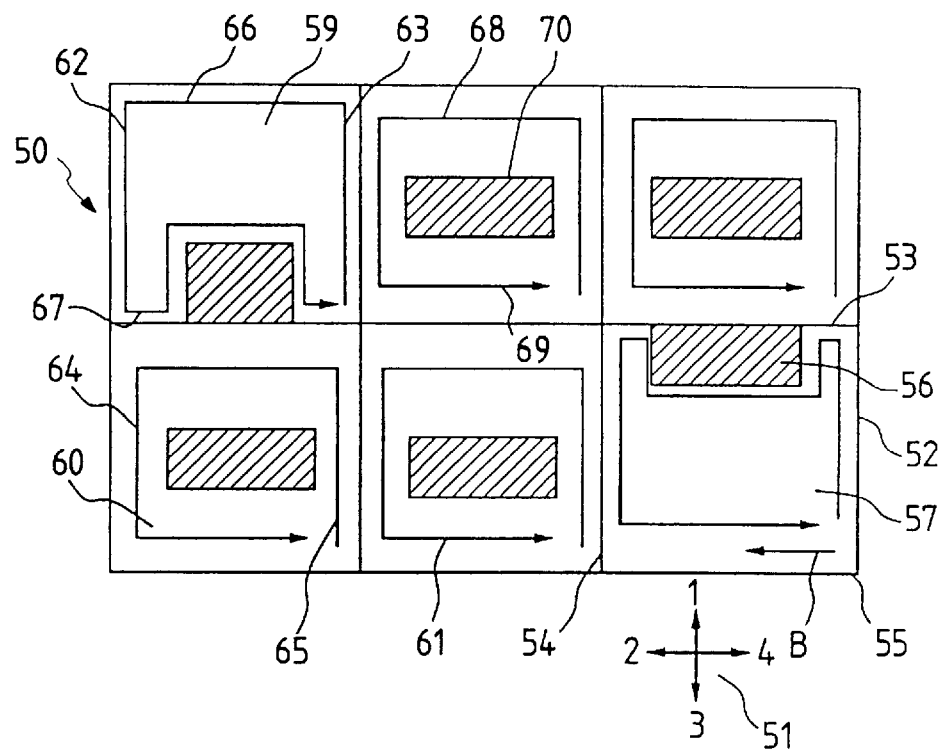
FIGS. 18A and 18B explain a step S1001.

A white contour is basically the same as a black one obtained in S1101. However, it is different in that a white contour comprises white pixels. In FIG. 18A, the inside of a non-text unit is searched in the direction shown by an arrow B from the lower right to the upper left. When a white pixel is detected first, an externally oriented search such as 51 toward adjacent white pixels from the detected white pixel is performed. It is notable that only directions 1 to 4 are required for the externally oriented search such as 51. Therefore, a search in four directions is performed to trace a white contour in this process. This processing is continued until all white contours are detected. For example, tracing a white contour means detecting a contour surrounded by black line segments 52, 53, 54 and 55 and similar processing is also executed for the inside of black pixels, such as 56. The above-described scanning in the direction shown by an arrow B is continued until all blocked white contours are traced in a non-text object.

In S1118, the density of a non-text unit is calculated. The density is calculated by counting black pixels in a connected component and dividing the total pixels in a rectangle by the number of black pixels.

In S1119, the number of detected white contours in a non-text unit is calculated. If the number exceeds 4, the non-text image may be a table or the like comprising text blocks of a table. In S1120, the filling rate of a white contour is calculated. The term filling rate of a white contour refers to the rate of an area surrounded by a white contour in a non-text image. In FIG. 18A, some white contours such as 57 and 59 are constituted by only white pixels and some white contours such as 60 and 61 contain an area constituted by black pixels inside. If the filling rate is high, the non-text image is probably a table or the like comprising text blocks of a table. To ensure this presumption, it is checked vertically and horizontally to determine whether the white contour has an internal structure based upon a grid. Particularly in S1122, a white contour having a boundary which does not cross at least two contour lines horizontally or vertically is judged to be not based upon a grid and is reconnected. For example, in FIG. 18A, the left boundary 62 and the right boundary 63 of a white contour 59 are extended vertically so that they are consistent with the left boundary 64 and the right boundary 65 of another white contour 60. Therefore, these contours are judged to be lined based upon a grid and are not reconnected. Similarly the upper boundary 66 and the lower boundary 67 of the white contour 59 is extended horizontally so that they are consistent with the upper boundary 68 and the lower boundary 69 of another white contour 70. As a result, these white contours are also judged to be lined based upon a grid and are not reconnected.

Figure 18B:
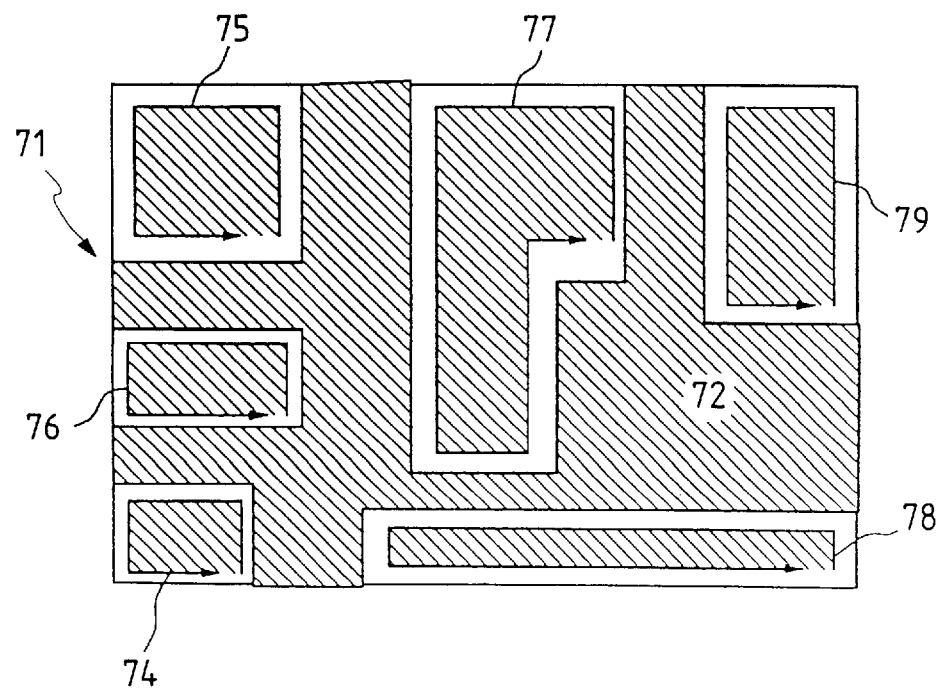
Figure 19A:
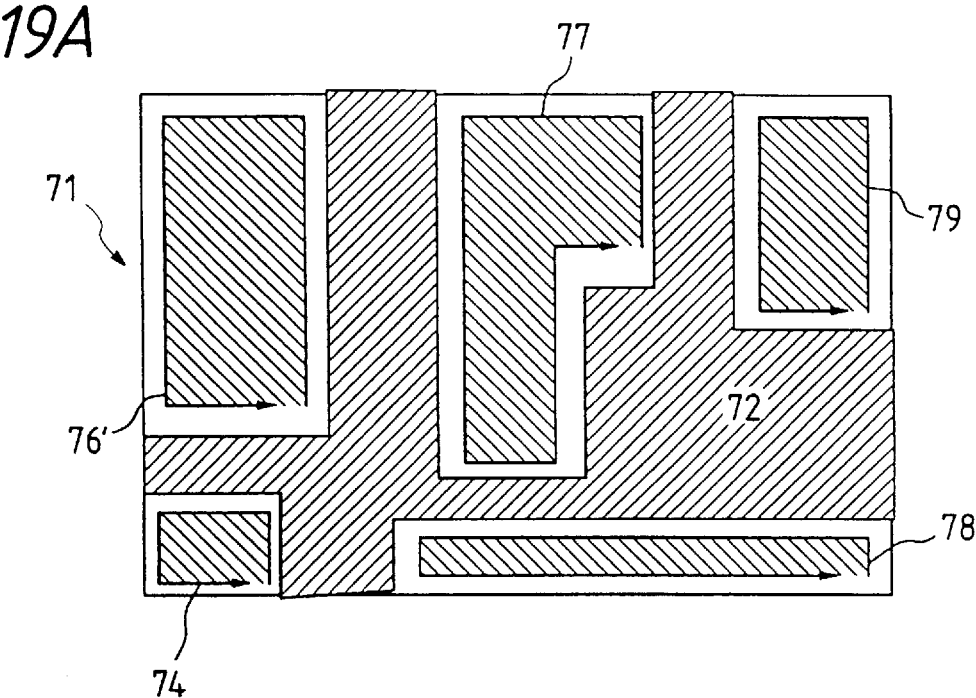
FIGS. 19A and 19B explain a step S1001.
Figure 19B:
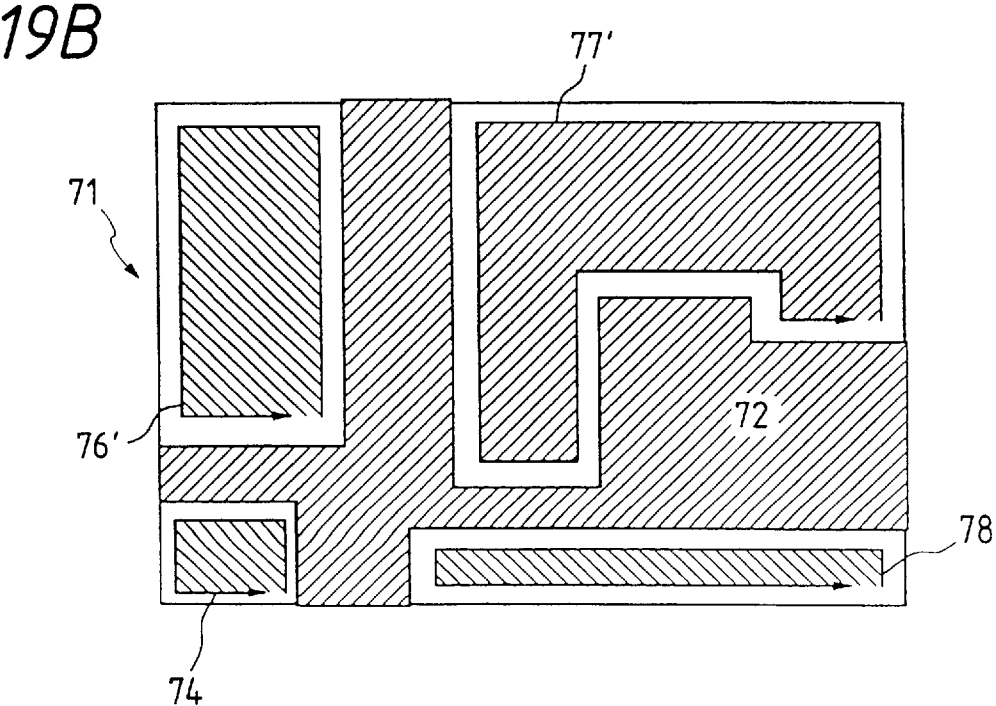

FIGS. 18B, 19A and 19B explain the case that a white contour is connected. FIG. 18B shows an example of a non-text unit 71 comprising units varying from a half-tone image to a binary image. The non-text image 71 comprises a black pixel area 72 and white pixel areas 74, 75, 76, 77, 78 and 79. As the filling rate of these white pixel areas is probably high enough, S1121 proceeds to S1122 in relation to reconnection. In S1122 as shown in FIG. 19A, first, the upper and lower ends of a white contour 75 are compared with those of a white contour 77. As these upper and lower ends are not consistent, white contours 75 and 77 are connected and a new white contour 76' is created.

Next, in FIG. 19B, the left and right boundaries of a white contour 77 are compared with those of a white contour 78. As these boundaries are not consistent, white contours are reconnected and a new white contour 77' is created.

This process is repeated horizontally and vertically until no contour is reconnected.

As described above, a white contour containing a table is seldom connected and a white contour containing things except a table such as a half-tone graphic form and a linear graphic form is easily connected. In S1123, the rate of reconnection is calculated. If the rate of reconnection is high or the number of white contours left after reconnection processing is less than 4, the flow proceeds to S1128 and the non-text unit is judged a half-tone or a linear graphic form.

If in S1123 the rate of reconnection is not high or at least more than white contours are left, the flow proceeds to S1124 and the white contour is judged to be a table. In S1125, the inside of a white contour newly judged to be a table is checked and connected components in it are searched and classified. In 1126, the tree structure is updated based upon new inside connected components. In S1127, inside connected components are classified into a text or a non-text again and an adequate attribute is allocated to them. This process is the same as the process described in S1102 to S1104. The flow returns to S1107 and the text unit is selected.

Referring to S1121 and S1123, if the filling rate is not high in S1121 or the rate of reconnection is not high in S1123, the non-text frame graphic form is probably a half-tone image or a linear graphic form. It depends on the average of run length in the horizontal direction of black pixels in the unit, the ratio of white and black pixels, and the density, as to whether the unit is a half-tone image or a linear graphic form. Generally, a very dark image is judged a half-tone image and a white bright image is judged a linear graphic form.

Particularly, if the average run length of white pixels is substantially 0 (a substantially black or a spotted image) and the density calculated in S1118 of black is larger than that of white (that is, the density is larger than a threshold approximately 0.5 (the first threshold)), the frame unit is judged a half-tone image. If the density is not larger than the first threshold, the unit is judged a linear graphic form.

If the average run length of white pixels is not 0 and it is larger than the average run length of black pixels, the frame unit is judged to be a linear graphic form. However, if the average run length of white pixels is not larger than that of black pixels (that is, this is also an image in which black is dominant), a further detailed test is required.

Particularly, when the number of black pixels is by far smaller than that of white pixels (that is, the number of black pixels is smaller than the double number of white pixels (the second threshold)), the frame unit is judged a half-tone image. In the meantime, if the value obtained by dividing the number of black pixels by that of white pixels is not larger than the second threshold, however, the density calculated in S1118 is larger than the first threshold, and the frame unit is judged to be a half-tone image. If not, the frame unit is judged to be a linear graphic form.

When in S1128 a frame unit is judged a linear graphic form, the flow proceeds to S1129. In this step an attribute of a linear graphic form is allocated to the frame unit and further in S1130, all children are eliminated. Particularly, if a unit is once judged a linear graphic form, no character recognition processing is executed for the unit. Then, the flow returns to S1107 and the next text unit is selected.

In the meantime, if in S1128 a frame unit is not judged to be a linear graphic form, the flow proceeds to S1131. In this step an attribute of halftone is allocated to the unit and in S1132 children in text size of children in the unit are eliminated. All children larger than text size constitute a frame and are allowed to be left as children of a half-tone graphic form. The flow returns to S1107 and the next text unit is selected.

Referring to S1119, if the number of a white contours is not larger than 4, the frame unit is judged to be not a table. The flow proceeds to S1133 and the density calculated in S1118 is compared with a threshold of approximately 0.5. This threshold is determined considering that text units and linear graphic forms in a frame are probably less than a half of all pixels. If the density is smaller than this threshold, the flow proceeds to S1134 and there the internal structure of a frame unit is checked. This process is the same as that in S1101 in relation to an internal structure of a frame unit.

If in S1133 the density is not smaller than a predetermined threshold, the flow proceeds to S1122 and the frame unit is classified as a linear graphic form or a half-tone image or it is judged that the frame cannot be classified (that is, the frame is unknown).

Referring to S1115, if a frame is not detected in a non-text unit by frame filtering in S1114, the flow proceeds to S1135 and it is judged whether the non-text unit contains a line or not. A line is a non-text unit useful for expressing a boundary of a text. However, a text partitioned (surrounded) by such a line is often very close to the line and may contact the line. Therefore, a line search requires consideration of both the case that a text is in contact with a line and the case that it is not in contact.

Figure 17B:
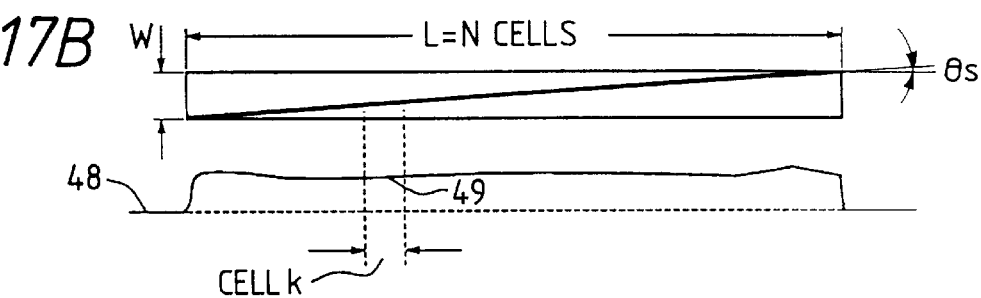

For a line search in the case that text is not in contact, a histogram in the vertical direction of a non-text unit is calculated. In an example shown in FIG. 17B, a histogram 48 of a line should be a mean value because the height is approximately equal to the line width. A line width is substantially equal to the width of a text unit ("W"). However, if they are different, the difference is caused due to a tilt θs. The tilt is caused at the time of input. To judge whether a non-text unit contains a line or not, the height 49 of each cell k in a histogram is compared with the width W. As shown in the following expression, the mean of square of the difference between the height and the width is compared with the threshold.

$$\sum_{k=1}^{N} (\text{cell}k - W)2 / N < \text{threshold}$$

This threshould is set so that distortion or a tilt θs of a line in a non-text to some extent may be allowable. For distortion or a tilt of one degree, $$\sum_{k=1}^{N} [k \cdot \sin(1°)/N]2.$$

The threshold calculated using the expression above produces a satisfactory effect.

Figure 17C:
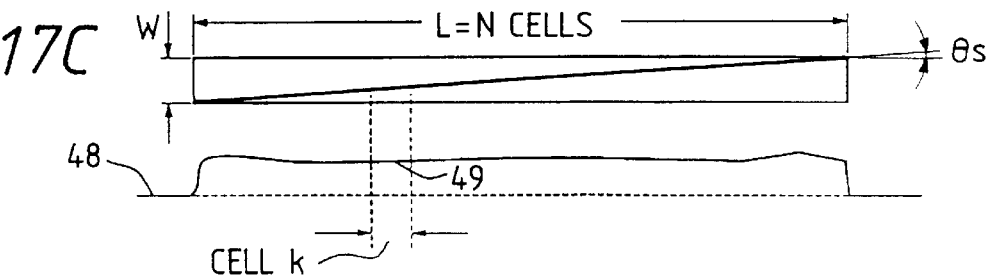

If a line which a text does not contact is not found by the above unequality expression, a search is performed to determine whether a line with which a text is contact is contained in the non-text unit or not. To check whether a line with which a text is in contact is contained in the non-text unit or not, it is checked whether a line exists near the boundary of the unit or not. For example, as an example shown in FIG. 17C, it is assumed that a line exists near the boundary of a rectangle around a unit. In this case, it can be checked by calculating the sum of squares of the distance from the boundary whether a line exists near the boundary. That is, in this case, the following unequality expression is calculated:

$$\sum_{k=1}^{N} Xk2 / N < \text{threshold}.$$

If the left side is smaller than a predetermined threshold, it is proven that a line with which a text is in contact exists. The same value may be used for this threshold as if a line with which a text is not in contact is checked.

If in S1135 a line is detected, the flow proceeds to S1137 through S1136 and an attribute of a line is allocated to the non-text unit. The flow proceeds to S1107 and the next unit is selected.

In the meantime, if in S1135 a line is not detected, the flow proceeds to S1137 through S1136 and there the size of the non-text unit is checked. If the size is smaller than a threshold, the non-text unit cannot be classified. The threshold is determined based upon the largest font size. Empirically, a half value of the largest font size produces a good effect. The flow proceeds to S1138 and an attribute of "unknown" is allocated. Then, the flow returns to S1107 and the next unit is selected.

In S1137, if the size is larger than a predetermined threshold, the flow proceeds to S1141 through S1139 and S1140 and there a white contour is searched in an internal area of the non-text unit and the number of white contours is calculated as described in S1119.

In S1141, if the number of white contours is not more than 4, the flow proceeds to S1142 and to check whether the unit is large enough as a linear or half-tone graphic form or not, the size is calculated. The size is determined based upon the height and width of the text unit and the maximum run length of black pixels. Particularly, if the height and width of the non-text unit are smaller than the largest font size, the unit is judged to be not large enough to constitute a linear or half-tone graphic form and the flow proceeds to S1143 and an attribute of "unknown" is allocated to the unit. Similarly, if the width of the unit is larger than the largest font size, however, the maximum run length of black pixels is not larger than the largest font size, the flow also proceeds to S1143 and an attribute of "unknown" is allocated to the unit. The flow returns to S1107 and a new unit is selected.

In S1142, if the non-text unit is large enough to constitute a linear or half-tone graphic form, the flow proceeds to S1144 and an attribute of a linear or half-tone graphic form is allocated. Since in S1144 to S1148, the same process as S1128 to S1132 is executed, a description of S1144 to S1148 will be omitted.

Figure 26:
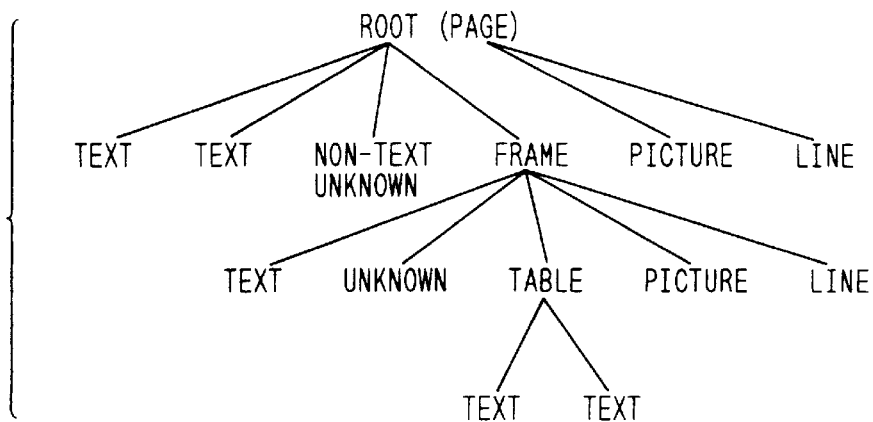
FIG. 26 explains an example of processing according to algorithm of the embodiment.

When according to the flow described in FIGS. 11 to 13 (S1001 in FIG. 10), all connected components in an input image are searched and classified, the tree structure as shown in FIG. 26 is obtained. As shown in FIG. 26, "root" is equivalent to a page of an input image. A child of the root is equivalent to a text block or a non-text block consisting a frame, a picture (drawing) or a line. A child of a frame is equivalent to a text block, "unknown" text data, a table, a picture (drawing) and a line. The table contains a text block consisting of a half-tone image/a linear graphic form and a line.

Figure 22:
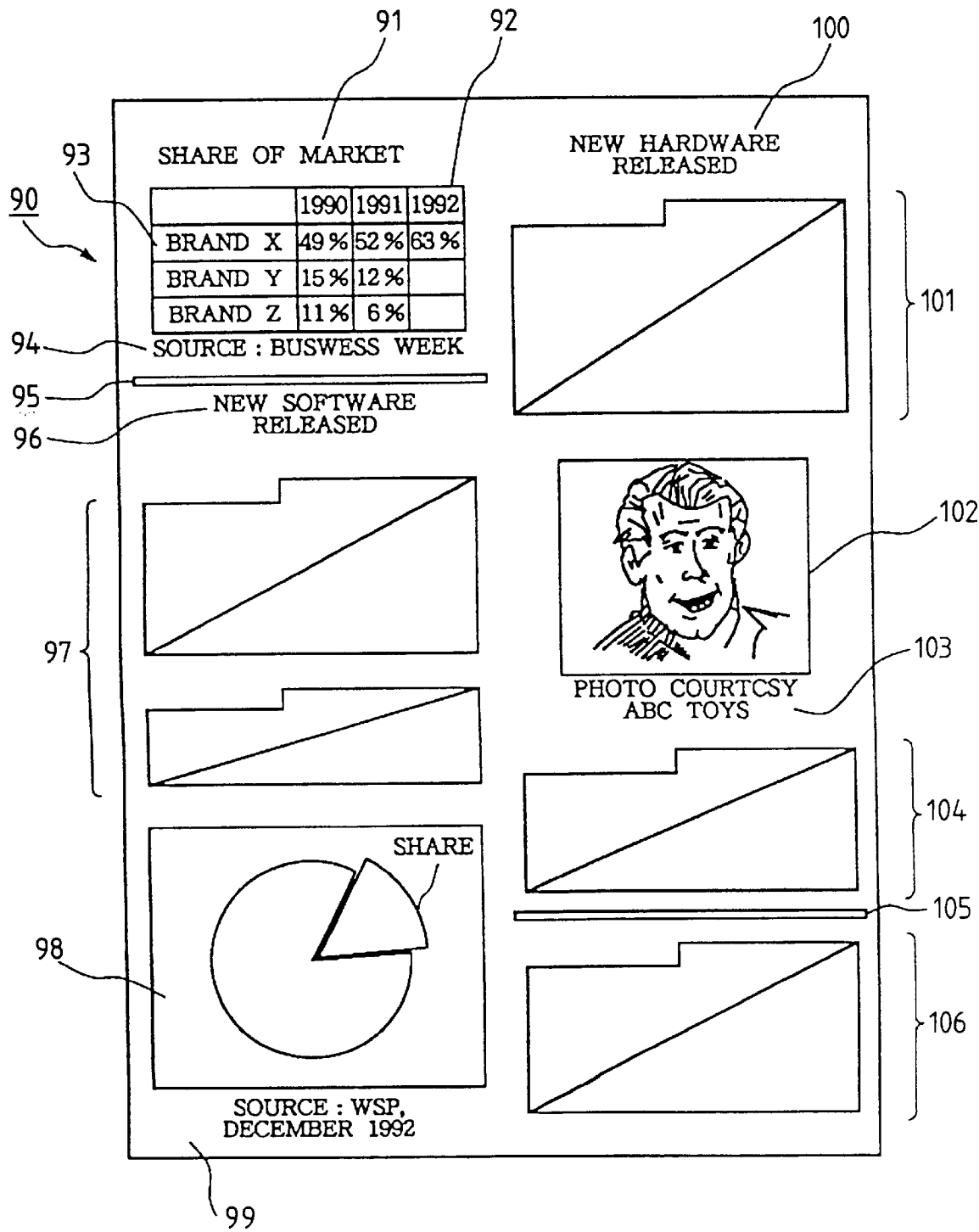
FIG. 22 explains an example of processing according to algorithm of the embodiment.
Figure 23:
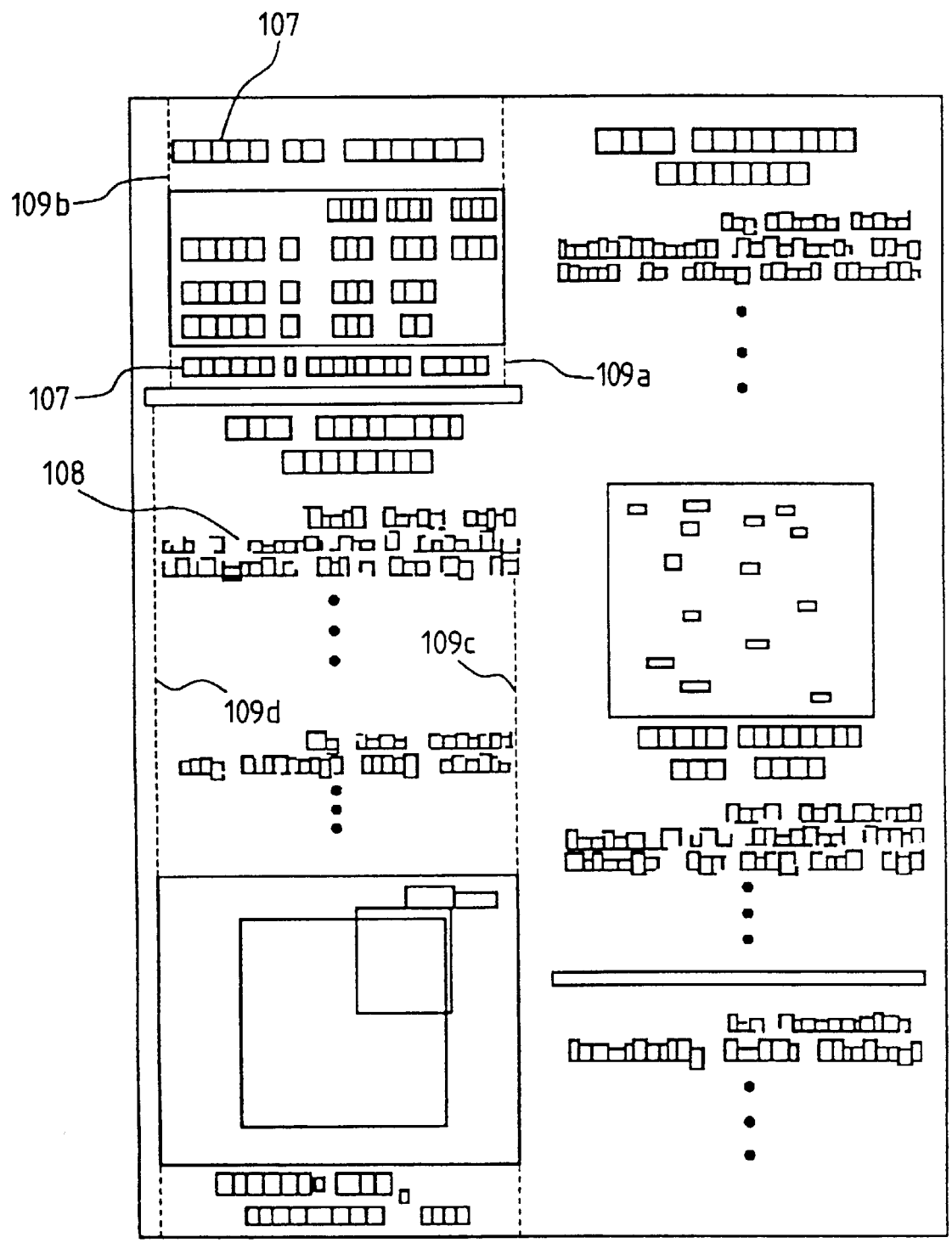
FIG. 23 explains an example of processing according to algorithm of the embodiment.

FIG. 22 shows a page 90 of pixel image data. The page contains a text of a large font size 91, a table 92 comprising text data such as 93, text data 94, a horizontal line 95, another title 96, text data with two paragraphs 97, a linear graphic form 98 with a caption 99 and surrounded by a frame, second column started with a title 100 and following text data 101, a half-tone image 102 with a caption 103 and surrounded by a frame, text data 104, a horizontal line 105 and the last paragraph 106. FIG. 23 shows the case that the processing shown in S1001 is executed for the same image. As shown in FIG. 23, connected components in a page 90 are surrounded by rectangles and an attribute is checked by processing shown in S1115 to S1134 in relation to the inside.

Figure 20:
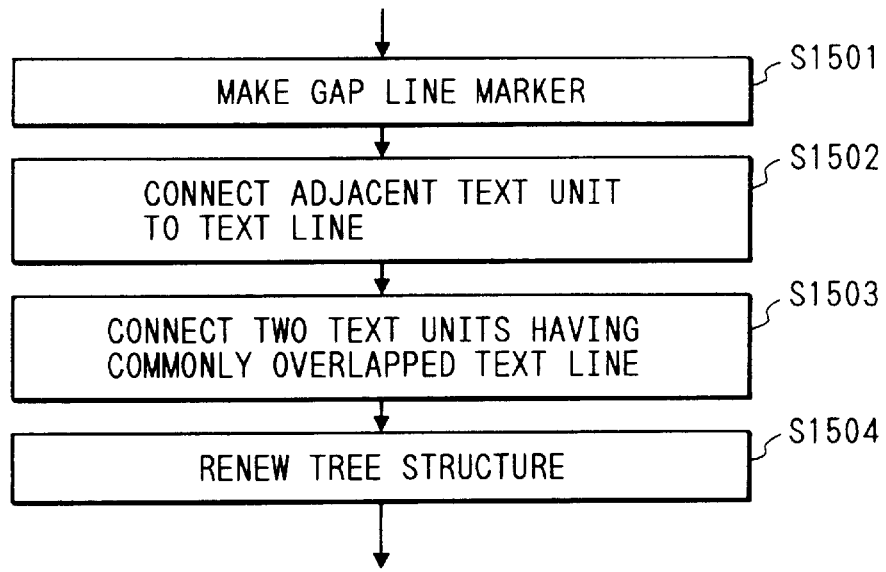
FIG. 20 shows a detailed flowchart of a step S1002.

All text units obtained in S1001 are grouped horizontally in S1002 even if they are located anywhere in the tree structure. An operation of grouping varies depending upon the extent of gathering of each text unit and units around it. A gap (space) extending vertically for making columns is detected and held. Referring to FIG. 20, the detailed process in S1002 will be described below.

In S1501, the left and right boundaries of a non-text unit are extended vertically to be a gap line marker. As shown in FIG. 23, the gap line markers 109a and 109b are extended vertically until they cross a text or non-text unit (in this example unit 95). Similarly gap line markers 109c and 109d are also extended until they cross a unit 95. The gap line marker is effective to detect a gap (space) and columns can be made owing to this.

In S1502, lines of a text unit such as 107 in FIG. 23 are connected. For connection, the distance between connected components adjacent in both direction is checked horizontally and vertically beforehand, and if the distance in the horizontal direction is small, connected components are connected horizontally and if the distance in the vertical direction is small, they are connected vertically. This connection procedure corresponds to whether the connecting direction of text units to be connected is vertical or horizontal.

These text units are connected as one text line if the following conditions are met.

(1) The connection exceeds no gap line marker.

(2) The text unit is in contact with another text unit or is at a distance therefrom shorter than a given threshold. This threshold is obtained by multiplying the mean length of texts obtained in S1104 and a scale factor obtained experimentally (a value 1.2 produces a satisfactory effect).

However, before connection, it can be determined by extending a gap between text units horizontally if text units are lined horizontally, and by extending a gap between text units vertically if they are lined vertically, whether a gap extending in the direction of a column exists or not. For example, in an example shown in FIG. 23, a gap 108 exists between two texts. The gap extends vertically across a few lines and therefore in S1502 it is left as a gap even if the distance between text units is shorter than a threshold.

In S1503, a set of text units not connected in S1502 is overlapped by another text unit to which both text units of the set are adjacent and when the connection crosses no gap line marker, the text units are connected. This step is effective to eliminate a gap caused due to the problem of space in a text line not due to the structure of a column. In an example shown in FIG. 23, a gap 108 left in S1502 is eliminated in S1503. It is because the gap is overlapped by characters in a line under it and the gap crosses no gap line marker.

In S1504, the tree structure is updated.

Figure 24:
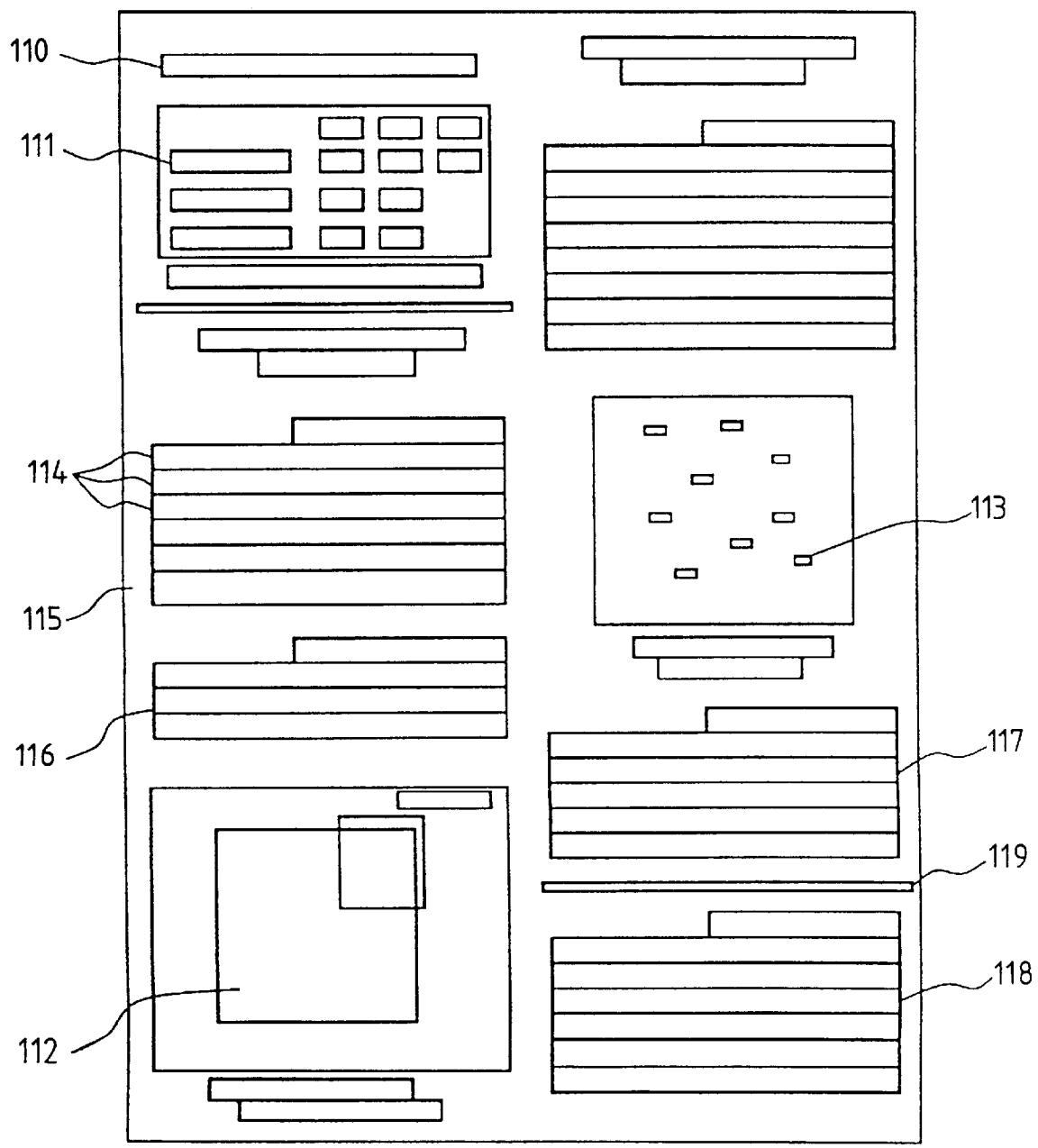
FIG. 24 explains an example of processing according to algorithm of the embodiment.
Figure 27:
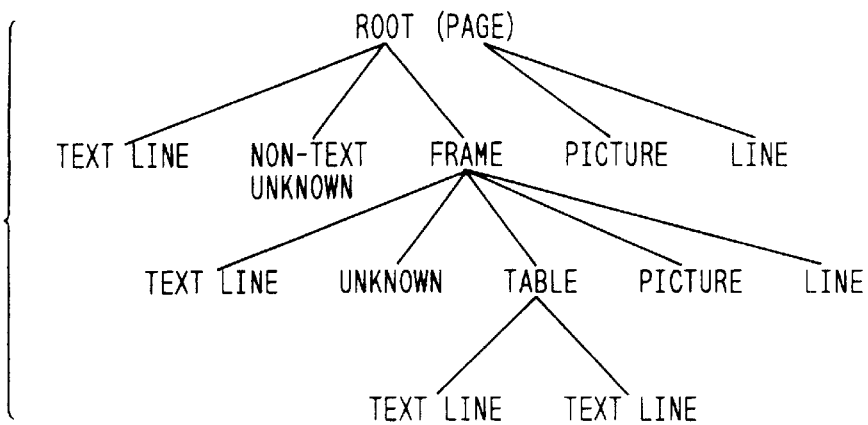
FIG. 27 explains an example of processing according to algorithm of the embodiment.

FIG. 24 is a schematic drawing showing the result of grouping processing described in S1002 and FIG. 27 shows how the tree structure is changed by the processing executed in S1002. As shown in FIG. 24, connected text units are grouped to be a text line such as 110. Especially, even if text units are located anywhere in the tree structure, they are connected without fail to be a text line. For example, although a text unit 111 is located under a frame table in the tree structure, it is connected. However, it is noteworthy that regrouping exceeding a white contour obtained in S1117 to S1139 is not performed. It is to prevent items in a table from being gathered in one line. A gap between the left and right columns is held. A non-text unit is not regrouped. Therefore, non-text units 112 and 113 are not grouped even if they are closer to adjacent units than a threshold.

In FIG. 27, a new grouping is reflected in the tree structure.

Figure 21:
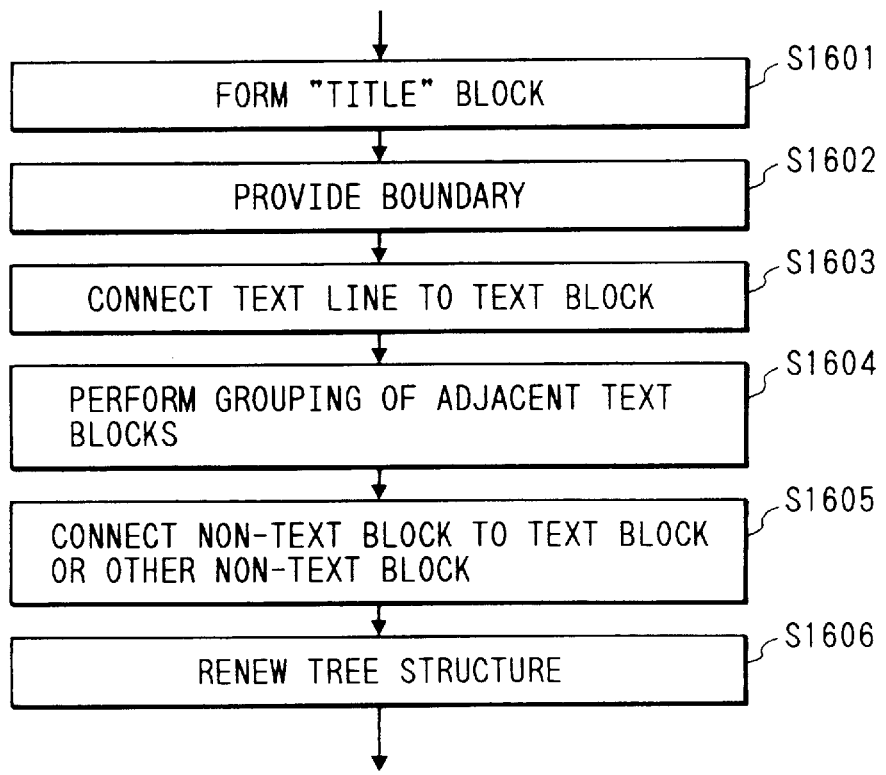
FIG. 21 shows a detailed flowchart of a step S1003.

After text units are connected to be a text line in a process described in FIG. 20 (S1002 in FIG. 10), the text lines are connected vertically to be a text block as described in S1003. Referring to FIG. 21, the process will be described in detail below. A process of grouping varies depending upon the extent of gathering of units in a text line and a location of a non-text unit. For example, a non-text line existing between text lines functions as a boundary and text lines on the opposite side to the boundary are grouped to prevent a text line and a non-text line from being grouped. All text lines between two consecutive non-text line units are simultaneously processed. In addition, it is checked whether in S1003 some text units should be connected to a non-text unit (for example, a caption constituted by a non-text image) or whether a non-text unit should be connected to another non-text unit (for example, a linear graphic form related to a half-tone image).

FIG. 21 is a flowchart showing a procedure in which text lines are grouped to be a text block. In S1601, a title block is formed by some units which are classified into a non-text unit in S1104. The criteria of judgment is that units for forming a title block must be smaller than the largest font size; however, they must also be larger than the mean text size. A title block is formed by grouping all adjacent non-text units with similar size. An attribute of a title is allocated to the block. An attribute of "both a linear graphic form and a character" is allocated to the rest of all the non-text blocks that are not grouped. The tree structure is updated based upon this. A title is useful for reconstitution of a page.

In S1602, a non-text unit between text lines is detected. Such a non-text unit functions as a boundary between text blocks and prevents text lines from being grouped.

In S1603, a text line and a text line in the vertical direction (hereinafter called block connecting direction) of the first text line are grouped by processing comprising two steps to be a text block. At the first step, a gap between columns is detected. For the preparation, for example a histogram of pixels in the vertical direction is calculated beforehand. At the second step, if the distance between text lines consecutive in the vertical direction is shorter than the height of a text calculated in S1104, these text lines are grouped in a column. A step S1603 is effective to connect text lines belonging to the same column such as text lines 114 in FIG. 24.

In S1604, if text blocks close vertically or horizontally are not partitioned by a non-text unit and they cross no gap found in a histogram obtained in S1603, the text blocks are grouped. Grouping of text blocks is performed based upon a separated state of blocks which are smaller than a given threshold calculated based upon the height in the vertical direction calculated in S1104. In an example shown in FIG.

24, a step S1604 is effective to group text blocks formed by text lines in a paragraph 115 and text lines in a paragraph 116. However, the step S1604 is not effective to group text blocks 117 and 118. It is because these text blocks are separated by a non-text block 119 (a line). In S1605, it is determined that a text block and a non-text block should be grouped or that a non-text block and another non-text block should be grouped. A text block can be connected to a non-text title block, a non-text half-tone image block or a non-text line with an attachment. These connections are performed according to the following judgment.

(1-a) If a text block is close to a non-text title block in the horizontal direction and they overlap vertically, the text block is connected to the non-text title block. (However, the text block and the title block shall be lined horizontally.)

(1-b) If a text block is close to a non-text title block in the vertical direction and they overlap horizontally, the text block is connected to the non-text title block. (However, the text block and the title block shall be lined vertically.)

(2) If a text block is smaller than a block in word size both horizontally and vertically and no text block in word size is close to the text block, this text block is located inside a non-text half-tone image block.

(3) As a text block overlapping with a non-text line with an attachment is probably a text with an underline, the non-text line with an attachment is judged a text solely.

Some non-text blocks are connected to other non-text block according to the following table:

TABLE 1

|  | Halftone graphic form | Linear graphic form | Character & linear graphic form | Title |
|---|---|---|---|---|
| Halftone graphic form | Test #1 | Not connected | Connected | Not connected |
| Character & linear graphic form | Test #1 | Test #2 | Test #2 | Test #3 |
| Linear graphic form | Test #1 | Test #1 | Not connected | Not connected |
| Title | Not connected | Not connected | Not connected | Test #3 |

"Test" in this table means:
Test #1:
If one block is completely contained in another block, they are connected.
Test #2:
If the width of a picture text is smaller than that of a word-sized block, they are connected.
Test #3:
If blocks are close, they are connected.

If S1606, an attribute is corrected and the tree structure is updated by the above-described processing.

Figure 25:
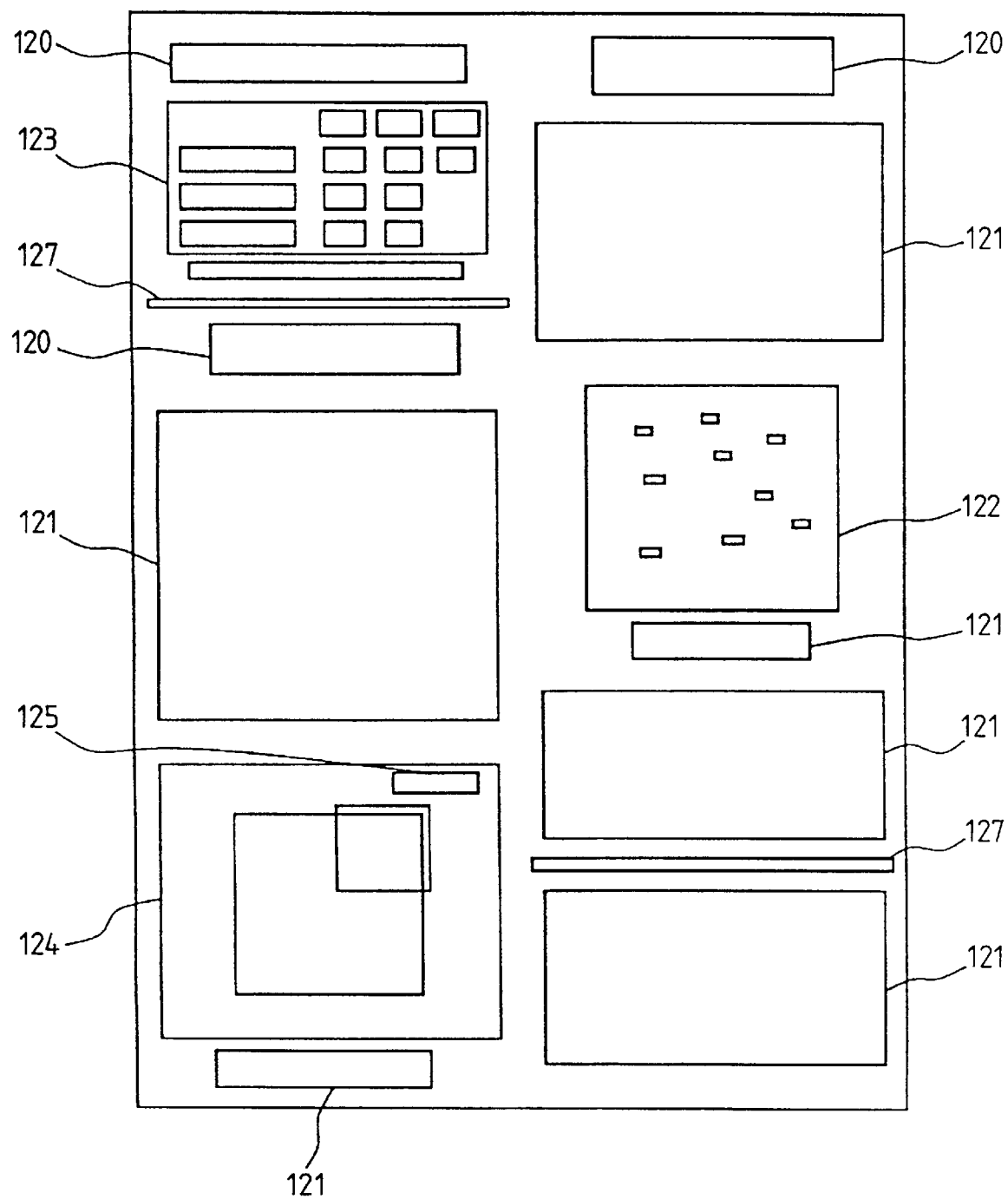
FIG. 25 explains an example of processing according to algorithm of the embodiment.
Figure 28:
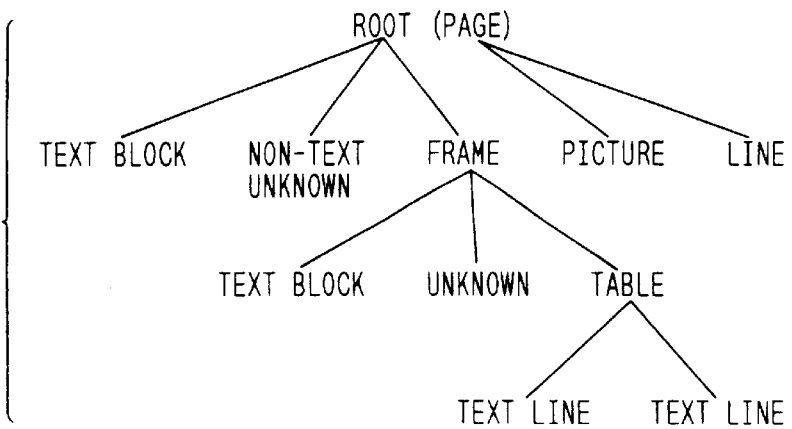
FIG. 28 explains an example of processing according to algorithm of the embodiment.

FIG. 25 shows the structure of blocks obtained by the processing shown in FIG. 21 and FIG. 28 shows an example of the tree structure. FIG. 25 contains a title block 120, a text block 121 and a half-tone/linear graphic form 122. FIG. 25 also contains frame data which is constituted in a table format 123 and which contains a text unit 125 inside and is constituted in a table format 124. A non-text image 127 functions as a separator of units in FIG. 25.

According to the above-described algorithm, block selection processing is executed in the image memory unit 9. By this block selection processing, block selection processing result information, comprising attribute classification information in which each unit based upon black pixel connected components in an image is classified into any of character, title, frame, table, half-tone graphic form, linear graphic form and line blocks and area information showing the coordinates in an image and size of the smallest rectangle around each unit, is obtained. The block selection processing result information is temporarily stored in memory 904.

The block selection processing result information can be transferred to a computer device via the computer I/F unit 7 and the computer device 12 can execute a variety of processing operations based upon the transferred block selection processing result information. The details of transferring the information temporarily stored in the memory 904 to a computer device will be omitted because it is described above.

In the above-described image forming system, image information data obtained by executing any of image processing, binarization processing and compression processing for every partial area in a multi-valued image stored in memory 904 by CPU 906 of the image memory unit 9 using an image processing function, a binarization processing function, a compression processing function and a block selection processing function can be formed. The detail of the flow of step of this processing operation in this case will be described below referring to FIG. 29.

First, in S2401 input processing of multi-valued images to the image memory unit 9 is performed. Multi-valued image data input here is input from the computer terminal 12 connected to an external device or the formatter unit 8 and sent to the reader unit 1, the facsimile unit 4, the file unit 5 and the I/F unit 7.

As input of image data is described in detail in the description of that in relation to the core unit 10 and the image memory unit 9, the description thereof will be omitted.

Next, in S2402 binarization processing for a multi-valued image stored in memory 904 is performed. This processing is preprocessing required for executing block selection processing in S2403 and simple binarization processing is performed for all areas of a multi-valued image by CPU 906. A binary image after processing is stored in the memory 904 again.

Figure 30A:
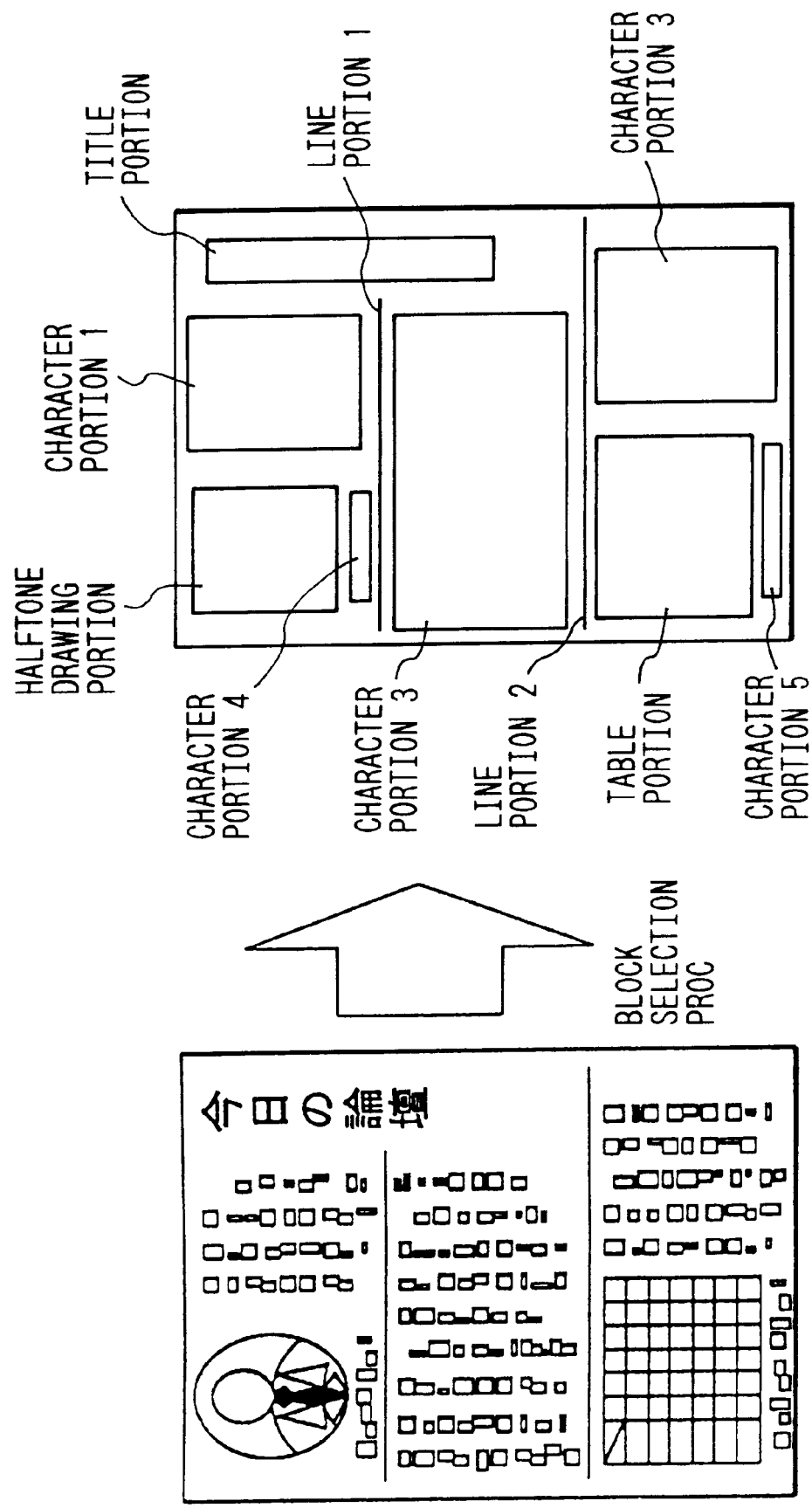

Next, in S2403 block selection processing for a binary image after processing stored in the memory 904 is performed by CPU 906. A description of block selection processing will be omitted because the processing was described in detail before. By block selection processing, block selection processing result information comprising attribute classification information in which each unit based upon black pixel connected components in an image is classified as any of character, a title, a frame, a table, a half-tone graphic form, a linear graphic form and line blocks and area information showing the coordinates and size (hereinafter called unit area) of the smallest rectangle around each unit in an image is obtained. The block selection processing result information is temporarily stored in the image memory unit 9. A concrete example of the data structure of the result of actual block selection processing and block selection processing result data created in relation to the result is shown in FIGS. 30A and 30B.

Next, in S2404 image processing for each unit area in a multi-valued image stored in the memory 904 in S2401 based upon block selection processing result information stored in the image memory unit 9 is executed by CPU 906.

Image processing such as edge emphasis processing, contour detection processing, patterning processing, masking/trimming processing, fatting processing, shading processing, negative/positive inversion processing, and italicizing processing, mirroring processing, and half-tone dot meshing processing is executed by CPU 906 as described above. Different image processing is performed depending upon an attribute of an unit area in an image by determining attribute classification information of each unit area in a multi-valued image obtained as a result of S2403 and the correspondence between the information and the above-described processing beforehand. An example of a reference table showing the correspondence between attribute classification information of units and each image processing is shown in T2601 in FIG. 31. The contents of the corresponding image processing shown in T2601 in FIG. 31 may be predetermined and the reference table can also be updated by input from the computer terminal connected to the console unit 124 of the reader unit 1 and the computer I/F unit 7. Similar image processing for all areas in an image can be performed independent of an attribute of a unit area in an image and it is also allowed that no image processing is performed. An image obtained in S2404 is stored in the memory 904 again.

Next, in S2405 binarization processing for each unit area in a multi-valued image obtained in S2404 based upon block selection processing result information stored in the image memory unit 9 is executed by CPU 906. Binarization processing by CPU 906 contains simple binarization and a method of error diffusion as described above. A binary image, which is an image formed by binarization processing combined for every partial area, can be formed by determining attribute classification information of each unit area, in a multi-valued image obtained in S2404 and determining the correspondence between the information and the above-described binarization processing beforehand and performing different binarization processing depending upon an attribute of a unit area in an image. An image formed by combining a binary image and a multi-valued image are combined for every partial area (mixed binary and multi-valued image) and can also be formed by determining whether binarization processing is performed or not depending upon an attribute of a unit area in an image beforehand. An example of a reference table showing the correspondence between attribute classification information of units and different binarization processing is shown in T2602 in FIG. 31. It may be determined beforehand which of the above-described two binarization processing procedures is to be executed for attributes classified based upon the result of block selection or whether binarization processing itself is to be performed or not. The above-described correspondence can also be modified by input from the computer terminal 12 connected to the console unit 124 of the reader unit 1 and the computer I/F unit 7. A similar binarization processing for all areas in an image can be performed independent of an attribute of a unit area in an image and it is also allowed that no binarization processing is performed. An image obtained in S2405 is stored in the memory 904 again.

At last, in S2406 compression processing for a binary image and a mixed binary and multi-valued image obtained in S2405 is executed based upon block selection processing result information stored in the image memory unit 9 by CPU 906. Image compression processing by CPU 906 contains Joint Bi-level Imaging Group (JBIG) compression for a binary image and Joint Photographic Experts Group (JPEG) compression for a multi-valued image and compression image information data comprising data of a binary image portion for which JBIG compression is performed and data of a multi-valued image portion for which JPEG compression is performed in a mixed binary and multi-valued image can be created. JBIG compression is a lossless encoding format using algebraic signs and JPEG compression is a less encoding format using Discrete Cosine Transform (DCT). An example of a reference table showing the correspondence between attribute classification information of units and compression processing procedures at this time is shown in T2603 in FIG. 31. In S2406, compression processing can be performed for only a binary image portion in a mixed binary and multi-valued image and on the contrary, compression processing can be also performed for only a multi-valued image portion in a mixed binary and multi-valued image. It is also allowed that no compression processing is performed. Image information data obtained in S2406 is stored in the memory 904 again.

Figure 32:
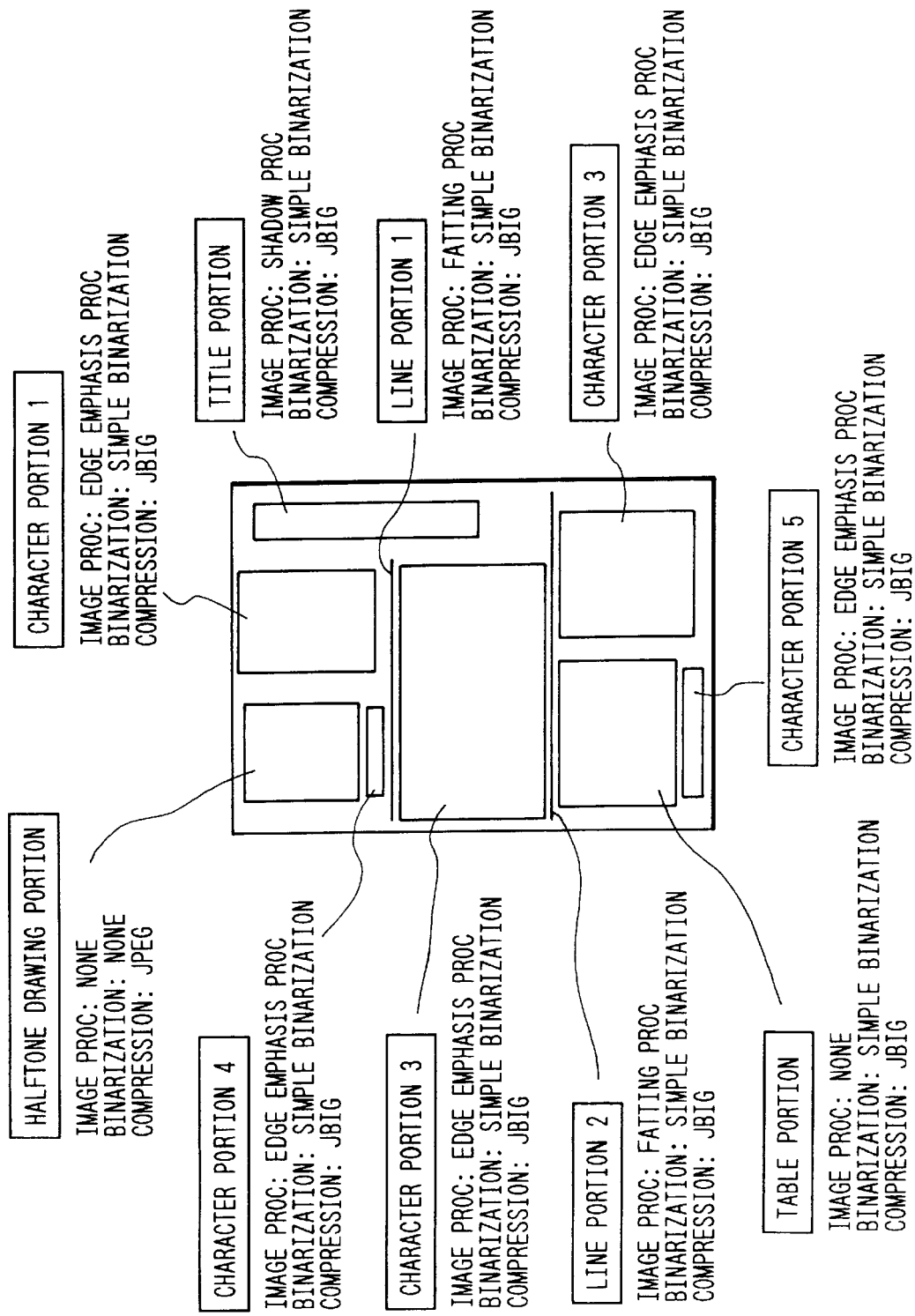
FIG. 32 is a concrete example of a list of processing executed for every unit area defined in a reference table.

By the above-described steps, image information data of images for which different image processing, binarization processing and compression processing are performed, depending upon a partial area of a multi-valued image stored in the memory 904, is created. A list of processing for each unit area of an image shown in FIG. 30A executed in S2404 to S2406 based upon the contents of the reference table shown in FIG. 31 is shown in FIG. 32.

Figure 29:
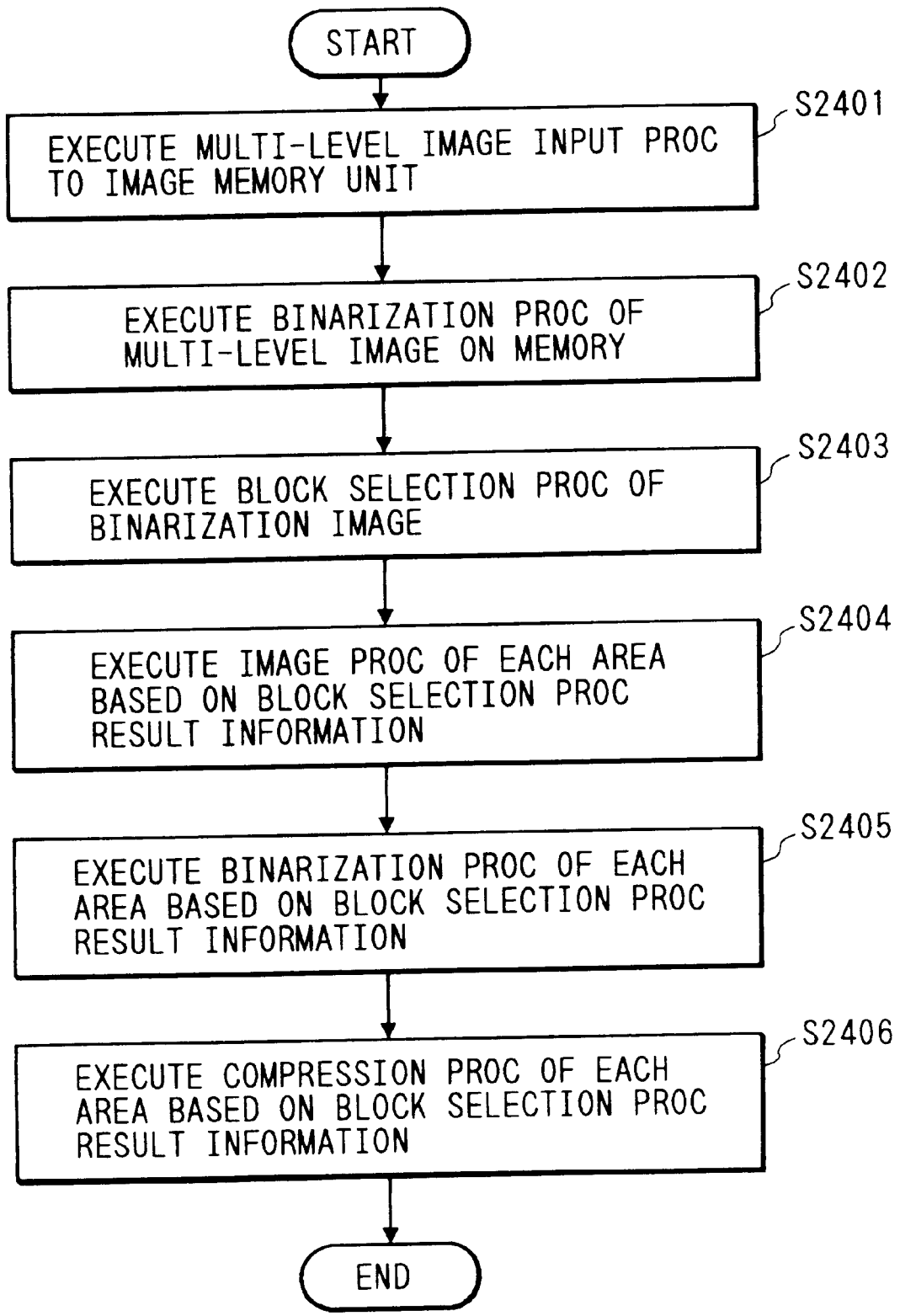
FIG. 29 is a flowchart showing an overview of image information data forming processing by image processing, processing for converting to binarization and compression processing according to the result of block selection processing in an embodiment.

Image information data created by the processing method shown in FIG. 29 can be output by an external output processor in this image forming system.

In this image forming system, the printer unit 2, the facsimile unit 4, an external storage device 6 connected to the file unit 5 and the computer terminal connected to the computer I/F unit 7 function as an external output processor.

The printer unit 2 can output any image information data except a mixed binary and multi-valued image formed in S2405 and an image compressed in S2406. Since the details of outputting image information data stored in the image memory 904 to the printer unit 2 via the core unit 10 have already been described in the description of the core unit 10, it is omitted here.

The file unit 5 can output any image information data obtained in S2306 to S2401. Since the details of outputting image information data stored in the image memory 904 to the file unit 5 via the core unit 10 has already been described in the description of the core unit 10, it is omitted here.

The computer terminal 12 connected to the computer I/F unit 7 can output any image information data obtained in S2306 to S2401. Since the detail. of outputting image information data stored in the image memory 904 to the computer terminal connected to the computer I/F unit 7 via the core unit 10 have already been described in the description of the core unit 10, it is omitted here.

Example of Transform

CPU 906 of the image memory unit 9 is provided with the functions of image processing, such as edge emphasis processing, contour detection processing, patterning processing, masking/trimming processing, fatting processing, shading processing, negative/positive inversion processing, italicizing processing, mirroring processing and half-tone dot meshing processing. However, other image processing functions known technologically can be added to the above-described functions provided to CPU 906.

CPU 906 of the image memory unit 9 is provided with functions of binarization processing such as simple binarization and a procedure of error diffusion described above and shown as an example in this embodiment. However, other binarization processing functions known technologically can be added to the above-described functions provided to CPU 906.

CPU 906 of the image memory unit 9 is provided with the functions of image compression processing, such as compression procedures shown as an example in this embodiment, that is, Joint Bi-level Imaging Group (JBIG) compression for a binary image and Joint Photographic Experts Group (JPEG) compression for a multi-valued image. However, other compression processing functions known technologically can be added to the above-described functions provided to CPU 906. That is, a vector quantizing method may be used in addition to JBIG compression, which is reversible encoding and JPEG compression adopting MR and MMR encoding, which is irreversible encoding.

In this embodiment, a facsimile unit provided with facsimile functions is used as an external output processor provided with communication facilities. However, other external output processors known technologically and provided with communication facilities such as a G4 facsimile, a local area network communication device, and a wide area network communication device can be also added to this image forming system. Of course, the facilities capable of communicating multi-level compression data can be used.

Embodiment 2

If a wrong recognition occurs in block selection processing of the above-described embodiment, the performance of block selection processing itself deteriorates and if further, character recognition processing is performed based upon the result of block selection processing, character recognition may be performed for images except characters. As described above, wrong recognition caused in block selection processing causes deterioration of the performance of character recognition processing.

Therefore, this embodiment is provided with block selection processing means, means for performing character recognition processing for stored images by pattern matching and means for modifying a block selection processing result based upon the result of character recognition processing to solve the above-described problems.

In concrete, temporary character recognition processing is performed for a partial area in an image with the attribute about which wrong recognition may occur in block selection processing, and it is judged based upon the extent of pattern matching whether the image is a character image or not and the result of block selection processing can be modified based upon the judgment.

Figure 33:
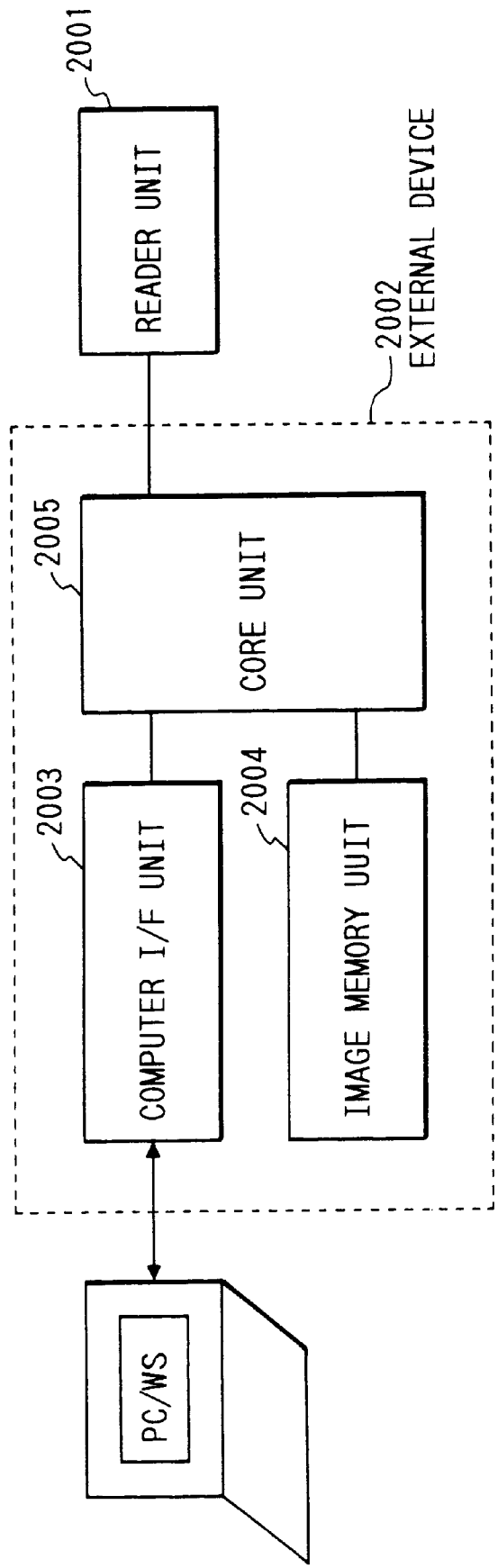
FIG. 33 shows a general view of an image forming apparatus.

FIG. 33 is a block diagram showing the configuration of an image processing apparatus according to the second embodiment of the invention.

Referring to FIG. 33, a reference number 2001 designates an image input unit (hereinafter called a reader unit) for converting an original to image data and 2002 designates an external device provided with a variety of functions electrically connected to the reader unit 2001. The external device 2002 is provided with a computer I/F unit 2003 for connecting to a computer, an image memory unit 2004 for temporarily storing information from the reader unit 2001 and sent from a computer, for performing processing (block selection processing) for allocating an attribute of a partial area in an image to image information temporarily stored and for performing character recognition processing for image information temporarily stored, and a core unit 2005 for controlling the above-described functions. The functions provided to each unit 2001 to 2005 will be described in detail below.

(Description of the reader unit 2001)

Figure 34:
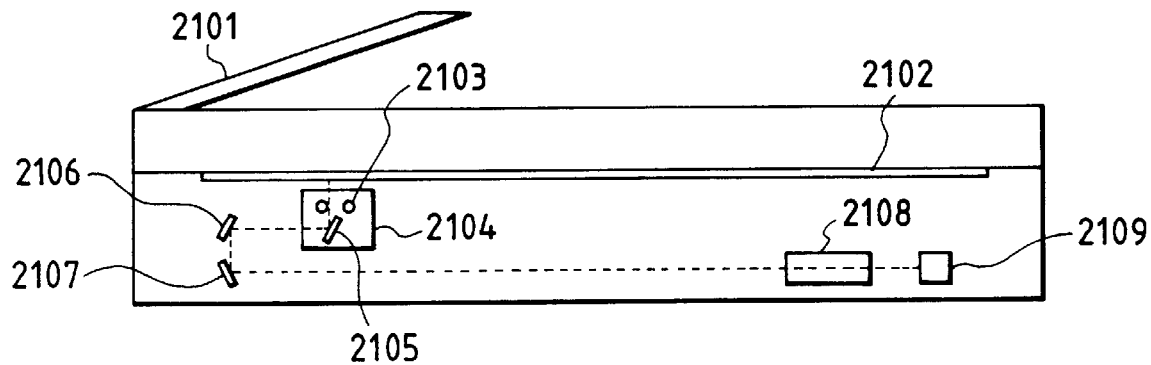
FIG. 34 shows a block diagram of a reader unit 2001.

FIG. 34 is a cross section showing the configuration of the reader unit 2001 and its configuration and operation will be described below.

An original piled on an original feeder 2101 is sequentially carried on a glass face of an original bedplate 2102, one by one. When an original is carried, a lamp 2103 of a scanner unit is lit to irradiate an original with the scanner unit 2104 moved. Reflected light against an original is input to CCD image sensor 2109 (hereinafter called CCD) through lens 2108 via mirrors 2105, 2106 and 2107 in that order.

Figure 35:
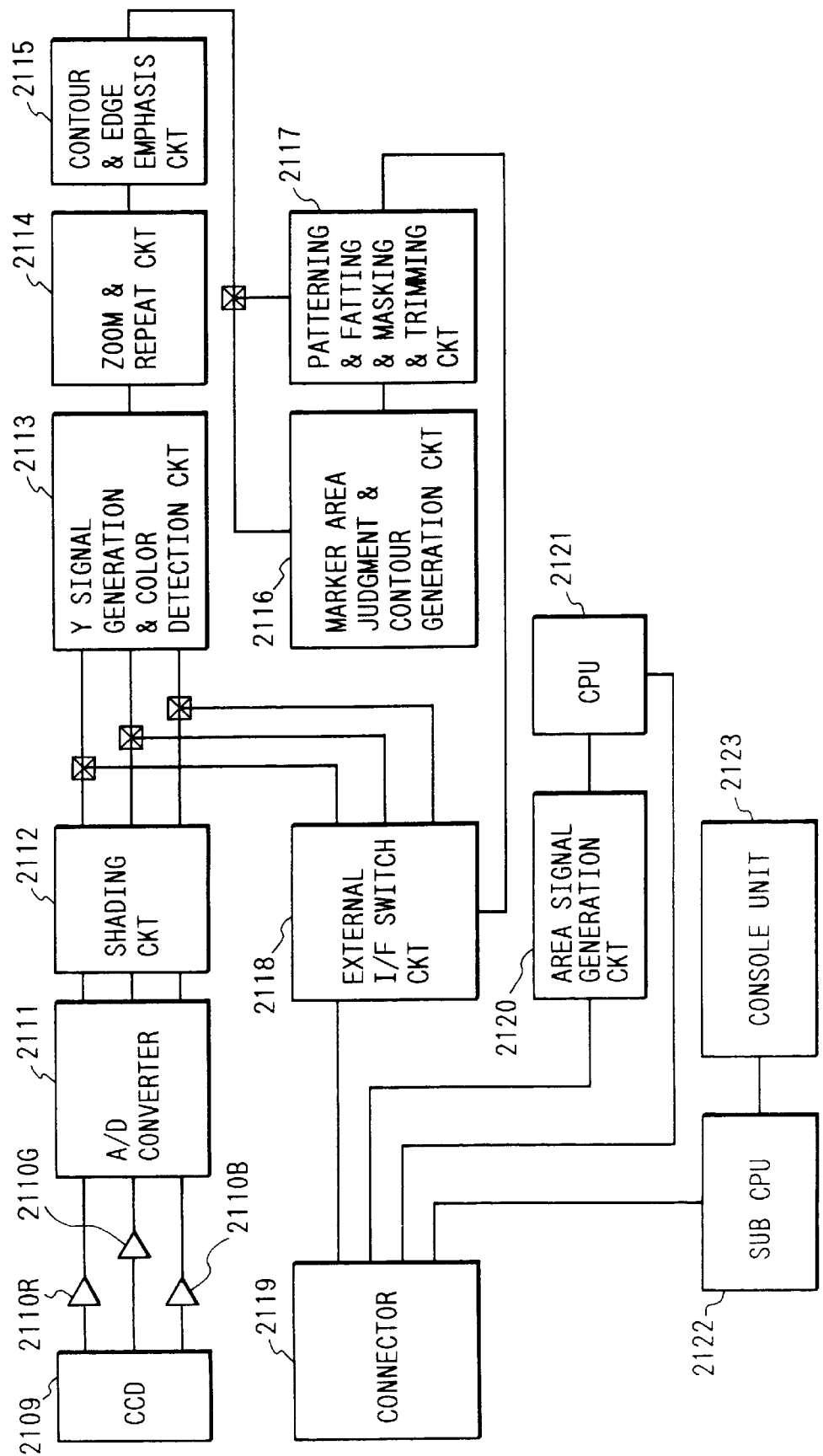
FIG. 35 shows a block diagram of an image processor unit in a reader unit 2001.

FIG. 35 is a circuit block diagram showing the configuration of signal processing in the above-described reader unit 2001 and its configuration and operation will be described below.

Image information input to CCD 2109 is converted from an optical signal to an electric signal here. Color information from CCD 2109 is amplified depending upon an input signal level of an A/D converter 2111 in amplifiers 2110R, 2110R and 2110B. A signal output from the A/D converter 2111 is input to a shading circuit 2112 and here the unevenness of distribution of light from the lamp 2103 and that of sensitivity of CCD is corrected. A signal from the shading circuit 2112 is input to a Y signal generation and color detection circuit 2113 and an external I/F switch circuit 2118.

The Y signal generation and color detection circuit 2113 operates a signal from the shading circuit 2112 using the following expression to obtain a Y signal:

$Y=0.3R+0.6G+0.1B$

Further, the reader unit is provided with a color detection circuit for separating seven colors from signals R, G and B and outputting a signal for each color. A signal output from the Y signal generation and color detection circuit 2113 is input to a zoom and repeat circuit 2114. Zooming in the vertical direction is performed by varying the scanning speed of the scanner unit 2104 and zooming in the horizontal direction is performed by the zoom and repeat circuit 2114. The plural same images can be also output by the zoom and repeat circuit 2114. A contour/edge emphasis circuit 2115 obtains information of an emphasized edge and contour by emphasizing a high frequency component of a signal from the zoom and repeat circuit 2114. A signal from the contour/edge emphasis circuit 2115 is input to a marker area judgment and contour generation circuit 2116 and a patterning/fatting/masking/trimming circuit 2117.

The marker area judgment and contour generation circuit 2116 reads data in a portion on an original painted by a marker of a specified color and generates contour information of a marker. This contour information is fatted, masked or trimmed in the next patterning/fatting/masking/trimming circuit 2117. In the above-described circuit, patterning is also performed by a signal including data of a detected color from the Y signal generation and color detection circuit 2113.

Next, the external I/F switch circuit 2118 for interfacing with an external device 2002 will be described below.

If image information from the reader unit 2001 is output to an external device 2002, the external I/F switch circuit 2118 outputs image information from the patterning/fatting/masking/trimming circuit 2117 to a connector 2119. If image information from an external device 2002 is input to the reader unit 1, the external I/F switch circuit 2118 transfers image information from the connector 2119 to the Y signal generation and color detection circuit 2113.

The above-described image processing is executed according to an instruction of CPU 2121 and an area generation circuit 2120 generates timing signals required for the above-described image processing by a value specified by CPU 2121. CPU 2121 further communicates with an external device 2002 with communication facilities provided to CPU 2121. SubCPU 2122 controls the console unit 2123 and communicates with an external device with communication facilities provided to subCPU 2122.

(Description of an external device 2002)

An external device 2002 is connected to the reader unit 1 via a cable and a core unit 2005 in the external device 2002 controls signals and functions. The external device 2002 is provided with a computer I/F unit 2003 for interfacing with a computer, an image memory unit 2004 for temporarily storing information from the reader unit 2001 and sent from a computer and for executing block selection processing for allocating an attribute of a partial area in an image to temporarily stored image information and character recognition processing, and the core unit 2005 for controlling the above-described functions.

Referring to a block diagram shown in FIG. 36, the configuration and operation of the core unit 2005 of the external device 2002 will be described below.

(Description of the core unit 2005)

Figure 36:
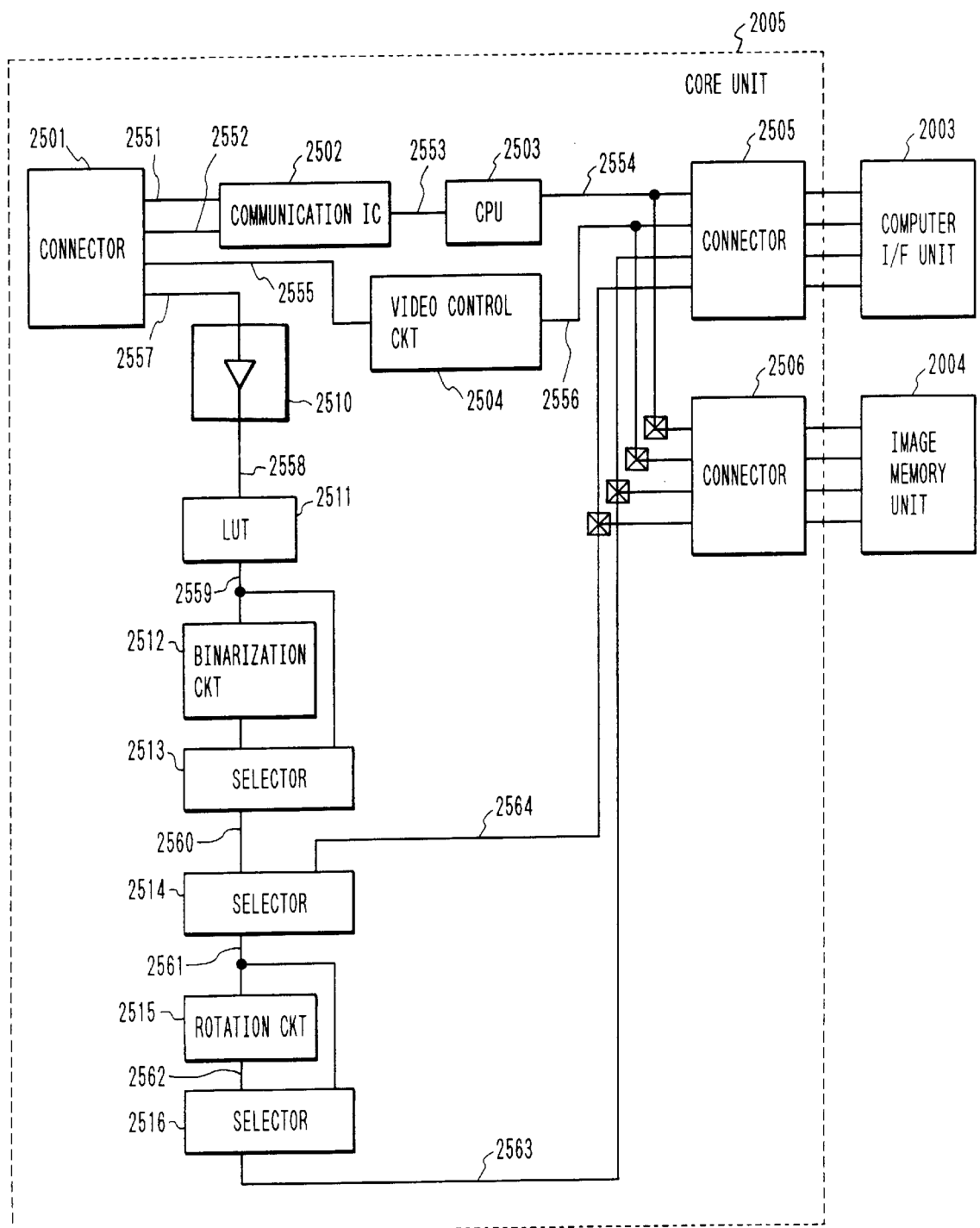
FIG. 36 shows a block diagram of a core unit 2005.

FIG. 36 is a block diagram showing the detailed configuration of the above-described core unit 2005.

A connector 2501 of the core unit 2005 is connected to the connector 2120 of the reader unit 2001 via a cable. The connector 2501 is provided with four types of signal lines. A signal 2557 is a multi-valued 8-bit video signal and a signal 2555 is a control signal for controlling a video signal. A signal 2551 communicates with CPU 2121 in the reader unit 2001. A signal 2552 communicates with subCPU 2122 in the reader unit 2001. A signal 2551 and a signal 2552 are processed in a communication IC 2502 so that the signals may meet a communication protocol, and transfer communication information to CPU 2503 via CPU bus 2553.

A signal 2557 can receive information from the reader unit 2001 in the core unit 2005 and the signal is output as a signal 2558 via a buffer 2501. A signal 2558 is a multi-valued 8-bit video signal from the reader unit 2001 and is input to LUT 2511 on the next stage. LUT 2511 converts image information from the reader unit 2001 to a desired value according to a look-up table. A signal 2559 output from LUT 2511 is input to a binarization circuit 2512 or a selector 2513. The binarization circuit 2512 is provided with a simple binarization function for binarizing a multi-valued signal 2559 at a fixed slice level, a binarization function by a variable slice level in which a slice level varies depending upon values of pixels around a target pixel and a binarization function by error diffusion. If binarized information is 0, a multi-valued signal is converted to an 00H multi-valued signal and if binarized information is 1, a multi-valued signal is converted to a FFH multi-valued signal, and the 00H and FFH multi-valued signals are input to a selector 2513 on the next stage. The selector 2513 recieves a signal from LUT 2511 or a signal output from the binarization circuit 2512. A signal 2560 output from the selector 2513 is input to a selector 2514. The selector 2514 selects a signal 2564 equal to a video signal output from the computer I/F unit 2003 and the image memory unit 2004 and input to the core unit 2005 via the connectors 2505 and 2506 respectively, or a signal 2560 output from the selector 2513 according to an instruction of CPU 2503. A signal 2561 output from the selector 2514 is input to a rotation circuit 2515 or a selector 2516. The rotation circuit 2515 is provided with a function for rotating a phase of an input video signal by +90, −90 or +180 degrees. The rotation circuit 2515 stores information output from the reader unit 1 and converted to a binary signal in the binarization circuit 2512. Next, the rotation circuit 2515 rotates the stored information and reads it according to an instruction of CPU 2503. The selector 2516 selects a signal 2562 output from the rotation circuit 2515 or a signal 2561 not input to the rotation circuit 2515 and outputs the selected signal to the connector 2505 connected to the computer I/F unit 2003 and the connector 2506 connected to the image memory unit 2004 as a signal 2563.

The signal line 2563 is a synchronous 8-bit simplex video bus for transferring image information from the core unit 2005 to the computer I/F unit 2003 and the image memory unit 2004. A signal line 2564 is a synchronous 8-bit simplex video bus for inputting image information from the computer I/F unit 2003 and the image memory unit 2004. A video control circuit 2504 controls the above-described synchronous buses 2563 and 2564 by outputting a signal 2556. Another signal line 2554 is connected to the connectors 2505 and 2506. The signal line 2554 is a duplex 16-bit CPU bus and receives or sends data asynchronously. The above-described two video buses are used for transferring information among the computer I/F unit 2003, the image memory unit 2004 and the core unit 2005.

A signal 2564 from the computer I/F unit 2003 or the image memory unit 2004 is input to a selector 2514. A signal 2561 output from the selector 2514 is input to the rotation circuit 2515 or the selector 2516. The rotation circuit 2515 performs processing for rotating a phase of an input video signal by +90, −90 or +180 degree. The selector 2516 selects a signal 2562 output from the rotation circuit 2515 or a signal 2561 not input to the rotation circuit 2515 and outputs the selected signal to the connector 2505 connected to the computer I/F unit 2003 or the connector 2506 connected to the image memory unit 2004 as a signal 2563.

The flow of a signal between the core unit 2005 and each unit will be described below.

(Operation of the core unit 2005 according to information from the computer I/F unit 2003)

The computer I/F unit 2003 interfaces with a computer connected to an external device 2002. The computer I/F unit 2003 is provided with plural interfaces for communicating with SCSI, RS232C and Centronics interfaces. The computer I/F unit 2003 is provided with the above-described three types of interfaces and information from each interface is sent to CPU 2503 via the connector 2505 and a data bus 2554. CPU 2503 performs control based upon the contents of the sent information.

(Operation of the core unit 2005 according to information from the image memory unit 2004)

The case that image information read from the reader unit 2001 is output to the image memory unit 2004 will be described below.

CPU 2503 communicates with CPU 2121 of the reader unit 2001 via communication IC 2502 to issue an original scan instruction. According to the instruction, the scanner unit 2104 scans an original and the reader unit 2001 outputs the image information to the connector 2120. The reader unit 2001 and the external device 2002 are connected via a cable and image information from the reader unit 2001 is input to the connector 2501 of the core unit 2005. Image information input to the connector 2501 is sent to LUT 2511 via the multi-valued 8-bit signal line 2557 and a buffer 2510. A signal 2559 output from LUT 2511 transfers multi-valued image information to the image memory unit 2004 via selectors 2513, 2514 and 2516 and the connector 2506.

Next, the case that data from the computer I/F unit 2003 is output to the image memory unit 2004 will be described below.

When CPU 2503 receives a data send request instruction from the computer I/F unit 2003 via the connector 2507 and the data bus 2554, CPU 2503 outputs a data send instruction in response to it to the computer I/F unit 2003 via the connector 2505. The computer I/F unit 2003 transfers data to the core unit 2005 via a connected computer terminal according to this instruction. The data transferred to the core unit 2005 is transferred to the connector 2505. The data transferred to the connector 2505 is transferred to the image memory unit 2004 via the data bus 2554 and the connector 2506.

Next, the case that data from the image memory unit 2004 is output to a computer terminal connected to the computer I/F unit 2003 will be described below.

First, data from the image memory unit 2004 is input to the core unit 2005 via the connector 2506. The data input to the core unit 2005 is output to the computer I/F unit 2003 via the data bus 2554 and the connector 2505.

(Description of the computer I/F unit 2003)

Figure 37:
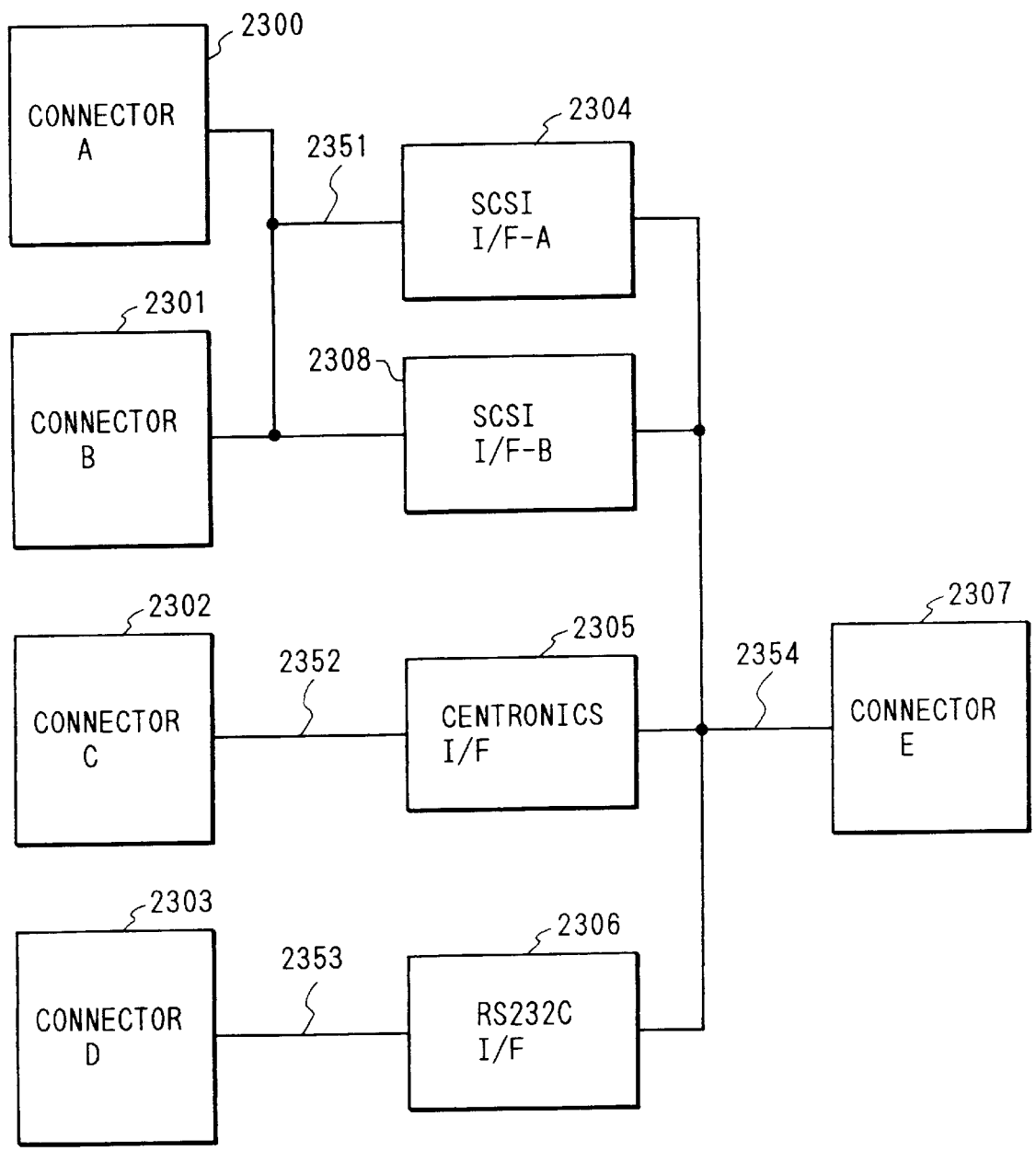
FIG. 37 shows a block diagram of a computer I/F unit 2003.

Referring to FIG. 37, the computer I/F unit 2003 will be described below.

A connector A 2003 and a connector B 2301 are dedicated to SCSI interface. A connector C 2302 is dedicated to Centronics interface. A connector D 2303 is dedicated to RS232C interface. A connector E 2307 is provided for connection to the core unit 2005.

SCSI interface is provided with two connectors comprising the connectors A 2300 and B 2301 and if it is connected to a device provided with plural SCSI interfaces, the connectors A 2300 and B 2301 are cascaded. If the external device and a computer device are connected, the connector A 2300 and the computer device are connected via a cable and a terminator is connected to the connector B 2301, or the connector B 2301 and the computer device are connected via a cable and a terminator is connected to the connector A 2300. Information from the connector A 2300 or the connector B 2301 is input to SCSI I/F-A 2304 or SCSI I/F-B 2308 via a signal line 2351. After SCSI I/F-A 2304 or SCSI I/F-B 2308 performs a procedure according to SCSI protocol, it outputs the data to the connector E 2307 via a signal line 2354. The connector E 2307 is connected to CPU bus 2554 of the core unit 2005 and CPU 2503 of the core unit 2005 receives information input to the connector for SCSI interface, that is, the connector A 2300 or the connector B 2301 from CPU bus 2554. If data from CPU 2503 of the core unit 2005 is output to SCSI connector, that is, the connector A 2300 or the connector B 2301, comply with a procedure reverse to the above-described procedure.

The Centronics interface is connected to the connector C 2302 and a signal from the connector is input to Centronics I/F 2305 via a signal line 2352. Centronics I/F 2305 receives or sends data according to a procedure of determined protocol and outputs the data to the connector E 2307 via the signal line 2354. The connector E 2307 is connected to CPU bus 2554 of the core unit 2005 and CPU 2503 of the core unit 2005 receives information input from CPU bus 2554 to the connector for Centronics I/F, that is, the connector C 2302.

RS232C interface is connected to the connector D 2303 and a signal input to the connector D 2303 is input to RS232C I/F 2306 via a signal line 2353. RS232C I/F 2306 receives data according to a procedure of determined protocol and outputs the data to the connector E 2307 via the signal line 2354. The connector E 2307 is connected to CPU bus 2554 of the core unit 2005 and CPU 2503 of the core unit 2005 receives information input to the connector for RS232C I/F, that is, the connector D 2303 from CPU bus 2554. If data from CPU 2503 of the core unit 2005 is output to the connector for RS232C I/F, that is, the connector D 2303, comply with a procedure reverse to the above-described procedure.

(Description of the image memory unit 2004)

Figure 38:
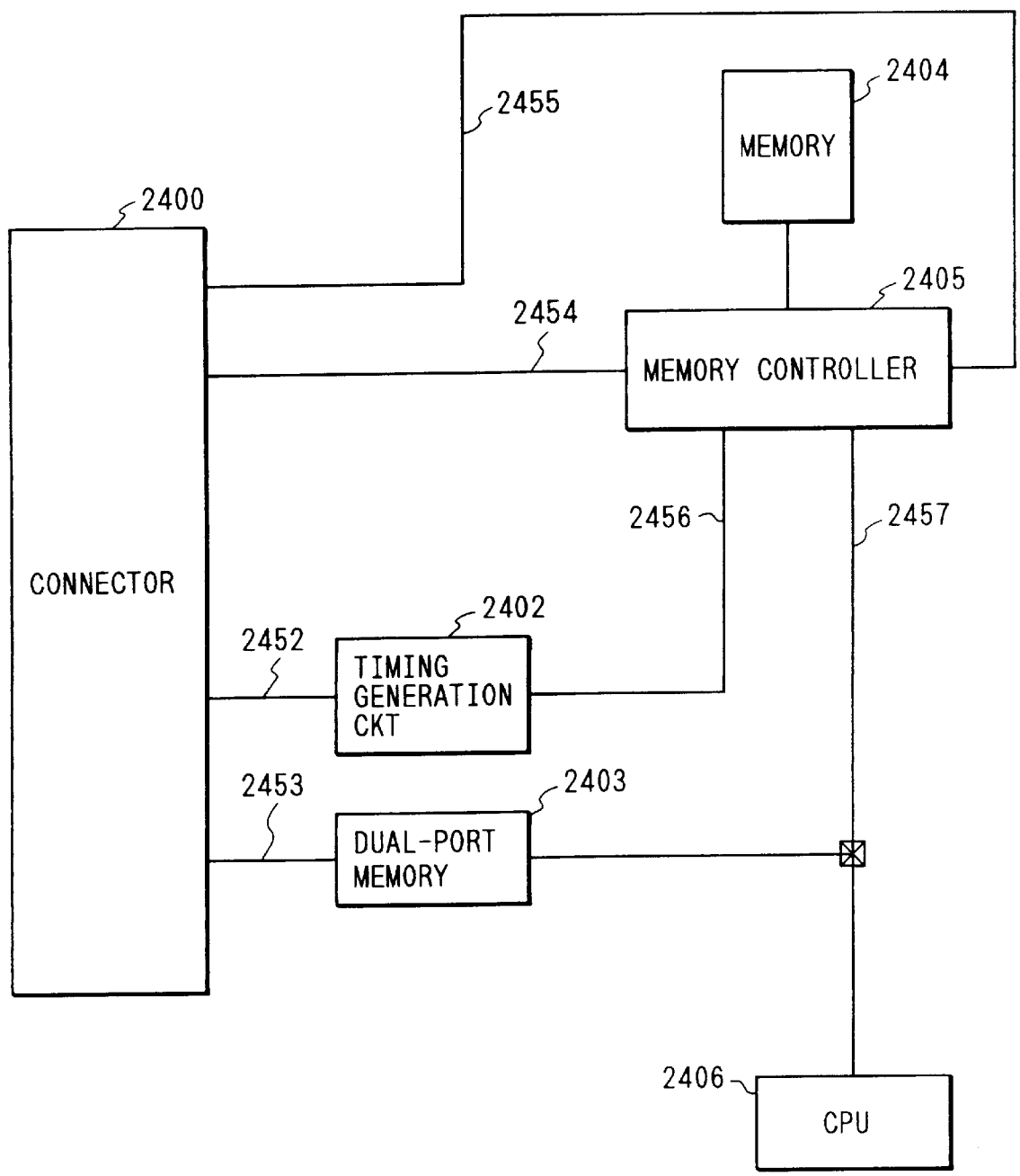
FIG. 38 shows a block diagram of an image memory unit 2004.

Referring to a block diagram shown in FIG. 38, the configuration and operation of the image memory unit 2004 will be described below.

The image memory unit 2004 is connected to the core unit 2005 via the connector 2400 to receive or send signals. An input signal 2454 is stored in memory 2404 under control of a memory controller 2405. The memory controller 2405 is provided with three functions comprising a mode for receiving or sending data from/to the memory 2404 and CPU bus 2457 according to an instruction of CPU 2406, a mode for storing a signal 2454 in the memory 2404 under control of a timing generation circuit 2402 and a mode for reading the contents of the memory from the memory 2404 and outputting them to a signal line 2455. The memory 2404 is provided with a work memory with capacity sufficient to enable execution of block selection processing and character recognition processing described later in addition to a capacity of 32M bytes enabling storage of an image equivalent to the paper size of A3 at a resolution of 400 dpi and at 256 scales. The timing generation circuit 2402 is connected to the connector 2400 via a signal line 2452 and is activated by a control signal such as HSYNC, HEN, VSYNC and VEN from the core unit 2005 to generate a signal for achieving the following two functions. One is a function for storing information from the core unit 2005 in the memory 2404 and another is a function for reading the information from the memory 2404 and transferring it to the signal line 2455. Dual-port memory 2403 is connected to CPU 2503 of the core unit 2005 via a signal line 2453 and is connected to CPU 2406 of the image memory unit 2004 via the signal line 2457. Each CPU receives or sends commands via this dual-port memory 2403.

An embodiment in relation to storing image information input from the reader unit 2001 to the image memory unit 2004 will be described below. First, CPU 2406 controls the memory controller 2405 to connect CPU bus 2454 to a bus connected to the memory 2404. A video signal transferred from the reader unit 2001 to the core unit 2005 is input from the connector 2400 and is sent to the memory controller 2405 via the signal line 2454. The memory controller 2405 lets the timing generation circuit 2402 generate a timing signal 2456 according to a signal 2452 from the core unit 2005 and stores the above-described signal 2454 in the memory 2404 with this timing signal.

Next, an embodiment in relation to storing data input from an external computer terminal connected to the computer I/F unit 2003 via the core unit 2005 in the image memory unit 2004 will be described below. Data received by the core unit 2005 from the external computer terminal is input to the image memory unit 2004 as described in relation to the core unit 2005 in detail. The data input to the image memory unit 2004 is transferred to the dual-port memory 2403 via the connector 2400. The data transferred to the dual-port memory 2403 is sequentially read by CPU 2406 and is stored in the memory 2404 via the memory controller 2405 after CPU 2406 of the image memory unit 2004 connects the memory 2404 to CPU bus 2457 under control of the memory controller 2405.

Next, an embodiment in relation to outputting data stored in the memory 2404 of the image memory unit 2004 to an external computer terminal connected to the computer I/F unit 2003 via the core unit 2005 will be described below. First, CPU 2406 connects the memory 2404 to CPU bus 2457 under control of the memory controller 2405. CPU 2406 sequentially reads image information from the memory 2404 and transfers it to the dual-port memory 2403. CPU 2503 of the core unit 2005 reads the image information stored in the dual-port memory 2403 of the image memory unit 2004 via the signal line 2453 and the connector 2400 and transfers this information to the computer I/F unit 2003. Since the transfer of information from the computer I/F unit 2007 to the computer has already been described above, the description is omitted.

CPU 2406 of the image memory unit 2004 is provided with a function for executing block selection processing which is processing for allocating an attribute of a partial area in an image such as a character, a title, a frame, a table, a half-tone graphic form, a linear graphic form and a line to an image stored in the memory 2404.

An embodiment of block selection processing in the image memory unit 2004 will be described in detail below.

First, image data which is a target of block selection processing is stored in the memory 2404. Image data in this case may be read from the reader unit 2001 or may be transferred from the computer connected to the computer I/F unit 2003. However, as block selection processing can be also performed for only binary image data in this embodiment, if image data is read from the reader unit 2001 or if image data transferred from the computer connected to the computer I/F unit 2003 is multi-valued image data, the above-described image data is required to be stored in the memory 2404 after the data is binarized in the binarization circuit 2512. If block selection processing is performed for multi-valued image data stored in the memory 2404 of the image memory unit 2004 beforehand, the multi-valued image data is required to be stored in the memory 2404 after the image data is binarized using a binarization processing function provided to CPU 2406.

Block selection processing is performed for binary image data stored in the memory 2404 as described above. Since the detail of the algorithm of block selection processing is the same as that of the above-described embodiment, the description thereof is omitted.

Block selection processing result information is temporarily stored in the memory 2404.

The block selection processing result information can be transferred to the computer device via the computer I/F unit 2003 to perform a variety of processing operations based upon the block selection processing result information transferred to the computer device. Since the details of transferring information temporarily stored in the memory 2404 to the computer device have been described thereof above, the description is omitted.

CPU 2406 of the image memory unit 2004 is provided with a function for performing character recognition processing for image data temporarily stored in the memory 2404.

An embodiment of character recognition processing in the image memory unit 2004 will be described in detail below.

First, document image data which is a target of character recognition processing is stored in the memory 2404. Image data in this case may be read from the reader unit 2001 or may be transferred from the computer connected to the computer I/F unit 2003. However, as block selection processing can be performed for only binary image data as described above, if image data is read from the reader unit 2001 or if image data transferred from the computer device connected to the computer I/F unit 2003 is multi-valued image data, the image data is required to be stored in the memory 2404 after the image data is binarized in the binarization circuit 2512.

Figure 39:
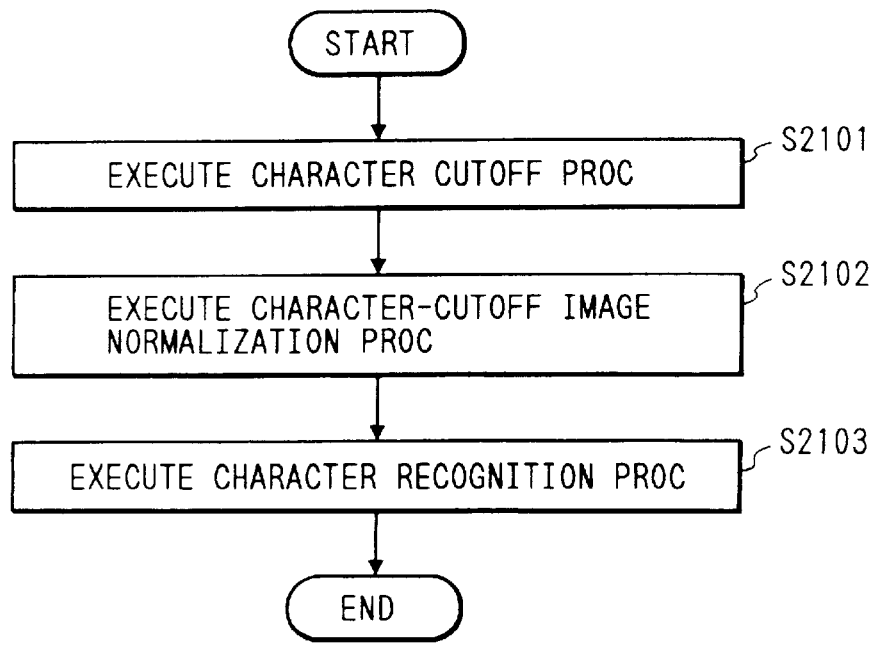
FIG. 39 is a flowchart describing an algorithm of character recognition processing.

Character recognition processing is performed for image data stored in the memory 2404 as described above. The algorithm of character recognition processing in this embodiment will be described in detail referring to a flow-chart shown in FIG. 39.

First, in S2101 character cut-out processing is performed for image data. Character cut-out processing is performed by detecting an image area in units of character in image data and obtaining a rectangle image around the character as a character cut-out image. An image in units of character is generally constituted by connected pixel components, however, if a connected pixel component is much smaller than the adjacent connected pixel component, it is connected to another connected pixel component to be one character image, or is judged a noise image. In the meantime, if a connected pixel component is much larger than the adjacent connected pixel component, a projective histogram in the vertical or horizontal direction is obtained and if a portion in which a value of the histogram is small exists, a connected pixel component is separated at the portion functioning as the boundary. An example of character cut-out processing by separating a connected pixel component as described above is shown in FIG. 40. If a value of the histogram is smaller than a given value, it is judged noise and can be a boundary. Cut-out character image data obtained as described above is temporarily stored in the memory 2404.

Next, in S2102 normalization processing is performed for cut-out character image data obtained by performing character cut-out processing in S2101. In normalization processing, first, a cut-out character image is enlarged or reduced so that the size of the cut-out character image may be equal to that of a rectangle as the reference. Next, the tilt, line width and density of the cut-out character image is changed so that matching of the cut-out character image with the standard pattern in a recognition dictionary provided beforehand may be performed most easily.

Next, in S2103 recognition processing is performed for a character image for which normalization processing is performed in S2102. In recognition processing, first, a feature vector based upon a feature of a contour is extracted. The feature vector obtained as a result and the standard pattern vector of all recognition target characters in the recognition dictionary provided beforehand are matched and a character code corresponding the standard pattern which gives the best match is stored in the memory 2404 as a result of recognition. At this time, data showing the extent of sureness of pattern matching (hereinafter called the extent of pattern matching) performed for the character code stored as a result of recognition is also stored together.

Figure 41:
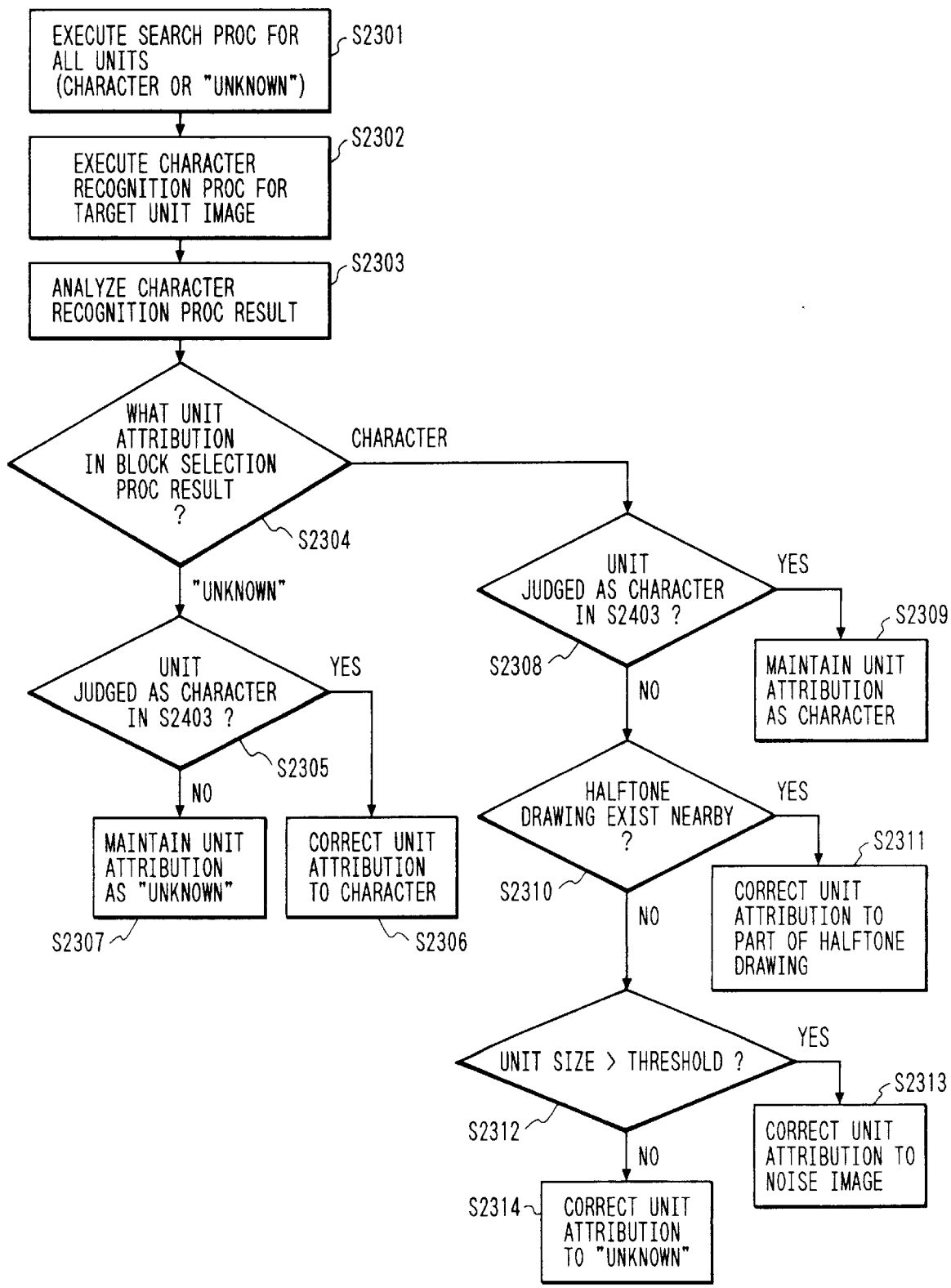
FIG. 41 is a flowchart describing an algorithm of updating processing of attribute classification information according to the result of block selection processing.

In the above-described image forming system, the above-described character recognition processing is performed for a unit judged "unknown" or a character as a result of block selection processing and attribute classification information obtained as a result of block selection processing can be corrected based upon the result of the above-described character recognition processing. Referring to FIG. 41, the details of the processing method in this case will be described below. The following correction processing functions are provided by CPU 2406 of the image memory 2004.

First, in S2301 a unit whose attribute classification information is judged "unknown" or a character is retrieved of the units obtained as a result of block selection processing described in the first embodiment in an overall image. Correction processing of a block selection processing result performed below is executed for only units retrieved here, that is, units whose attribute classification information is "unknown" or a character.

Next, in S2302 character recognition processing is performed for image data of units retrieved in S2301. Since the details of character recognition processing are described above, the description thereof is omitted here.

Next, in S2303 it is reviewed based upon the result of character recognition processing performed in S2302 whether an attribute of a target unit image is a character or not. This review is performed based upon a value of the extent of matching obtained as a result of character recognition processing. That is, in character recognition result obtained in S2302, if the extent of matching is high enough, a target unit image is judged a character. However, if the extent of matching is low, it is judged that no character corresponding to a target unit image exists. Therefore, in the case of the former, an attribute of a target unit is judged a "character" and in the case of the latter, it is judged a "non-character".

Next, in S2304 to S2314 the result of block selection processing is corrected by comparing an attribute of a target unit judged as a result of block selection processing and the result of judgment performed in S2303 of whether it is a character or not.

In S2304, if the block selection processing result of a target unit is "unknown", a judgment is performed again in S2305. If in S2305 the above-described unit which is judged "unknown" in S2303 is judged a character, in S2306 "unknown" of attribute classification information, which is the result of block selection processing, is changed to a character. If the result of the judgment in S2303 is a "non-character", attribute classification information, which is the result of block selection processing is unchanged in S2307 and the attribute of the unit is left "unknown".

In the meantime, if block selection processing result of a target unit is a character in S2304, a judgment is performed again in S2308. If the result of the judgment in S2303 is also unchanged in S2308, attribute classification information of the unit which is the result of block selection processing is left a character also in S2309. If the result of the judgment in S2303 is a character, processing is continued in S2310 to S2314.

First, in S2310 if a unit of a half-tone graphic form exists around, in S2311 a target unit is judged to be a part of the unit which is a half-tone graphic form and the tree structure of the block selection processing result is corrected. In the meantime, if in S2301 no unit of a half-tone graphic form exists around, the judgment of another item is performed in S2312.

If the size of a target unit is smaller than a threshold in S2312, the unit is judged a noise image in S2313. In the meantime, if the size of a target unit exceeds a threshold in S2312, attribute classification information which is the result of block selection processing of the unit is changed to "unknown".

The precision of the block selection processing result can be enhanced by the above-described correction processing.

Transformed Example

In this embodiment, an example that image data is input from a computer terminal connected to the scanner unit 2001 provided with an optical image reading function and the computer I/F unit 2004 is described. However, other external input devices such as a G3/G4 facsimile device provided with communication facilities, a local area network communication device, a wide area network communication device and an external storage device can be added to this embodiment.

In this embodiment, an example that image data and a block selection processing result is output from a computer terminal connected to the computer I/F unit 4 is also described. However, other external output devices such as a printer for printing data on paper, a G3/G4 facsimile device provided with communication facilities, a local area network communication device, a wide area network communication device and an external storage device can be added to this embodiment.

In this embodiment, block selection processing result correction processing is performed for only units whose attribute classification information is judged "unknown" or a character as a result of block selection processing. However, block selection processing result correction processing can be also performed for units with an attribute except the above-described attributes.

As described above, in an embodiment 2, the performance of block selection processing itself can be enhanced and the rate of recognition of character recognition processing performed based upon the result of block selection processing can be enhanced by performing temporary character recognition processing for a partial area of an image with an attribute whose recognition may be wrong in block selection processing, by judging whether the image is a character image or not based upon the extent of pattern matching and by enabling correction of the result of block selection processing based upon the judgment, using block selection processing means, character recognition processing means by pattern matching for a stored image and block selection processing result correction processing means based upon the result of character recognition processing.

Embodiment 3

In the apparatus according to the above-described embodiments, image processing, such as a feature obtained from a document image, is extracted, the image is divided into areas such as a character, a title, a half-tone graphic form, a line and a table based upon the feature, and then OCR processing is performed for a character area to convert it to coded data and compression of multi-valued data is performed for a half-tone area for performed every area, and the result of the image processing is output.

However, the result of division of all areas is not required depending upon the contents of required image processing and for example, if compression of multi-valued data is to be performed for only half-tone areas, only half-tone areas may be divided. Processing time is delayed and the efficiency determine if all areas are divided.

Therefore, an image input/output device according to this embodiment is constituted as follows:

The image input/output device is provided with means for supplying a document image, means for storing the supplied document image, means for dividing the document image into plural areas using features obtained from the document image, means for storing the result of division into areas by the above-described area division means and plural image processing means enabling adequate processing for every divided area of the document image referring to the above-described result of division into areas. In the image input/output device, a procedure of processing by the above-described area division means is switched depending upon the contents of processing by the above-described predetermined image processing means.

Figure 42:
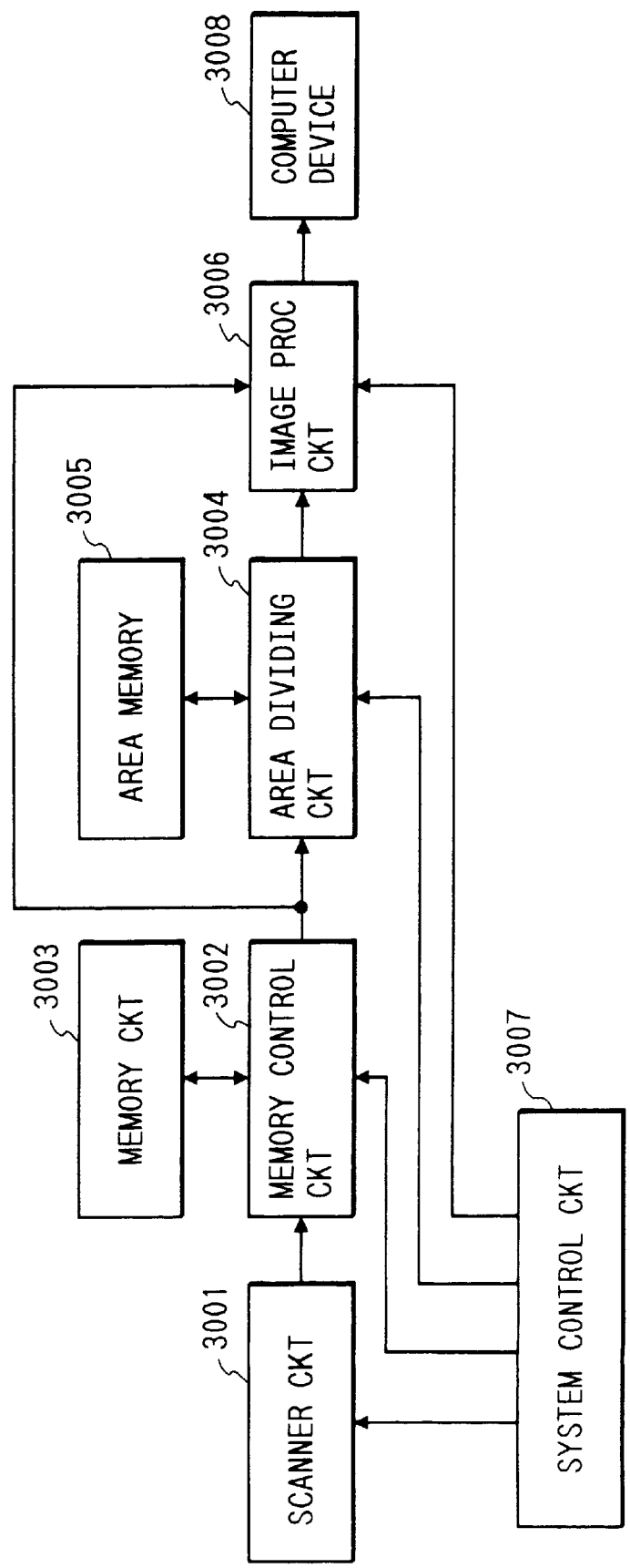
FIG. 42 is a block diagram showing configuration of a third embodiment.

FIG. 42 is a block diagram showing the configuration of an image input/output device according to the third embodiment of the invention. Referring to FIG. 42, a reference number 3001 designates a scanner circuit for scanning a document image, 3002 designates a memory control circuit and 3003 designates a memory circuit. A reference number 3004 designates an area dividing circuit for dividing the document image into areas such as a character, a title, a halftone, a line and a table based upon features of the document image, 3005 designates area memory for storing the result of division into areas, 3006 designates an image processing for circuit enabling adequate processing every divided area of the document image and 3007 designates a system control circuit for controlling the system of the image input/output device. A reference number 3008 designates a computer device connected to the image processing circuit 3006.

Figures 43A, 43B:
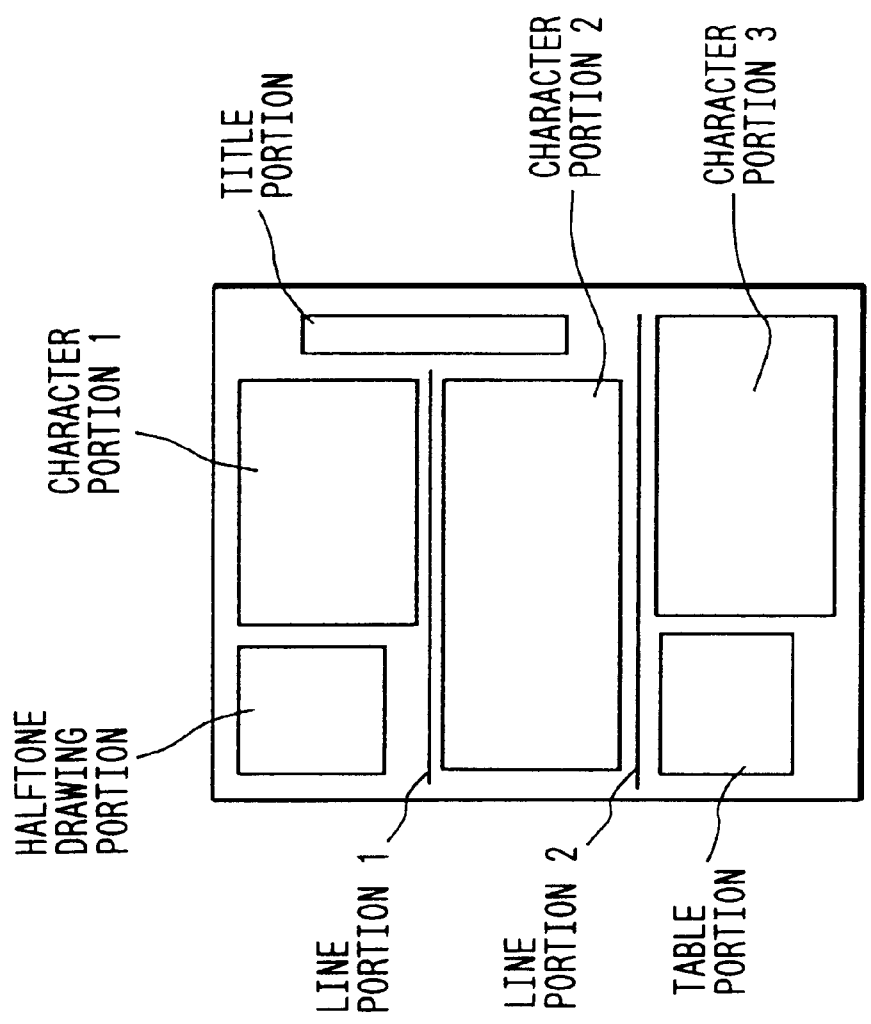
FIGS. 43A and 43B show an example of document image for explaining an operational principle.

FIGS. 43A and 43B show an example of a document image used for explaining the principle of operations according to this embodiment. FIG. 43A shows an original image and 43B shows the result of division into areas.

Figure 44:
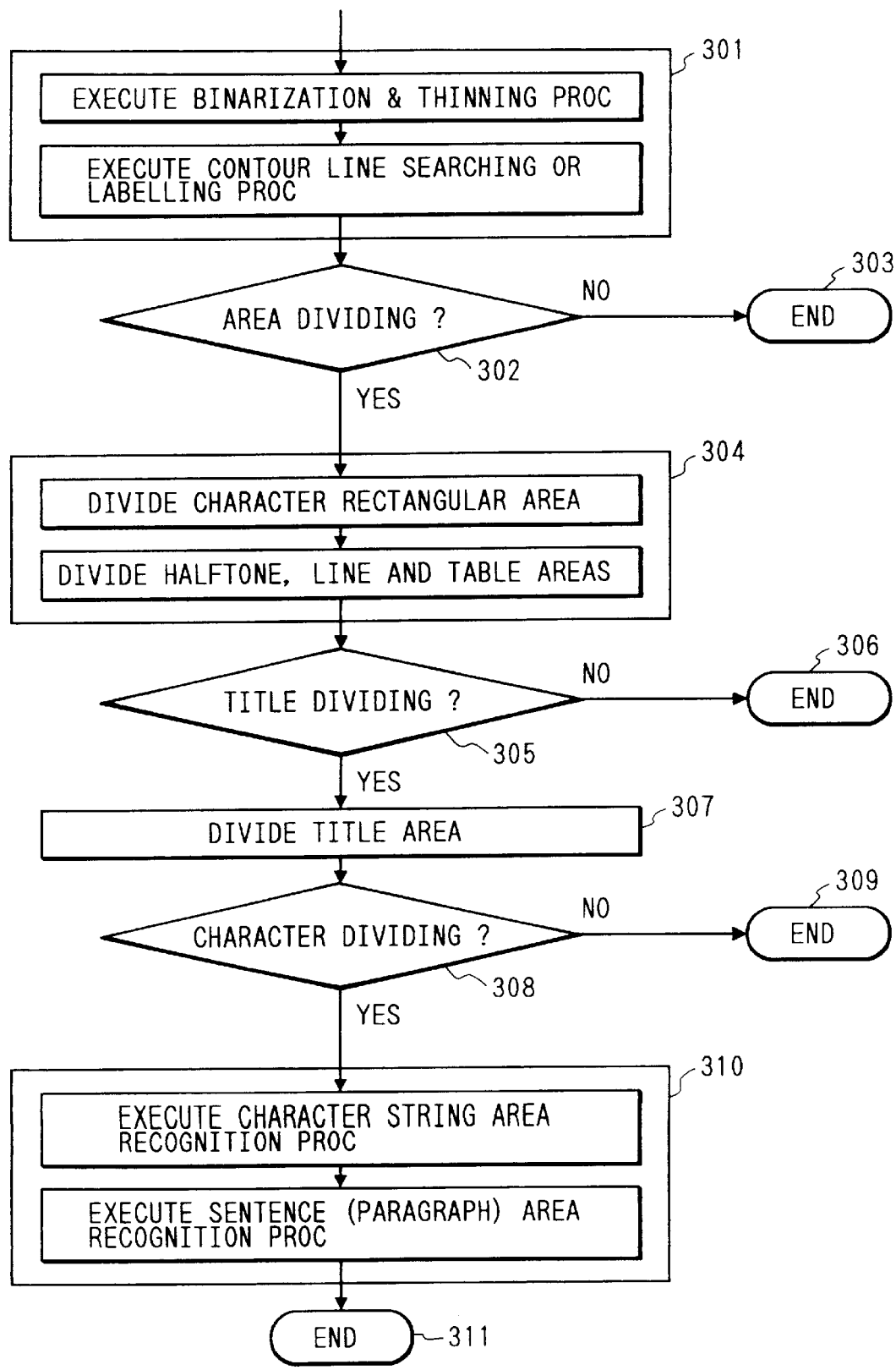
FIG. 44 is a flowchart showing an example of processing procedure for dividing an area.

FIG. 44 is a flowchart showing an example of a processing procedure for division into areas. Next, the operations will be described below.

A document image shown in FIG. 43A is scanned by the scanner circuit 3001 and is stored in the memory circuit 3003 via the memory control circuit 3002 controlled by the system control circuit 3007. Next, the document image data read from the memory circuit 3003 via the memory control circuit 3002 is supplied to the area dividing circuit 3004 and here the document image is divided into areas such as a character, a title, a halftone, a line and a table based upon features of the document image data as shown in FIG. 43B, and information such as the contents and location of the image in each area of the result of division is stored in the area memory circuit 3005.

Next, the document image data read from the memory circuit 3003 is supplied to the image processing circuit 3006 via the memory control circuit 3002. The result of division into areas read from the area memory 3005 is also supplied to the image processing circuit 3006 and the contents of for example, OCR processing, compression processing or binarization processing for the supplied document image is switched for every area adequately by referring to the above-described result of division into areas. Then, image processing i s performed for the supplied document image and the processed data is output to the computer device 3008.

The area dividing circuit 3004 is constituted so that the process can be switched for every stage by being provided with each judgment steps 302, 305 and 308 as shown in FIG. 44.

That is, after so called preprocessing such as binarization, thinning processing, tracing a contour and labeling processing is performed for document image data at a step 301, processing can be terminated at a step 303. After a part of areas such as a half-tone area, a line area and a table area are divided at a step 304, processing can be terminated at a step 306 and after a title area is divided at a step 305, processing can be terminated at a step 306. After all areas including character areas are divided, processing can be also terminated. As described above, the process is constituted so that it can be switched arbitrarily.

If for example, trimming processing is required for, for example, only half-tone images in the document image, the area dividing circuit enables reduction of the processed time by omitting a part of processing procedure owing to the above-described procedure. However, the processing procedure is required to be performed to the end because character areas are required when OCR processing is to be performed. These processings can also be applied in the system shown in the embodiment 1. Further, these processings can be executed by area division using a hardware or can be executed by computer software.

Transformed Example

Figure 45:
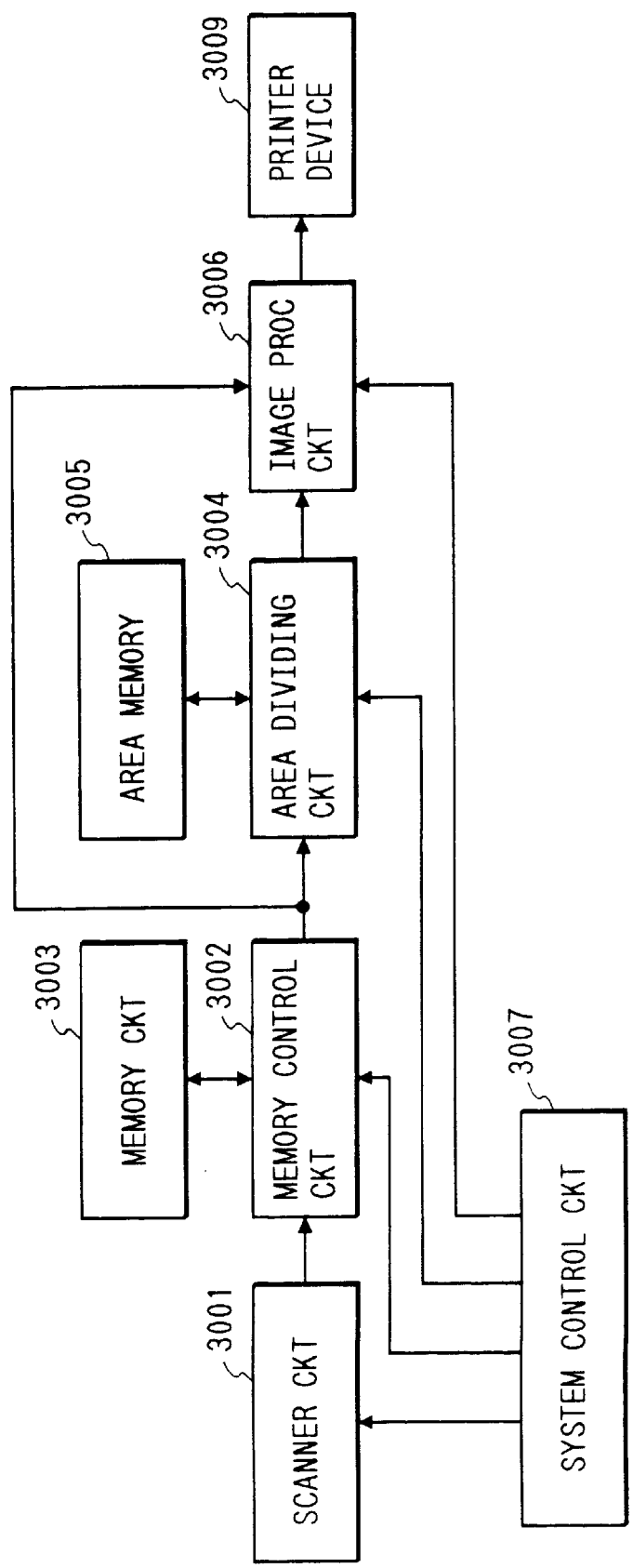
FIG. 45 is a block diagram showing configuration of a transformed example.
Figure 46:
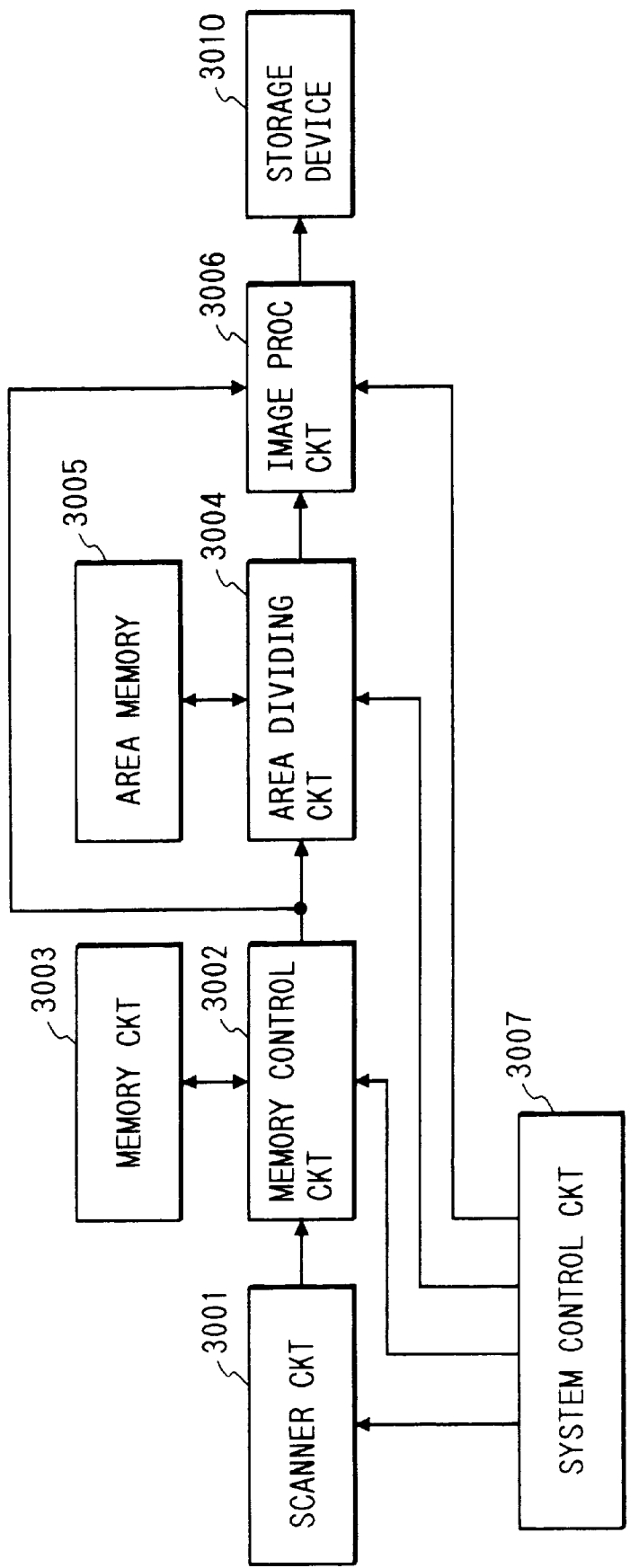
FIG. 46 is a block diagram showing configuration of another transformed example.

FIGS. 45 and 46 are block diagrams showing the configuration of a transformed example according to this embodiment. In these figures, the same number are allocated to units provided with the same functions as those shown in FIG. 42. Referring to FIG. 45, a reference number 3009 designates a printer unit and referring to FIG. 46, 3010 designates a storage device. As the main operations are the same as those described in relation to FIGS. 43A and 43B, the description of them is omitted and only the differences are described. Referring to FIG. 45, if it is assumed that required processing is to convert document image data to a vector font and to output the data via the printer unit 3009 after enlargement or reduction, processing may be terminated after tracing a contour or labeling processing at a step 301 in FIG. 44 and processing such as vector conversion, enlargement and reduction may be performed for the result in the image processing circuit 3006. Referring to FIG. 46, if it is assumed that required processing is to store a document image in the storage device 3010 by using the title as an index for retrieval, processing may be terminated after a title area is divided at a step 307 in FIG. 44 and the document image data together with the result may be stored in the storage device 3010. As described above, the area dividing circuit enables omission of the processing procedure and the time required for processing can be reduced.

As described above, a processing procedure of area dividing means can be switched depending upon the processing contents of image processing means according to this embodiment and an image input/output device provided with excellent functions can be constituted by utilizing the result of division into areas efficiently.

The apparatus may be constituted by combining concepts of the above-described embodiments.

As described above, an image can be compressed depending upon an attribute of a partial area efficiently according to the invention.

The precision of attribute classification of a partial area can be also enhanced.

Attributes can be further classified efficiently.

A variety of transformation and application of the invention within the limits of described claims in addition to the above-described embodiments is allowed.

What is claimed is:

1. An image processing apparatus comprising:
input means for inputting image data representing an original;
dividing means for dividing the original into a plurality of areas, examining an attribute of each of the plurality of areas and outputting the examination result;
recognizing means for recognizing a kind of character based on the image data; and
correcting means for correcting the examination result by using the recognizing by said recognizing means, wherein said recognizing means is provided with means for cutting out a character area.

2. An image processing method comprising:
an input step of inputting image data representing an original image;
a dividing step of dividing the original image into images corresponding to a plurality of areas, and allocating an attribute to each image of the plurality of areas;

a pattern matching step of matching an image of part of the plurality of areas, with a predetermined character pattern; and a correcting step of correcting the attribute of the image of the part of the plurality of areas, in accordance with a result of the matching in said pattern matching step.

3. An image processing apparatus comprising:

input means for inputting image data representing an original image;

dividing means for dividing the original image, said dividing means generating at least an image having a first attribute, an image having a second attribute, and an image having a third attribute; and control means for controlling whether said dividing means generates the image having the third attribute, wherein said control means stops generation of the images by said dividing means before said dividing means completes its operation.

4. An image processing method comprising:

an inputting step of inputting image data representing an original;

a step of dividing the original into a plurality of areas, examining an attribute of each of the plurality of areas and outputting the examination result;

a recognizing step of recognizing a kind of character based on the image data; and a correcting step of correcting the examination result by using the recognizing performed in said recognizing step, wherein said recognizing step comprises a step of cutting out a character area.

5. An image processing method comprising:

an inputting step of inputting image data representing an original image;

a dividing step of dividing the original image, said dividing step generating at least an image having a first attribute, an image having a second attribute, and an image having a third attribute; and a controlling step of controlling whether said dividing step generates the image having the third attribute, wherein said controlling step stops generation of the images in said dividing step before said dividing step completes its operation.

6. An image processing apparatus comprising:

input means for inputting image data representing an original image;

dividing means for dividing the original image into images corresponding to a plurality of areas, and allocating an attribute to each image of the plurality of areas;

pattern matching means for matching an image of part of the plurality of areas, with a predetermined character pattern; and correcting means for correcting the attribute of the image of the part of the plurality of areas, in accordance with a result of the matching by said pattern matching means.

7. An image processing apparatus according to claim 6, wherein said input means is an image scanner.

8. An image processing apparatus according to claim 6, wherein said input means is a host computer.

9. An image processing apparatus according to claim 6, wherein said input means is facsimile terminal equipment.

10. An image processing apparatus according to claim 6, wherein said attribute indicates whether the area is one of at least a character area, a line image area and a halftone image area.

11. An image processing apparatus according to claim 6, wherein the attribute indicates whether the area is one of at least a title area and a table area.

12. An image processing apparatus according to claim 6, wherein said pattern matching means is provided with detecting means for detecting distribution of image data in two-dimensional coordinates.

13. An image processing apparatus according to claim 6, wherein said correcting means corrects an attribute of an area whose examination result is unknown or a character.

* * * * *

UNITED STATES PATENT AND TRADEMARK OFFICE
CERTIFICATE OF CORRECTION

PATENT NO. : 5,949,555

DATED : September 7, 1999

INVENTOR(S): AKIHIKO SAKAI, ET AL.

It is certified that error appears in the above-identified patent and that said Letters Patent is hereby corrected as shown below:

Title page,

References Cited [56]

"5,351,314   9/1994   Vaeeezi" should read --5,351,314   9/1994   Vaezi--.

ABSTRACT [57]

"includes" should read --include--.

Sheet 20

FIG. 22, "BUSWESS WEEK" should read --BUSINESS WEEK--, and "COURTCSY" should read --COURTESY--.

COLUMN 1

Line 12, "method" (second occurrence), should read --method,--.
Line 13, "area" should read --area,--.
Line 15, "form and' should read --form, and--.

UNITED STATES PATENT AND TRADEMARK OFFICE
CERTIFICATE OF CORRECTION

PATENT NO. : 5,949,555

DATED : September 7, 1999

INVENTOR(S): AKIHIKO SAKAI, ET AL.

It is certified that error appears in the above-identified patent and that said Letters Patent is hereby corrected as shown below:

COLUMN 4

Line 58, "Next, The" should read --Next, the--.

COLUMN 7

Line 40, "The a flow" should read --the flow--.

COLUMN 14

Line 19, "mode in which" (second occurrence), should be deleted.
    Line 30, "bytes respectively" should read --bytes, respectively,--.

COLUMN 16

Line 55, "bytes" should read --bytes,--.
    Line 56, "tively" should read --tively,--.

UNITED STATES PATENT AND TRADEMARK OFFICE
CERTIFICATE OF CORRECTION

PATENT NO. : 5,949,555

DATED : September 7, 1999

INVENTOR(S): AKIHIKO SAKAI, ET AL.

It is certified that error appears in the above-identified patent and that said Letters Patent is hereby corrected as shown below:

COLUMN 17

Line 53, "commands each other" should read --commands from/to each other--.

COLUMN 18

Line 63, "areas" should read --areas,--.

COLUMN 19

Line 10, "binarization" should read --binarization for--.
　　　Line 21, "(JBIG)" should read --(JBIG),--.
　　　Line 34, "title," should read --a title,--.

COLUMN 20

Line 9, "connected" component" should read --connected component--.

UNITED STATES PATENT AND TRADEMARK OFFICE
CERTIFICATE OF CORRECTION

PATENT NO. : 5,949,555

DATED : September 7, 1999

INVENTOR(S): AKIHIKO SAKAI, ET AL.

It is certified that error appears in the above-identified patent and that said Letters Patent is hereby corrected as shown below:

COLUMN 21

Line 30, "as" should read --where--.
    Line 62, "Furthermore" should read
--Furthermore,--.

COLUMN 22

Line 34, "judging" should read --judges--.

COLUMN 23

Line 19, "search" should read --search,--.

COLUMN 25

Line 53, "threshould" should read --threshold--.
    Line 66, "is contact" should read --is in contact--.

COLUMN 27

Line 30, "direction" should read --directions--.

UNITED STATES PATENT AND TRADEMARK OFFICE
CERTIFICATE OF CORRECTION

PATENT NO. : 5,949,555

DATED : September 7, 1999

INVENTOR(S): AKIHIKO SAKAI, ET AL.

It is certified that error appears in the above-identified patent and that said Letters Patent is hereby corrected as shown below:

COLUMN 29

Line 27, "block" should read --blocks--.

COLUMN 30

Line 25, "in S2401" should read --in S2401,--.
    Line 50, "character," should read --a character,--.

COLUMN 32

Line 3, "less" should read --loss--.
    Line 43, "detail." should read --details--.
    Line 60, "processing" should read --processing,--.

COLUMN 34

Line 15, "2110R" (second occurrence), should read --2110G--.

UNITED STATES PATENT AND TRADEMARK OFFICE
CERTIFICATE OF CORRECTION

PATENT NO. : 5,949,555

DATED : September 7, 1999

INVENTOR(S): AKIHIKO SAKAI, ET AL.

It is certified that error appears in the above-identified patent and that said Letters Patent is hereby corrected as shown below:

COLUMN 38

Line 18, "with capacity" should read --with a capacity--.

COLUMN 39

Line 36, "detail" should read --details--.
    Line 47, "thereof" should be deleted.
    Line 48, "description" should read --description thereof--.

COLUMN 42

Line 39, "for performed" should read --or performed for--.
    Line 46, "determine" should read --deteriorates--.

UNITED STATES PATENT AND TRADEMARK OFFICE
CERTIFICATE OF CORRECTION

PATENT NO. : 5,949,555

DATED : September 7, 1999

INVENTOR(S): AKIHIKO SAKAI, ET AL.

It is certified that error appears in the above-identified patent and that said Letters Patent is hereby corrected as shown below:

COLUMN 43

Line 4, "halftone," should read --halftone image,--.
Line 7, "for" should be deleted, and "processing" should read --processing for--.
Line 27, "a halftone," should read --a halftone area,--.
Line 41, "i s" should read --is--.

UNITED STATES PATENT AND TRADEMARK OFFICE
CERTIFICATE OF CORRECTION

PATENT NO. : 5,949,555

DATED : September 7, 1999

INVENTOR(S): AKIHIKO SAKAI, ET AL.

It is certified that error appears in the above-identified patent and that said Letters Patent is hereby corrected as shown below:

<u>COLUMN 44</u>

Line 7, "number" should read --numbers--.

Signed and Sealed this

First Day of August, 2000

Attest:

Q. TODD DICKINSON

*Attesting Officer*  *Director of Patents and Trademarks*